(12) United States Patent
Bindrim et al.

(10) Patent No.: US 10,362,583 B2
(45) Date of Patent: Jul. 23, 2019

(54) TELECOMMUNICATIONS NETWORKS

(71) Applicant: VODAFONE IP LICENSING LIMITED, Newbury, Berkshire (GB)

(72) Inventors: Walter Bindrim, London (GB); John Moughton, London (GB); Adam Pollard, London (GB); David Fox, London (GB); Peter Cosimini, London (GB); Matthew Cheng, London (GB); Christopher Pudney, London (GB)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 0 days.

(21) Appl. No.: 15/110,077

(22) PCT Filed: Jan. 8, 2015

(86) PCT No.: PCT/GB2015/050026
§ 371 (c)(1),
(2) Date: Jul. 6, 2016

(87) PCT Pub. No.: WO2015/104546
PCT Pub. Date: Jul. 16, 2015

(65) Prior Publication Data
US 2016/0330610 A1 Nov. 10, 2016

(30) Foreign Application Priority Data
Jan. 8, 2014 (GB) .................................. 1400302.4

(51) Int. Cl.
*H04W 36/06* (2009.01)
*H04W 72/04* (2009.01)
(Continued)

(52) U.S. Cl.
CPC ..... *H04W 72/0493* (2013.01); *H04L 61/2592* (2013.01); *H04L 63/104* (2013.01);
(Continued)

(58) Field of Classification Search
CPC ..... H04L 67/10; H04L 67/1095; H04L 29/08; H04L 63/00; H04L 63/1441; H04W 28/18; H04W 48/16; H04W 76/02
See application file for complete search history.

(56) References Cited

U.S. PATENT DOCUMENTS 7,971,232 B2  6/2011  Hasbun
9,154,327 B1  10/2015  Marino et al.
(Continued)

FOREIGN PATENT DOCUMENTS

EP  2373091  10/2011
EP  2403290  1/2012
(Continued)

OTHER PUBLICATIONS

ISR and Written Opinion for PCT/GB2015/050026 dated Jul. 4, 2015.
(Continued)

*Primary Examiner* — Quan M Hua
(74) *Attorney, Agent, or Firm* — Workman Nydegger

(57) ABSTRACT

A mobile telecommunications network includes: a radio access network having radio means (2000) for wireless communication with a plurality of terminals (10) registered with the telecommunications network and control means (700) operable to provide services to the users of the terminals connected thereto, and a core (2030) including a store of policy information (9, 36) for respective ones of the terminals (10), and distribution means operable to provide to the control means associated with one of the terminals the policy information; wherein the control means is operable to store the policy information together with an indicator of the version of the policy information during periods when the terminal is disconnected from the control means, the control means including checking means for checking the currency of the policy using the indicator of the version of the policy and means for applying the stored policy information to the terminal when the terminal re-connects to the control means if the checking means determines that the stored policy is current.

14 Claims, 26 Drawing Sheets

(51) Int. Cl.
   *H04L 29/06*   (2006.01)
   *H04W 4/08*    (2009.01)
   *H04W 12/08*   (2009.01)
   *H04L 29/08*   (2006.01)
   *H04W 16/32*   (2009.01)
   *H04L 29/12*   (2006.01)
   *H04M 15/00*   (2006.01)
   *H04W 8/18*    (2009.01)
   *H04W 12/02*   (2009.01)
   *H04W 88/02*   (2009.01)
   *H04W 88/12*   (2009.01)

(52) U.S. Cl.
   CPC .......... *H04L 63/20* (2013.01); *H04L 65/1013* (2013.01); *H04L 67/16* (2013.01); *H04L 67/306* (2013.01); *H04M 15/66* (2013.01); *H04W 4/08* (2013.01); *H04W 8/186* (2013.01); *H04W 12/02* (2013.01); *H04W 12/08* (2013.01); *H04W 16/32* (2013.01); *H04W 88/02* (2013.01); *H04W 88/12* (2013.01)

(56) References Cited

U.S. PATENT DOCUMENTS

| | | | |
|---|---|---|---|
| 2004/0095959 A1* | 5/2004 | Fiter | H04L 29/12311 370/466 |
| 2009/0141625 A1* | 6/2009 | Ghai | H04L 12/5695 370/230 |
| 2011/0072487 A1 | 3/2011 | Hadar | |
| 2011/0280143 A1 | 11/2011 | Li et al. | |
| 2012/0122441 A1* | 5/2012 | Kim | H04W 28/18 455/418 |
| 2012/0250573 A1* | 10/2012 | Kulasingam | H04W 4/001 370/254 |
| 2012/0303835 A1 | 11/2012 | Kempf et al. | |
| 2013/0021972 A1 | 1/2013 | Lim et al. | |
| 2014/0016545 A1 | 1/2014 | Jaiswal | |
| 2014/0022897 A1 | 1/2014 | Rajagopalan | |
| 2014/0156727 A1 | 6/2014 | Almon | |
| 2015/0119101 A1 | 4/2015 | Cui | |
| 2015/0358893 A1 | 12/2015 | Laselva et al. | |
| 2016/0330330 A1 | 11/2016 | Bindrim et al. | |
| 2016/0330748 A1 | 11/2016 | Bindrim et al. | |
| 2017/0364973 A1 | 12/2017 | Van Biljon | |

FOREIGN PATENT DOCUMENTS

| | | |
|---|---|---|
| EP | 2603034 | 6/2013 |
| WO | WO 2009006630 | 1/2009 |
| WO | 2012000564 | 1/2013 |

OTHER PUBLICATIONS

Office Action issued in U.S. Appl. No. 15/110,076 dated Jan. 26, 2018.

Office Action issued in U.S. Appl. No. 15/110,078 dated Feb. 8, 2018.

ISR and Written Opinion issued in PCT/GB2015/050025 dated Feb. 4, 2015.

ISR and Written Opinion issued in PCT/GB2015/050028 dated Jul. 4, 2015.

Notice of Allowance issued in U.S. Appl. No. 15/110,076 dated Sep. 6, 2018.

Office Action issued in U.S. Appl. No. 15/110,078 dated Sep. 12, 2018.

* cited by examiner

TELECOMMUNICATIONS NETWORKS

CROSS REFERENCE TO RELATED APPLICATIONS

This application is a U.S. Nationalization of PCT Application Number PCT/GB2015/050026, filed on Jan. 8, 2015, which claims priority to GB Patent Application No. 1400302.4, filed on Jan. 8, 2014, the entireties of which are incorporated herein by reference.

TECHNICAL FIELD

The present invention relates to a mobile telecommunications network including a radio access network having radio means for wireless communication with a plurality of terminals registered with the telecommunications network and control means operable to provide services to the users of the terminals connected thereto, and a core including a store of policy information for respective ones of the terminals, and distribution means operable to provide to the control means associated with one of the terminals the policy information. A corresponding method is also provided.

BACKGROUND TO THE INVENTION

Recently, a dramatic rise in sales of both smart-phones and laptop data cards has resulted in a substantial increase in the amount of data communications passing through mobile telecommunications networks. This volumetric increase can also be attributed to enhancements made to the capabilities of the networks. The most popular use for mobile data is HTTP browsing, although usage of HTTP streaming is growing considerably. Other mobile data uses include HTTP downloading and Peer-to-Peer (P2P) activities such as file sharing.

This ability to use the cellular networks for mobile data services, such as Internet browsing is resulting in subscribers treating their mobile networks in much the same way as they treat their fixed networks. That is, users are tending to expect the same service from the Internet, irrespective of their access method. However, mobile networks have a more restricted capacity and are more costly to operate, as compared to fixed networks.

In this regard, from the network operator's viewpoint, as the mobile broadband traffic volume carried over 2G, 3G, HSPA (High Speed Packet Access) and 4G networks continues to grow, the cost of supporting this data volume is becoming more and more expensive based on the current network architecture and deployments. This cost differential is exacerbated by one of the current business models being utilised, whereby operators charge a flat rate for unlimited amounts of data.

The increased usage is also unfortunately likely to result in an increase of data traffic jams, and hence a degradation of service for mobile users if not properly managed.

It has been proposed to control data-heavy users by "choking" the bandwidth available to them when a maximum data volume limit is exceeded. Whilst this addresses the problem on an individual level, it does not address the network capacity problem as a whole.

It is therefore apparent that mobile broadband is at a crossroads as networks and business models are strained by bandwidth demand that is unmatched by revenue generation.

These problems will only get worse with moves to position mobile data as a replacement for fixed DSL (Digital Subscriber Line) access and with the advent of higher radio access speeds with 4G LTE/SAE (Long Term Evolution/ System Architecture Evolution) network. A large percentage of this traffic will consist of data which is destined for the public Internet, a significant proportion of which mobile operators will not be able to add value to, despite carrying the data on their own backhaul transport, core transport or cellular core infrastructure.

In addition to the problems discussed above, conventional mobile telephone communications networks have architectures that are hierarchical and traditionally expensive to scale. Many of the network elements, such as the BTS, routers, BSC/RNC etc are proprietary: devices of one manufacturer often do not interface with devices from another manufacturer. This makes it difficult to introduce new capabilities into the network as a different interface will be required for devices from each manufacturer. Further, conventional base stations are not capable of intelligent local routing or processing. Furthermore, the capacity of existing networks is not always used effectively. For example, many cell sites are under used, whilst others are heavily used.

The current cellular network architecture has the following disadvantages:—
 Hierarchical and expensive to scale
 Backhaul is a major problem
 Proprietary platforms: BTS, BSC/RNC etc
 Closed nodes and interfaces
 Very limited application or customer awareness (except for QoS priority)
 No intelligent local routing or processing
 Inefficient use of installed capacity There is therefore a need to overcome or ameliorate at least one of the problems of the prior art. In particular there is a need to address the needs of both the network operators and the users in improving the provision of mobile broadband data services.

EP2315412 describes the introduction of a novel platform at the network edge. To open the radio access part a "General Purpose Hardware Platform" may be implemented at the network edge. This may allow operators to split the functions of an Radio Network Controller (RNC) and/or a (e)NodeB between hardware and software. As a consequence operators have the capability to place applications and content directly at the edge of the network.

Despite the capability to place content and applications at the edge, such as games, M2M, CDN or cached content, mandatory core network functions, such as Lawful Intercept (LI), Adult Content Filter (ACF), charging or others, must still be supported.

As content and applications located at different radio locations require the same services and functions located in the core network, the mobile operator has to offer a service parity if a user or machine gets served e.g. content from the e.g. (e)NodeB or the core network. This is seen as one of the major issues in bringing content and applications to the radio locations. The proposed solution should preferably offer all functions and services offered by the core and Gi networks to the customers.

The following known arrangements are, in the majority, disclosed in EP2315412 and will now be described with reference to the accompanying Figures in which:

FIG. 1 illustrates known a high level packet data network architecture, useful for explaining the prior art and embodiments of the present invention;

FIG. 2 illustrates the introduction of a functional "platform" in a 3G network;

FIG. 3 shows the "platform" in more detail provided in the Radio Access Network;

FIG. 4 shows possible locations of the platform within a mobile telecommunications network;

FIG. 5 is a flow chart showing the steps performed when a mobile terminal is activated;

FIG. 6 shows the optimisation of content delivery to a mobile terminal;

FIG. 7 shows a further optimisation of content delivery to a mobile terminal;

FIG. 8 is a flow chart showing the procedures performed when a mobile terminal moves within the network;

FIG. 9 shows the transfer of information between platforms.

In the figures, like elements are generally designated with the same reference numbers.

Key elements of a 3G mobile telecommunications network, and its operation, will now briefly be described with reference to FIG. 1.

Each base station (e.g. Node B 1 and Femto 2) corresponds to a respective cell of the cellular or mobile telecommunications network and receives calls from and transmits calls to a mobile terminal (not shown) in that cell by wireless radio communication in one or both of the circuit switched or packet switched domains. The mobile terminal may be any portable telecommunications device, including a handheld mobile telephone, a personal digital assistant (PDA), machine to machine device (M2M) or a laptop computer equipped with a network access datacard.

The nodeB 1 or Femto 2 can be considered to comprise two main parts: a radio frequency part (radio unit) and a baseband part. The radio frequency part handles the transmission of radio frequency signals between the antenna of the nodeB 1 or Femto 2 and the mobile terminal, and for converting radio frequency signals into digital baseband signals (and vice versa). The baseband part is responsible for controlling and managing the transmission of the baseband signals to other components of the mobile telecommunications network.

In a macro 3G network, the Radio Access Network (RAN) comprises Node Bs and Radio Network Controllers (RNCs). The Node B is the function within the 3G network that provides the physical and transport radio link between the mobile terminal (User Equipment, UE) and the network. The Node B performs the transmission and reception of data wirelessly across the radio interface, and also applies the codes that are necessary to describe channels in a WCDMA system. The RNC is responsible for control the Node Bs that are connected to it. The RNC performs Radio Resource Management (RRM), some of the mobility management functions and is the point where encryption is done before user data is sent to and from a mobile terminal. The RNC connects to the Circuit Switched Core Network through a Media Gateway (MGW) (or MSC/MSS in case of R4 architecture) and to an SGSN (Serving GPRS Support Node) 5 in the Packet Switched Core Network. In FIG. 1, Node B 1 is controlled by RNC 3 across the Iub interface. An RNC may control more than one node B.

FIG. 1 also illustrates a Femto 3G RAN, with Femto 2 operating as the base station. Femto 2 is connected to an Access Gateway (AGW) (a.k.a Concentrator) 4 via an Iuh interface. Femto is an abbreviation of "femto-cells", and many other different names have been used, including home access points (HAPs), access points (APs) and femto-base stations, but all names refer to the same apparatus.

The radio link between the Femto 2 and the mobile terminal uses the same cellular telecommunication transport protocols as Node B 1 but with a smaller range—for example 25m. The Femto 2 appears to the mobile terminal as a conventional base station, so no modification to the mobile terminal is required for it to operate with the Femto 2. The Femto 2 performs a role corresponding to that of Node B 1 in the macro 3G RAN.

The Femto 2 would typically be configured to serve a home or office, in addition to GSM/UMTS/LTE networks. The WLAN could belong to the subscriber of the mobile terminal, or be an independently operated WLAN. The owner of Femto 2 can prescribe whether it is open or closed, whereby an open AP is able to carry communications from any mobile device in the GSM/UMTS/LTE network, and a closed AP is only able to carry communications from specific pre-assigned mobile devices.

Conventionally, in a 3G network (macro or Femto), the RANs are controlled by a mobile switching centre (MSC) and an SGSN (Serving GPRS Support Node) 5 of the core network. The MSC supports communications in the circuit switched domain, whilst the SGSN 5 supports communications in the packet switched domain—such as GPRS data transmissions. The SGSN is responsible for the delivery of data packets from and to the mobile terminals within its geographical service area. It performs packet routing and transfer, mobility management (attach/detach and location management), logical link management, and authentication and charging functions. A location register of the SGSN stores location information (e.g., current cell, current VLR) and user profiles (e.g., IMSI, address(es) used in the packet data network) of all mobile terminals registered with this SGSN. In FIG. 1, since the embodiment is concerned with data transmission, only the SGSN is illustrated as being in communication with RNC 3 and AGW 4, across the Iu interface. The RNC 3 typically has a dedicated (not shared) connection to its SGSN 5, such as a cable connection.

Communications between the AGW 4 and the SGSN 5 are preferably IP based communications, and may be, for example, transmitted over a broadband IP network. Further, the connection between the Femto and the AGW 4 may use the PSTN (Public Switched Telephone Network). Typically a DSL cable connects the AGW to the PSTN, and data is transmitted there-between by IP transport/DSL transport. The Femto or AGW converts the cellular telecommunications transport protocols used between the mobile terminal and the Femto 2 to the appropriate IP based signalling. The Iuh interface is similar to RAP with some Femto extensions.

The femto 2 may be connected to the AGW by means other than a DSL cable and the PSTN network. For example, the femto 2 may be connected to the AGW by a dedicated cable connection that is independent of the PSTN, or by a satellite connection.

The SGSN 5 is in communication with the GGSN 6 (Gateway GPRS Support Node) across the Gn interface. The GGSN is responsible for the interworking between the GPRS network and external packet switched networks, e.g. the Internet. The GGSN enables the mobility of mobile terminals in the networks. It maintains routing necessary to tunnel the Protocol Data Units (PDUs) to the SGSN that service a particular mobile terminal. The GGSN converts the GPRS packets coming from the SGSN into the appropriate packet data protocol (PDP) format (e.g., IP or X.25) and sends them out on the corresponding packet data network. In the other direction, PDP addresses of incoming data packets are converted to the mobile network address of the destination user. The readdressed packets are sent to the responsible SGSN. For this purpose, the GGSN stores the current SGSN address of the user and their profile in its location register.

The GGSN is responsible for IP address assignment and is the default router for the connected mobile terminal. The GGSN also performs authentication and charging functions. Other functions include IP Pool management and address mapping, QoS and PDP context enforcement.

In turn the GGSN 6 may route data via any applicable Value Added Service (VAS) equipment 7, before data is forwarded towards its intended destination via the Internet 8. As an example of the functionality of the VAS equipment, the traffic may be inspected for adult content before reaching the end-user if this user is under 18 years of age.

For billing purposes, for example, a PCRF (Policy and Charging Rules Function) apparatus 9 is also provided, in communication with the GGSN 6.

The SGSN 5, GGSN 6, VAS 7 and PCRF apparatus 9 comprise the core network of the mobile telecommunications network. The core also comprises further elements, such as the HLR is (which is not shown).

Mobile telecommunications networks have an active state of communication with their mobile terminals and an inactive/idle state of communication with their terminals. When in the active state, as the mobile terminals move between different cells of the network, the communication session is maintained by performing a "handover" operation between the cells. In the inactive/idle state, as a mobile terminal moves between different cells of the network the mobile terminal performs "cell reselection" to select the most appropriate cell on which to "camp" in order that the mobile terminal can be paged by the network when mobile terminating data is destined for that mobile terminal.

Conventionally, the mobile terminal or network determines whether a handover/cell reselection procedure should be triggered in dependence upon measurements of the radio signals of the cells in the region of the mobile terminal. A filter is applied to the signals (either by the network or by the mobile terminal) which calculates an average (e.g. arithmetical mean) value of these signals over a particular time period. The filtered/average values of the cells are then compared with each other or with a threshold value. In dependence upon these comparisons, cell reselection/handover related procedures are triggered. This cell reselection/handover process generally comprises taking radio signal measurements of neighbouring cells and comparing these to each other and to the radio signal of the current cell to determine which cell provides the best signal strength/quality. Handover/reselection to the best cell can then occur.

Generally calculations to determine whether to perform a handover from one base station to another base station are performed by the network, whereas calculations whether to perform cell reselection are performed by the mobile terminal.

Data in a mobile telecommunications network can be considered to be separated into "control plane" and "user plane". The control plane performs the required signalling, and includes the relevant application protocol and signalling bearer, for transporting the application protocol messages. Among other things, the application protocol is used for setting up the radio access bearer and the radio network layer. The user plane transmits data traffic and includes data streams and data bearers for the data streams. The data streams are characterised by one or more frame protocols specific for a particular interface. Generally speaking, the user plane carries data for use by a receiving terminal—such as data that allow a voice or picture to be reproduced—and the control plane controls how data are transmitted.

In addition to the elements and functions described above, mobile telecommunications networks also include facilities for transmitting SMS messages. SMS messages are transmitted over the control plane only (and not the user plane).

This architecture is what currently is being used to carry all packet data to and from mobile terminals. That is, in today's implementation of the Packet data architecture, user plane traffic traverses across all the network elements shown between the Node B or Femto on which the user is camped and the internet. That is, all data is directed from the applicable RAN through the core network components SGSN, GGSN and VAS before reaching the internet. All PS traffic accordingly follows the same path and therefore has the same network costs. All applications are processed on the client (on the mobile device) or on the server (which is connected to the internet), and the network core therefore acts like a bit-pipe in the current architecture. For data, where the mobile network operator cannot add any value by carrying it on its own backhaul transport, core transport or cellular core infrastructure (the core network), such as data destined for the public internet without required intervention from the core network, there is no benefit to routing this data via the core network.

However, a large percentage of this traffic can be handled in a more intelligent manner for example through content optimisation (Video & Web), content caching, or locally routed or directly routing content to the public Internet. All these techniques reduce the investment required by a mobile operator to carry the data on its own backhaul and core transport or cellular core infrastructure.

In order to offer low cost packet data, to support new services and to manage customer expectation, a step-change reduction in the end-to-end cost per bit is required.

Mobile operators want to reduce their packet data handling costs through alternate network architectures based on commoditised IT platforms, breaking away from the traditional architecture based on their voice legacy. These new network architectures overcome the Access architecture issues of today In order to successfully offer cheap packet data and be able to compete with the fixed broadband offers (flat fee) a solution is proposed which focuses on the reduction of the end-to-end cost per bit, especially for Internet access service.

This enables mobile operators to reduce packet data handling costs by means of an alternative network cost model architecture, which breaks out of the traditional network architecture and nodes and utilises lower cost transport networks to optimise the data flow.

In this regard, FIG. 2 shows a high level description of the architecture that may be adopted to deploy this on a 3G network. Such an architecture is described in EP2315412.

According to this arrangement, novel "platforms" (control units/means, also referred to as "SAVi") 24, 25, 26 for performing functions such as caching, routing, optimisation and offload/return decision functionality are integrated into the network. This decision functionality may be incorporated in the radio architecture. In this regard, the platforms 24, 25, 26 may be incorporated into the NodeBs 1 (25), RNCs 3 (26) or exist as separate physical entities (24). It is these platforms 24, 25, 26 that, for example, determine the path of communications originating from the mobile terminals.

The exact placement of the platform 24, 25, 26 is not essential, and, for a macro 3G network, it can be placed at or between the Node Bs and the RNCs, and also between the RNCs and the SGSNs (or any combination thereof). It would also be possible to place the platform 24, 25, 26 at the GGSN or P-GW.

In the 3G Macro network, the aim is to offload a high percentage of the macro network traffic from the core and transport (IuPS, Gn, etc) by diverting specific traffic type for certain user(s) class directly to the Internet.

Where the platform 24, 25 is located in the Node Bs (or on the Iub interface), it may be possible to redirect the data from all the remaining mobile network elements (e.g. the RNC, SGSN, GGSN and VAS for macro 3G), and sending the data directly to the Internet 8. In a similar manner, where the platform 26 is located at the RNC (or on the Iu interface), it becomes possible to redirect the data from the SGSN 5, GGSN 6 and the VAS 7. The alternative data route is preferably a DSL using ADSL.

It is also preferable to aggregate the alternative data routes for each cell, where applicable. In this regard, each cell will have at least one RNC 3 and a plurality of Node Bs, so where the decision blocks are situated at or in the vicinity of the Node Bs, for instance, there will be a plurality of links which should ideally be aggregated before being passed to the Internet 8. At the point of this aggregation 42, there is preferably a further decision block which enables data to be returned to the legacy route. For instance, a new policy rule may have been implemented, which requires or enables previously offloaded data to be returned to the core network route. This new policy rule may be communicated to the return decision module by the core network policy module. In FIG. 2, this returning of data is only shown to the VAS 7, but the data may be returned to one or more of the other core network elements.

Each of the NodeBs 1 is connected to the mobile network core through a Point of Concentration (PoC) 27. All traffic from the NodeBs 1 which is to be routed through the core mobile network is routed to the PoC 27. This includes both user plane and control plane data. On the control plane level, the PoC 27 routes data to and from the SGSN 5 and the GGSN 6. Control data is also sent to and from other core network components, including the Lawful Interception Database (LI DB) 30, DNS Server 32, Policy Server 9 (including Charging rules and IT Network 9A) and Home Location Register/Home Subscriber Server (HLR/HSS) 36 (which contains subscriber and device profile and state information).

User plane data is transmitted by the PoC 27 to the SGSN 5 and the GGSN 6. From the GGSN 6, data is routed across a VAS 7 node to the Internet 8. In 3G this is the standard data path from the mobile terminals to the Internet.

The embodiment of FIG. 2 is in relation to a 3G network. Embodiments of the invention are equally applicable to 4G (LTE/SAE) networks.

The LTE/SAE macro network includes eNode Bs which make up the RAN. The eNode Bs effectively combine the functionality of the node B and the RNC of the 3G network. These eNodeBs are the network components which communicate with the mobile communication devices. It is envisaged that the eNodeBs will be arranged in groups and each group controlled by a Mobility Management Entity (MME) and a User Plane Entity (UPE).

The MME performs many of the mobility functions traditionally provided by the SGSN. The MME terminates the control plane with the mobile device. It is responsible for terminating NAS (Non Access Stratum) Signalling such as MM (Mobility Management) and SM (Session Management) information as well as coordinating Idle Mode procedures. Other responsibilities of the MME include gateway selection inter MME Mobility and authentication of the mobile device.

The UPE manages protocols on the user plane such as, storing mobile terminal contexts, terminating the Idle Mode on the user plane, and PDP context encryption.

The platforms would operate in the same manner as described in relation to the 3G network. The platforms may be located at many different locations in the 4G network.

Arrangements in which the Radio Access Network controls the use of resources by mobile terminals will now be described.

Platform Architecture

As discussed above, a mobile telecommunication network is modified by the introduction of a "platform" 24,25,26. Such a platform (or control unit/means, also referred to as "SAVi") is shown in more detail at 700 FIG. 3 and which includes three principal parts: soft nodes 702 (physical/transport layer), network functions 704 and services 706 (application layer).

The platform 700 communicates with the radio frequency/RF part (radio unit) of a base station, such as a NodeB 1. The soft nodes 702 of the platform 700 comprise components such as a soft NodeB 708, soft BTS 710, soft eNodeB 711 and soft RNC 712 and soft SGSN/GGSN 714. The soft nodeB 708 provides functions equivalent to the baseband part of a conventional NodeB in a 3G telecommunications network. The soft BTS 710 provides baseband functions equivalent to the baseband functions of a BTS in a conventional 2G mobile telecommunications network. The soft enodeB 711 provides baseband functions equivalent to the baseband functions provided by a conventional enodeB in a 4G mobile telecommunications network. The platform 700 may therefore communicate with the radio frequency part of a 2G, 3G or 4G base station and provide appropriate baseband services for 2G, 3G or 4G technologies (or indeed for other technologies). A 3G mobile terminal that wishes to obtain telecommunication services from the mobile telecommunications networks connects wirelessly to the radio frequency part of a NodeB. Baseband functions may be provided either by a baseband part of the conventional NodeB or by the soft NodeB 708 forming an element of the soft node part of the platform 700. For example, the soft NodeB 708 may receive radio measurements from the radio frequency part of the NodeB to which it is connected, and may provide these radio measurements to other elements of the platform 700.

The network functions part 704 of the platform 700 includes modules for performing functions similar to those performed by the core network of a mobile telecommunications network, such as billing 720, location tracking 722 and the radio resource management (RRM) 724. The network functions may further comprise an offload decision module 726 that performs a function similar to the offload decision modules 24, 25 and 26 described above. The network functions part 704 may further comprise a caching function 728 and Content Delivery Network function 730.

The network functions part 704 of the platform 700 provides an Application Programming Interface (API) framework to the services part 706 of the platform 700. The services part 706 of the platform supports a plurality of applications 740, 742 etc.

The network functions fall into three main categories, those that enable the network operation (e.g. charging, O&M), those that support service operation (e.g. Location) and those that optimise the usage of the network by certain applications and services (e.g. Caching, Video Optimisation).

The applications supported on the Platform 700 are the entities that supply or demand the flow of data on the network, akin to a server on the internet, e.g. gaming server, navigation server.

The API is implemented by a software program running on the network function part 704 which presents a novel standardised interface for the applications 740, 742 etc of the services part 706. The novel standardised API provides a consistent interface, defining communication protocols, ports etc. Full details of the API may be published to allow a multiplicity of applications to be developed for the platform 700 by multiple developers. This should be contrasted with prior art arrangements where each component of a mobile telecommunications network (such as BTS, BSC/RNC, SGSN etc) is proprietary and tends to have a unique interface, meaning that a different application must be written for each node of a conventional network.

The applications 740, 742 etc may provide services to users of the telecommunications network by co-operating with other parts of the platform 700.

The details of the use of each application used by a user of the mobile telecommunications network are stored in an application context/container. The Application context contains application names, protocol used to carry such application, their characteristics that are measured/reported over period of time and some statistical information about these applications (volume, number of users using these applications, etc.).

As shown in FIG. 4, a platform 700 may be provided at each base station of the mobile network (where it is connected to the radio frequency part of the base station—NodeB 1 in FIG. 2), forming an access node 800. Platform 700 may also be provided at the RNC (item 3 in FIG. 2) where it forms a gateway 802. The access node 800 and the gateway 802 are both configured to communicate directly with the network core 804 (for example, comprising the SGSN 5, GGSN 6 and VAS 7). The access node 800 and gateway 802 may also be connected to the internet 8 for direct internet access via direct links 806 and 808, respectively, such that at least a portion of the core network 804 is bypassed in the manner described above.

The following are examples of access technologies that can be provided within the access node 700:
3GPP: GSM/GPRS, UMTS/HSPA & LTE
IEEE: 802.11 family & 802.16 family
ITU: DSL, ADSL, VDSL, VDSL2
Allocation of Functions to Platforms The steps performed when a mobile terminal is activated at a NodeB, at the Femto or at the Access Point (AP) of the network which includes the novel platform 700 will now be described with reference to FIG. 5. At step 9A the mobile terminal (UE) is activated within the coverage area of a particular NodeB, at the Femto or at the AP. The access part of the NodeB, at the Femto or at the AP communicates information from the mobile terminal to the platform 700 associated with the NodeB, at the Femto or at the AP. At step 9B the platform 700 then allocates the baseband NodeB, at the Femto or at the AP function and the RNC or BRAS (Broadband Remote Access Server) function either at access node 800 at the NodeB at the Femto or at the AP site or at the gateway 802 at the RNC or BRAS site of the network or even from neighbouring nodes that have spare resources to pull. The decision as to whether the RNC or BRAS function is allocated at the platform 700 of access node 800 or the gateway node 802 may be made depending on various criteria, including:

The device type—for example this decision can be based on the radio access capabilities that the mobile terminal indicates upon activation, such as whether it is operating in the circuit switched or packet switched domains.

The location of the mobile terminal. If the mobile terminal is near the edge of the cell (which can be determined by network power measurements or neighbour cell measurements from the mobile terminal, within a plus or minus 3 dB range for the RACH).

The establishment cause of the connection request: such that the NodeB can filter the unnecessary signalling information from the mobile terminal which is not critical—for example periodic routing area update messages.

Upon allocating the baseband NodeB at the Femto or at the AP and the RNC or BRAS function, the NodeB at the Femto or at the AP may allocate the mobile terminal to a particular carrier dedicated to the RNC or BRAS function.

Once the RNC or BRAS function is allocated to either the access node 800 or the gateway 802 at step 9C, other functions performed by the platform 700 at the access node 800 (or other access node) and the gateway 802 (or other gateway) are allocated to the mobile device. All other platform functions may be provided by the platform where the RNC or BRAS function is allocated to the mobile terminal. However, a platform at a different location to that which provides the RNC or BRAS function to the mobile terminal may provide some or all other functions.

At step 9D the platform which is allocated the RNC or BRAS function is provided with a Common ID message from the core network 804.

At step 9E, this message is used by the platform 700 to look up the complete subscription information for the mobile terminal, as well as the resource requirements (QoS) of the services required and negotiated PDP context, this information being provided by the core network 804.

The subscription information relating to the device that is obtained from the central nodes (e.g. core network) 804 is used to allocate the other functions at access node 800 and/or the gateway 802 in dependence upon various factors, including:

Detailed information regarding the mobile terminal type obtained from the core network.

The subscription characteristics of the mobile terminal.

The applications previously used most frequently by the mobile terminal.

The characteristics of the applications previously used by the mobile device and the performance requirements thereof.

The historic mobility of the mobile terminal (speed, connection, distance travelled etc).

The location of the mobile terminal and the likely destination of traffic from the mobile terminal based on historic usage patterns.

The load of the NodeB providing RF services to the mobile terminal, and the historic traffic trends at that NodeB at Femto or at AP.

The characteristics of the NodeB at the Femto or at the AP providing RF services (for example, the location, what other devices are connected through the NodeB at the Femto or at the AP, the number of machine to machine devices being attached and served by the NodeB, etc).

As mentioned above, a single mobile terminal may have platform functions/applications allocated on a plurality of platforms. Generally, when a mobile terminal is near-stationary it is most efficient for its functions/applications to be served from an access node 800 (i.e. distributed), whereas mobile terminals with greater mobility (or lower anticipated cell hold times) will be most efficiently served by having fewer or no functions/applications served from the access Node 800, and more or all functions/applications served from a gateway 802 (i.e. centralised). The assignment of functions/applications to a mobile terminal between an access node 800 and a gateway 802 will also depend upon the characteristics of the service type provided by the application (for example, the average IP session duration, the popularity of the particular application, the average mobility of mobile terminal using the service provided by the application etc).

Traffic management may be performed at the access node 800, where there is access to real-time radio information from the radio frequency part of the NodeB, the Femto or the AP serving the mobile device.

Centralised Radio Resource Management (RRM) may be provided at the gateway 802, and maintains performance across different access modes 800, which may have different radio access technologies, frequency bands, coverage etc. The RRM function 724 of the platform 700 of the gateway 802 may obtain information regarding radio traffic management from each access node 800 to dynamically position subscribers to particular radio technology. This technique will be used to allocate network resources based on the resource availability, application used and user mobility, For example, the traffic management information may be provided by the soft NodeB 708, Femto or AP of the platform 700 at the access node 800. This soft NodeB 708 obtains radio information relating to the mobile terminal from the radio frequency part of the NodeB to which the mobile terminal is wirelessly connected.

For a particular mobile terminal, functions provided by an access node 800 and gateway 802 may be coordinated to work together in an advantageous manner (i.e. a hybrid or distributed arrangement). For example, the gateway 802 may set operating limits or ranges within which functions performed by the access node 800 may be performed, without reference to the gateway 802. When the functions move outside the ranges set, control of those functions may be passed to the gateway 802.

Further, the access node 800 and the gateway 802 may cooperate to advantageously optimise content delivery to a mobile terminal.

The optimisation of content delivery will now be described with reference to FIG. 6 of the drawings. Content may be optimised at gateway 802 and at an access node 800. The gateway 802 may serve multiple access nodes 800, and my distribute content to those multiple access nodes 800, for onward transmissions from each of those access nodes 800 to a mobile terminal via the radio frequency part of NodeB, the Femto or the AP serving that node. Radio quality measurements are reported by the mobile terminal to the access node 800 at regular intervals, such as 2 millisecond intervals. Radio quality measurement relating to that mobile terminal are transmitted between the radio frequency part of the NodeB, the Femto or the AP serving the mobile terminal to the access node 800 at regular intervals, such as between 2 and 10 millisecond intervals. These radio measurements are received at the soft nodes 702 and are passed to functions 704 (e.g. to QoS function 732 for analysis). These radio frequency measurements from the mobile terminal and the NodeB are reported by the access node 800 to the gateway 802 (e.g. to QoS function 732 of the gateway 802 for analysis) at regular intervals, such as intervals of between 1 and 10 seconds. The gateway 802 may receive radio information from multiple access nodes 800. The radio measurements received by the gateway 802 may be analysed over a relatively long period, such as between 1 and 2 minutes. The radio quality measurements may be averaged (for example, the arithmetical mean of the radio quality may be determined) over this time period. The transmission of content from the gateway 802 may then be optimised according to this calculation. Where the content is distributed by the gateway 802 to a plurality of access nodes 800, the content distribution will be based on the analysis of the radio quality indicators from all of the access nodes 800. The analysis may consider the maximum or peak radio performance over the time period of between 1 and 2 minutes.

When the content is received by each access node 800, the access node 800 then distributes the content to each mobile terminal. This distribution is optimised based on real-time network mode and mobile terminal specific radio link quality, as determined over a period of, for example, between 1 and 10 milliseconds. That is, content delivered to a mobile terminal that has high radio link quality may be optimised in a different manner to a mobile terminal that had poor radio link quality.

The co-operation between access nodes 800 and gateways 802 may further enhance the distribution of content in a manner now to be described with reference to FIG. 7.

When a mobile terminal requests a particular content item, this request is transmitted to the access node 800 serving that mobile terminal, assuming that this is the first request for this content item to the access node 800, the access node 800 passes this request to the gateway 802 serving the access node 800. Assuming that this is the first request for this content item from the gateway 802, the gateway 802 retrieves the content from a content server. The content is then provided by the content server to the gateway 802, and from there is distributed to the access node 800, and onwardly to the requesting mobile terminal. Advantageously, the gateway 802 maintains a record of content items that are requested frequently. When a content item is determined by the gateway 802 to be requested frequently, this is stored in a cache 1110 associated with the gateway 802 (which may be the cache 728 of the platform 700). Subsequent requests for that content item from access nodes 800 to the gateway 802 can then be serviced by retrieving the content item from the cache 1110 and distributing the content item to the requesting access node 800, and thus avoiding the need to request the content from the content server.

The gateway 802 may be further configured to identify popular content items that are likely to be requested by a large number of access nodes 800. When it is determined that a content item is popular, the gateway 802 may push these content items to each of the access nodes 800 associated therewith (so that this content is hosted at the access node 800, using Content Delivery Network (CDN) function 730 of the network functions 704 of the gateway 802 and the access node 800). The content is then available at the access node 800 for transmission to any mobile terminal that requests it, without having to retrieve this content from the gateway 802 or the content server. Advantageously, the distribution of such content items is performed in a manner which takes into account the capacity or the congestion of the link between the mobile terminal and the gateway 802 and the nature of the content. For example, typically a link between a mobile terminal and the gateway 802 may experience very little usage and congestion in the early hours of the morning. The content item can be advantageously transmitted in between the gateway 802 and the access node 800 at this time, when there is spare capacity. The gateway 802 will determine whether the content item is suitable for transmission on this basis, for example, by taking into account a number of times that the content item has been requested, the size of the content item and the storage space at the access node 800. If a content item is relatively small and is time-critical, such as news headlines, then such a content item may be distributed frequently throughout the day, as such content is not suitable for transmission once a day at early hours of the morning, as it becomes quickly out of date.

Relocation of Mobile Terminal

The procedures performed when a mobile terminal moves between cells in the mobile telecommunications network will now be described with reference to FIG. 8. In the conventional manner at step 12A, when the mobile terminal moves to the edge of its current serving cell, the radio measurements reported from the mobile terminal and the radio frequency part of the NodeB, the Femto or the AP serving that mobile terminal are used by the core network to determine when to perform a handover and to which target cell the handover should be performed. When the best target cell has been identified, handover to that target cell from the serving cell it is performed at 12B in a conventional manner.

At step 12C selected platform functions may be relocated from the source access node (that served the old cell) to the destination access node (that serves the new target cell).

When the source and destination access nodes are served by the same gateway, only base station function (such as soft NodeB functions 708) may be relocated to the destination access node.

The relocation of functions of the access nodes is performed independently to the radio handover, so for some time after the radio handover, the source access node continues to serve content to the mobile terminal through the destination access node. The routing of data packets for the 3G network between the destination and the source access nodes may be performed using an Iu interface between the RNC or BRAS function 712 of the destination access node and the SGSN/GGSN function 714 of the source access node. Alternatively, the routing of data packets between the destination and the source access nodes can be completed by the SGSN/GGSN function 714 of the destination access node connecting directly to functions of the source access node through an IP interface.

After handover has been completed at step 12B, the access node controlling the mobile terminal may be relocated from the source access node to the destination access node in coordination with the gateway. the standardised handover decisions (mainly based on coverage, quality, power, interference, etc.) for 2G, 3G, LTE & fixed network are used to move the mobile from one node or system to another. However, the platform 700 introduces new opportunity to make the handover decision based on type or characteristics of the certain application, type of user and the QoS requirements.

The timing of the relocation of access node functions from the source to destination platform may be dependent on the following:

the duration of the current connection/communication of the mobile terminal the speed of movement of the mobile terminal the characteristics of the applications being used by the mobile device, the quality of service, the predicated type and amounts of transmission ongoing.

The radio resource allocations status at the mobile terminal

The respective node of the source and destination and access nodes.

At step 12D, optionally, some functions will be reallocated from the access nodes to the gateway. For example, if the destination access node is heavily loaded and is congested, or has a lower capability then the source access node, or the mobile terminal is determined to be very mobile, it may be advantageous to transfer functions to the gateway. Functions are reallocated from the access node to the gateway by, for example, a Serving Radio Network Subsystem (SRNS) relocation between the RNC function 712 of the access node and the gateway. Alternatively the functions may be reallocated by performing a radio reconfiguration of user connection to the mobile terminal.

The reallocation of functions from an access node to the gateway may be performed at call/communication sessions set-up. At call/communication session set-up, further subscriber information will be provided, which may be used by the access node or gateway to be determine whether it would be advantageous to reallocate functions from the access node to the gateway. Reallocation of functions from the access node 800 to the gateway 802 may be performed during an active connection when a requirement of the communication sessions has been modified, or where the required resource is not available at the access node 800.

According to the same principles, applications may be (re)located (or distributed) between access nodes 800 and for gateways 802 to provide optimised application delivery/ best use of the communication resources.

As mentioned above, information about each application used by the user at the mobile terminal is stored in an application context. The application context is shared between each access node 800 and gateway 802 that control the user connection for that mobile terminal. One of the access nodes 800/gateways 802 will be the "master" for that particular application, and that will also be the master of an application specific record in the application context. The application context is advantageously periodically synchronised between the access node 800 and the gateway 802.

The application information is the application context specific to a particular mobile terminal, and this is passed between access nodes and gateways during reallocation for a mobile terminal, enabling the application to be seamlessly passed access nodes/gateways, avoiding impacts to the user experience.

FIG. 9 shows the transfer of application information between access nodes and gateways.

Tailoring Bandwidth to Application

Radio measurements received from the radio frequency part of the NodeB, the Femto or the AP serving the mobile terminal are passed to the soft nodes 702 of the platform 700 (of the access node 800 or gateway 802 serving the mobile terminal), and are passed to the network functions 704 of the platform 700, which then distributes the measurements to where necessary within the platform 700. The platform 700 has access to the subscriber information from the core network, which allows the network functions 704 to deliver data traffic in a manner that is optimised for radio conditions as indicated by the radio measurements. The data traffic may also be optimised according to the subscription of the user of the mobile terminal available radio resource, mobile terminal capability, and/or for the class of the terminal (e.g. access technologies used). This optimisation allows bandwidth usage to be balanced with customer experience. The subscriber information may include information about the price plan of the user of the mobile terminal. The mobile network operator may track the type of application used by the user, the total data usage of the user, and may differentially target radio resources the highest data value stream of users.

By hosting applications 740, 742 in the services part 706 of the platform the access node 800 (or at least the gateway 802), the point of the network that is aware of the application being used by the user of the mobile terminal closer in the link between the mobile terminal and the core network to the NodeB serving the mobile terminal. This enables the sharing of network resources to the most appropriate data streams, such as the most profitable data streams. Such awareness of the application to which a request for data transmission relates allows the use of low value data streams, such as peer-to-peer file sharing, to be allocated only limited bandwidth, so that remaining bandwidth can be targeted to particular users. In the uplink, transmission of data can be controlled by the access node 800 (or gateway 802) hosting the application to control data flow appropriately before data is onwardly transmitted towards the core of the network (which was not possible with conventional arrangements).

Application Programming Interface (API)

As mentioned above, a novel API is provided which defines the language that each of the software modules 740, 742 of the platform 700 use to communicate to coordinate to optimise application delivery to users. The platform 700 negotiates which each application 740, 742 the specific resource and performance requirements based on the application characteristics, allowing the application to directly communicate the scheduling performance requirements, rather than using a predefined set of quality of service parameters. This negotiation between the platform 700 and the applications 740, 742 is facilitated by the API.

The API may also facilitate the provision of radio link quality information (e.g. from QoS function 732) to applications 740, 742.

The API may further enable the platform 700 to control use of the applications 740, 742—e.g. to allow, disallow or adapt the applications.

By way of example, the application 740 may be a Voice over IP (VoIP) application. The nature of Voice over IP communications is that there is a virtually continuous succession of small data packets in which voice data is communicated. The voice data must be communicated with no or minimal latency in order that a two-way conversation can be performed successfully. The Voice over IP application 740 is able to compress voice data before transmission using a variety of techniques/CODECs. The compression techniques/CODECs may range from a relatively low compression technique, which provides high quality voice reproduction but requires a large bandwidth, to a much higher compression technique which provides reduced voice quality and which requires a much lower bandwidth.

The API is operable to provide details of the application characteristics to the network functions part 704 of the platform 700. This makes the network functions part 704 of the platform aware of the characteristics of the application. In the present example, as the application is a Voice over IP application, the network functions part 704 may be made aware that the application will tend to transmit continuous successions of small data packets that require transmission with no or low latency. The network function 704 may then be configured appropriately.

The API may further be operable to allow the network functions part 704 to communicate radio link quality information to the application 740. For example, when the network functions part 704 received information regarding the application characteristics (via the API), it may allocate radio link resources to that application 740. This allocation of radio link resources may be communicated by the network functions part 704 to the application 740 (via the API). The application 740 may then select an appropriate compression technique/CODEC in dependence upon the radio link quality available. During a Voice over IP call, the available radio link quality may be communicated regularly from the network functions part 704 to the application 740 (via the API) to allow the application 740 to vary the compression technique/CODEC used in accordance with changes to the radio link quality.

The network functions part 704 may control how the applications 740, 742 work (via the API). The network functions part 704 may allow, disallow or adapt the applications 740, 742 hosted in the services part 706 of the platform 700. For example, the network functions part 704 may require the Voice over IP application 740 to use a particular compression technique/CODEC if radio link bandwidth is restricted.

Another example of how the network functions part 704 may advantageously provide radio link quality information to an application (via the API) is when the application 742 is a gaming application used by several users. If the radio link quality information received by the application 742 indicates that bandwidth is restricted, the application 742 may adapt is communications to the users such that latency of the communications is increased uniformly for all of the users (so that they all experience the same delay), in order that each of the users is provided with the same gaming experience.

In the arrangements described, the devices that connect to the platforms 700 are mobile devices that connect to the platforms via the radio access network of a mobile/cellular telecommunications network. It should be appreciated that non-mobile (fixed) devices may be connected to the platforms 700, for example by a wired or cable connection.

Allocation of Services

The control means is responsible for allocating the service instance for each UE, based on the UE locations and the control means capacity, capability and available resources to host another instance of a service. The UE is using service but the User (MSISDN) gives access to specific services.

For certain low popularity services or where the available serving control means capacity or capability is limited, the service can be hosted from a central control means, or from a neighbouring distributed control means.

For some services/functions, where the source and destination client applications are in the same geographical region, being served by the same site (e.g. BTS location) or site cluster (e.g. finite number of sites), the access node 800/gateway 802 ensures that the server for the service is located close to both users, and the traffic is routed between the users within the site.

The arrangement described above in relation to FIGS. 1 to 9 is the subject-matter of EP2315412. Such an arrangement deals with LI and other core network functions by always routing traffic that must be subject to LI and other core network functions through the core network, or by providing LI and other core network functions functionality at the network edge.

An alternative known representation of the platform 700 is shown in FIG. 10. The platform 700 includes a platform core 1000 which communicates based on two sets of APIs:

Application APIs 1010—which, as discussed above, offers standardised hosting environment for applications providing communication to Service Software

741, 742 and Network Functions Software 1015, 1016 hosted on the platform 700.

Network APIs 1017—which provide control and connectivity to network nodes 1030 through a vendor specific Adaptors 1020; Network API defines standardised communication between core 1000 and the Adaptors 1020; Communication between Adaptor 1020 network nodes and 3GPP/LTE node, such as (e)NodeB 1, BBU 1032, RNC 3, SGSN 5, GGSN 6/P-GW and MME 1040, remains proprietary The Platform 700 includes common network functions Software 1015, 1016 such as Scheduling, Routing, Billing/accounting, security and Policy functions, which allow the architecture to offer seamless experience across the network. The Platform 700 will provide capability to meet the Lawful Intercept (LI) requirements.

The Adaptors 1020 translate the Vendor specific implementation on the 3GPP/LTE nodes 1030, such as eNB, BBU, RNC, SGSN, GGSN/P-GW and MME, to common and open interface to the environment of platform 700.

The Adaptor 1020 for each 3GPP/LTE node 1030, such as eNB, BBU, RNC, SGSN, GGSN/P-GW and MME, is responsible for ensuring communication between the Network API 1017 and 3GPP node is secure.

The Platform 700 provides the capability for some Applications 741,742 hosted in the Platform 700 to be contacted remotely from the platform 700.

Logically control and data traffic interfaces (control plane and user plane) between the physical manifestations of the platforms 700 exist independent of the underlying 3GPP/LTE network nodes 1030. These interfaces will require to be made secure through functionality included within each platform 700.

The Platform 700 also provides the capability for hosted Network 1015,1016 and Service Applications 741,742 on different platforms 700 to communicate and pass data in a secure manner without mandating security to be provided by the application 741,742,1015,1016.

In contrast to the arrangements described above, in this implementation the platform 700 may handle both control and data traffic interfaces (control plane and user plane), rather than just the data traffic/user plane. Further, in contrast to the arrangements described above the nature of the gateway 802 may be different. In the implementation described hereinafter, the gateway 802 may be located other than at the RNC. For example, the gateway 802 may be located at the SGSN 5, GGSN 6, VAS 7 or PCRF apparatus 9, or in any part of the network core or RAN. In the implementation described hereinafter, the gateway 802 may be considered to be an interface between the platforms 700 at the access node (800) and the core network, rather than part of the "control means".

When the platform 700 environment is introduced into a mobile network it means that traffic can be inserted, hosted or created in the data path between GGSN 6 and UE, potentially impacting the operation of existing core systems (such as charging, policy enforcement & LI from other core network components (Charging rules and IT Network 9A, Policy Server 9 and including the Lawful Interception Database (LI DB) 30—see FIG. 2) which need to be replicated.

SUMMARY OF THE INVENTION

According to an aspect of the present invention, there is provided a mobile telecommunications network including:

a radio access network having radio means for wireless communication with a plurality of terminals registered with the telecommunications network and control means operable to provide services to the users of the terminals connected thereto, and a core including a store of policy information for respective ones of the terminals, and distribution means operable to provide to the control means associated with one of the terminals the policy information;

wherein the control means is operable to store the policy information together with an indicator of the version of the policy information during periods when the terminal is disconnected from the control means, the control means including checking means for checking the currency of the policy using the indicator of the version of the policy and means for applying the stored policy information to the terminal when the terminal re-connects to the control means if the checking means determines that the stored policy is current.

The indicator may be a sequence number.

The control means may be operable to maintain a unique identifier for the terminal while the terminal is connected thereto, disconnected therefrom and re-connected thereto such that the stored policy can be applied to the terminal.

In an embodiment, when the terminal re-connects to the control means, the core is operable to provide to the control means a current indicator of the version of the policy information for the terminal stored by the core, and wherein the control means is operable to compare the indicator of the version of the policy information stored thereon with the current indicator of the version of the policy information from the core to determine if the stored policy information is current.

In an embodiment, if the stored policy information is not current, the control means is operable to obtain the policy information from the core.

In an embodiment, if the stored policy information is current, the control means is operable to apply the stored policy information to the terminal when the terminal re-connects to the control means.

The current indicator of the version of the policy information for the terminal stored by the core may be provided in a first stage of provision of the policy information to the control means.

The policy information for a terminal may control how the control means provides services to the user of the terminal.

A method of operating a mobile telecommunications network is also provided.

According to another aspect, there may be provided a network entity having stored a first set of Policy information, the information being retrieved from a Policy server and being for a particular user equipment. The Policy information may comprise a sequence number. The network entity may be configured to retrieve a second set of Policy information from a Policy server and compare the sequence number of the second set with the sequence number of the first set. The network entity may be configured to replace the first set with the second set if the sequence number of the second set is greater that the sequence number of the first set. If the sequence number of the second set is less than or equal to the sequence number of the first set, the second set is discarded.

BRIEF DESCRIPTION OF THE DRAWINGS

For a better understanding of the present invention embodiments will now be described by way of example, with reference to the accompanying drawings, in which.

In the figures, like elements are generally designated with the same reference numbers.

DETAILED DESCRIPTION OF EMBODIMENTS OF THE INVENTION

Optional Aspects of the Invention

The present invention provides these aspects, which may be implemented individually or in any combination.

Figure 11:
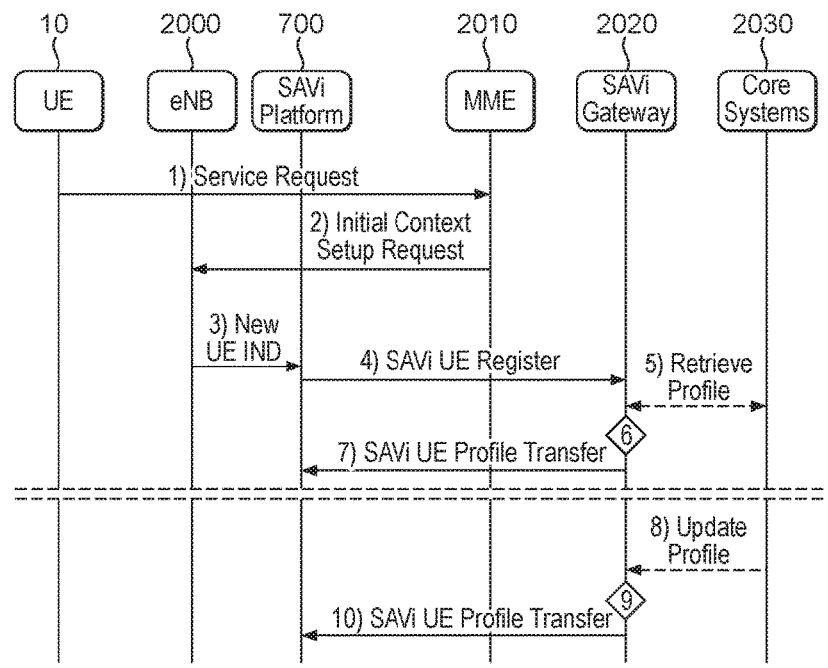
FIG. 11 shows flow for policy installation via SAVi Gateway.

(18.1.2) MME Based Capability Discovery—Support Indication of SAVi Enabled PDN-GW Via MME Signalling flows are described in below with reference to FIG. 11, which shows flow for policy installation via SAVi Gateway.

Policy Installation

In this example, the User Identity is provided to the SAVi Platform by the MME over the S1-c interface.

The following flows occur:

1) When the UE10 is in RRC Idle mode and has data to send, the UE10 sends a Service Request message to the MME 2010 requesting a data service.

2) In line with the normal LTE service activation procedure, the MME 2010 sends the Initial Context Setup Request message to the eNB 2000 including the service parameters for eNB 2000 to correctly handle the UE10. This message is enhanced to include SAVI SUB INFO IE carrying the UE Identifier and other SAVi parameters from the Subscriber Information received from the HSS36, and the SAVI E-RAB INFO IE for each E-RAB with activate Radio Bearers carrying the APN information. The inclusion of the E-RAB INFO IE indicates to the SAVi Platform 700 that the P-GW associated to the E-RAB has been upgraded to support SAVi functionality. The MME 2010 determines the P-GW SAVi support through enhancing the existing capability signalling over S5/8 & S11, or by performing a DNS lookup of the P-GW node, where the DNS response includes capability information.

3) The eNB 2000 informs the SAVi Platform 700 that a UE has been assigned radio resources on a cell controlled by the eNB 2000 and provides the UE Identifier and APN information.

4) The SAVi Platform 700 contacts the SAVi Gateway 2020 and registers interest in the UE10 with the SAVI UE REGISTER message. The SAVi Platform 700 uses the UE Identifier and APN information to reference the UE and Bearer.

5) If the SAVi Gateway 2020 does not already have Profile information for this UE10, it contacts the Core Systems 2030—e.g. the PCRF9 and HSS36—and retrieves the necessary Customer/Bearer information.

6) The SAVi Gateway 2020 stores the UE Profile and a binding of the UE10 and SAVi Platform 700 in a local database.

7) The SAVi Gateway 2020 provides the Policy information for the UE10 to the SAVi Platform 700 in the SAVI UE PROFILE TRANSFER message, where it is stored. The SAVI UE Profile includes a list of Customer Group IDs to which the UE belongs, and each Customer Group would have a configured Profile on the SAVi Platform. The Profile Information may trigger the SAVi Platform to request/pull any Application specific information for the UE stored centrally.

Policy Modification

Later, if the profile is changed within the network for a UE:

8) The Core Systems 2030 inform the SAVi Gateway 2020 of a change in Policy for a UE.

9) The SAVi Gateway 2020 stores the updated profile for the UE10, and looks up which SAVi Platforms 700 have active registrations for a UE10.

10) The SAVi 700 Gateway 2020 sends a SAVI UE PROFILE TRANSFER message to each of the SAVi Platforms 700 including the latest Policy Information for the UE10.

Alternatively, if the change in Profile impacts a large group of UEs and these UEs all belong to the same Customer Group the SAVI GW may send the SAVI GROUP CONFIG TRANSFER message to the SAVi Platform to modify the Profile information associated with the Customer Group. The SAVi Platform responds with the SAVI GROUP CONFIG TRANSFER ACK message confirming that the Profile has been changed.

(12.2.1) The SAVi Platform 700 is made aware that the MME 2010 has been upgraded to support SAVi procedures by the inclusion of SAVi SUB INFO IE within the Initial Context Setup Request message over the S1 interface.

The inclusion of the E-RAB INFO IE into the Initial Context Setup Request message indicates to the SAVi Platform 700 that the P-GW associated to the E-RAB has been upgraded to support SAVi functionality. The MME 2010 determines the P-GW SAVi support through enhancing the existing capability signalling over S5/8 & S11, or by performing a DNS lookup of the P-GW node, where the DNS response includes capability information.

Similar changes are also made to the E-RAB SETUP message, the UE CONTEXT MODIFICATION REQUEST and the HANDOVER REQUEST messages on the S1c interface, with a common implication for the SAVi Platform.

Capability Discovery

This aspect incorporates a means by the MME 2010 to interrogate the capability of the PDN-GW to support SAVi procedures, through DNS lookup, and trigger the procedure to include SAVi related information within 3GPP signalling to the SAVi Platform 700 if the PDN-GW associated with the user bearer supports SAVi. The inclusion or omission of the SAVi policy for the UE may be an implicit indication to the SAVi Platform 700 about whether the PDN-GW supports SAVi functionality.

(18.1.4) Application Signalling/Tunneling over S1s
Section: 3.5, SAVi Gateway

The SAVi Gateway 2020 is a logical function within the architecture which is responsible for connecting with the SAVi Platforms 700 hosted in the Radio Access Network, over a new interface referred to as the S1-s interface.

The SAVi Gateway 2020 is responsible for performing a number of roles:
- Terminating User and Application specific Interfaces to each of the SAVi Platforms and managing the mapping between Customers and SAVi Platforms.
- Acting as a mediator between core systems and the many SAVi Platforms across the access network for the delivery of User and/or Application specific policy to the SAVi Platform.
- Acting as an aggregator of information from SAVi Platforms before the exposure to centrally hosted applications or functions. Potentially involved in the support of mobility 7.3.1.1, Functions of Each Involved Entity The SAVi Applications 741, 742, A communicate with the SAVi Charging functionality on the SAVi Platform 700 using a defined API, to provide both user specific and application specific charging information. The SAVi App is configured at installation with the rules associated with the rights associated with access to the Charging APIs available on the SAVi Platform.

The SAVi Charging functionality on the SAVi Platform aggregates the charging material from multiple applications, packaging these for delivery to the SAVi Gateway 2020. The SAVi Charging functionality on the SAVi Platform may also perform volume counting or event based reporting for specific applications, and for specific users. UE or Application policies define whether any Application Charging functionality related to SAVi applications located on the SAVi Platform is required. The Charging material is passed to the peer SAVi Charging functionality on the SAVi Gateway 2020 which is responsible for unpacking the charging material and interfacing these into the Charging Systems (for example to the GIG).

The SAVi Platform 700 is responsible for the establishment of an S1-s Application associated signalling connection between the SAVi Platform and the SAVi Gateway 2020 when it is initialised, and passing any Charging messages to or from the SAVi Charging functionality to this signalling connection.

The SAVi Gateway 2020 is responsible for establishment of an S1-s Application associated signalling connection with the SAVi Platform, and passing any Charging messages to or from the SAVi Charging functionality hosted on the SAVi Gateway.

12.3.2 Application Registration

Figure 12:
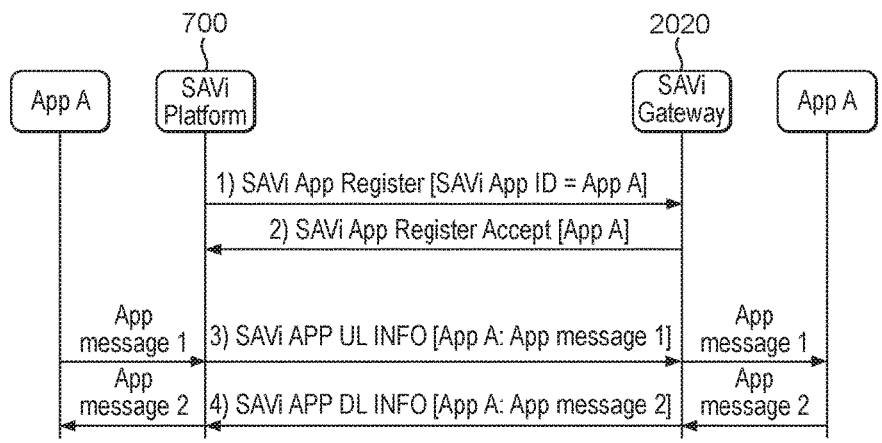
FIG. 12 shows flow registration of an application on a SAVi Gateway.

As shown in FIG. 12, when an application (App A) is initialised on the SAVi Platform 700, the SAVi Platform registers the Application on the SAVi Gateway 2020:

1) The SAVi Platform 700 sends the SAVi App Register message to the SAVi Gateway including the Identifier of the Application.
2) The SAVi Gateway 2020 accepts the registration through the SAVi App Register Accept message and the Application associated S1s connection is established for the Application.
3) The Application A can then pass messages to the SAVi Platform 700 for transmission by the SAVi Platform 700 to the SAVi Gateway 2020. The SAVi Platform 700 packages the message up in the SAVi APP UL INFO message including the identifier of the Application and passes this to the SAVi Gateway 2020 on the Application associated signalling channel on the S1s interface to the SAVi Gateway 2020. The SAVi Gateway 2020 passes this message to the SAVi App hosted locally indicating the identifier of the SAVi Platform where the Application is being hosted.
4) The Application hosted on the SAVi Platform may also send messages to another instance of the Application on a SAVi Platform by passing a message to the SAVi Gateway with an indication of the SAVi Platform where the instance is being hosted. The SAVi Gateway packages the message in the SAVi APP DL INFO message over the S1s interface with the respective SAVi Platform. The SAVi Platform receiving the message forwards this message to the intended application.

It is noted in relation to this aspect that within the 3GPP LTE architecture, the main control interface to the eNB is the S1-c interface, and this interface provides functionality to deliver control information to the SAVi Platform 700, and also to tunnel UE control information running between the MME 2010 & the UE10.

One variant of the SAVi Architecture design involves the inclusion of the SAVi Gateway 2020 and this new entity is responsible for acting as a mediator between the many SAVi Platforms 700 and the central systems of a mobile network. The SAVi Platform 700 and the SAVi Gateway 2020 communicate over an interface defined as the S1s.

Figure 13:
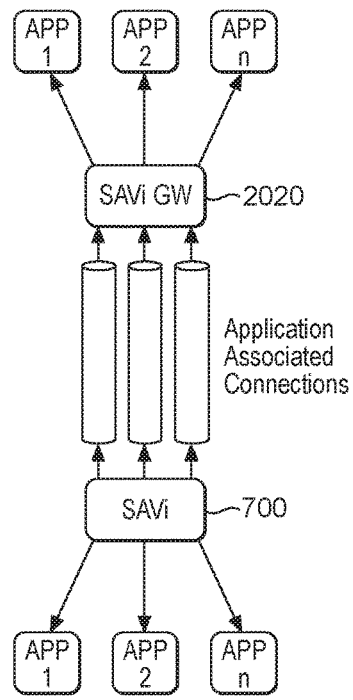
FIG. 13 shows a new communication tunnel established between the SAVi Platform and the Gateway.

As shown in FIG. 13, it is proposed that a new communication tunnel is established between the SAVi Platform 700 and the SAVi Gateway 2020 for any application which requires control-like signalling to a central entity in the network—and therefore the SAVi Platform 700 does not need to expose and manage/protect an external interface for every application hosted on the SAVi Platform 700—and the hosted Application can only communicate control information via the SAVi Gateway 2020.

Similar to the 3GPP architecture, it is proposed that a new Control tunnel (encapsulation mechanism) is established between the SAVi Platform 700 and the SAVi Gateway 2020 for the delivery of Control information to Applications hosted on the SAVi Platform 700. Within the SAVi Gateway 2020 the control information may be handled by the SAVi Gateway 2020, or by a peer application of that hosted on the SAVi Platform 700. The benefit of this solution is that the modules within the SAVi Platform 700 and the SAVi Gateway 2020 which are responsible for the communication/S1s are not required to understand the contents of the Application control information and therefore roadmaps of the different SW modules (i.e. Application & S1s interface) will be independent.

When an Application is initialised the SAVi Platform 700 registers the application with the SAVi Gateway 2020 and an Application associated S1s connection is established—all future traffic between the peer Applications flows transparently over the S1s interface.

(18.1.5) Application Templates—Use of Templates to Control the Service Chaining within the SAVi Platform for a Specific UE Section: 4.3.3.1, Functions of Each Involved Entity The HSS subscriber information may be updated to include some specific SAVi Policy information, which would be passed to the MME 2010 as part of the normal Insert Subscriber Data process from the HSS 36.

The SAVi Policy information identifies the list of the Applications applicable to the UE10, and a template references pre-configured rules in the SAVi Platform 700 which allows the SAVi Platform 700 to build a routing table for packets from this UE10 between the hosted Applications.

4.3.4.2, Functions of Each Involved Entity

The Subscriber records in the HSS 36 are updated to include a new UE identifier, which is passed to the MME 2010 with the existing Subscriber Information when the device attaches to the network.

The MME 2010 is enhanced to include the UE Identifier and APN information associated with the device and its established Radio bearers in existing signalling on the S1-c interface as part of Radio bearer establishment and S1 based handover signalling.

The eNB 2000 indicates to the SAVi Platform 700 that a new UE10 has arrived on a cell controlled by the eNB 2000, and provides the UE Identifier and the APN information for each activated bearer.

The SAVi Platform 700 registers the UE10 and APN information with the SAVi Gateway 2020 that the eNB 2000 is configured to communicate with.

If the SAVi Gateway 2020 does not have policy associated with registered UE10, the SAVi Gateway 2020 retrieves the necessary information from the HSS36 (for static and dynamic SAVi policy elements) and potentially from the PCRF9 (alternative path for dynamic policy elements), stores a binding between the UE10 and the SAVi Platform 700, and provides the policy information to the SAVi Platform 700 where it is stored.

The SAVi UE Policy information identifies the list of the Applications applicable to the UE10, and a template (application service chain) references pre-configured rules in the SAVi Platform 700 which allows the SAVi Platform 700 to build a routing table for packets from this UE between the hosted Applications.

When the UE policy related to SAVi changes in the Core Systems 2030, the SAVi Gateway 2020 is informed. The SAVi Gateway 2020 retrieves a list of which SAVi Platforms 700 have an active registration for this UE10, and distributes the updated policy to them.

The SAVi Platform 700 can host many applications. This aspect is concerned with which route between the applications should a packet take.

Figure 14:
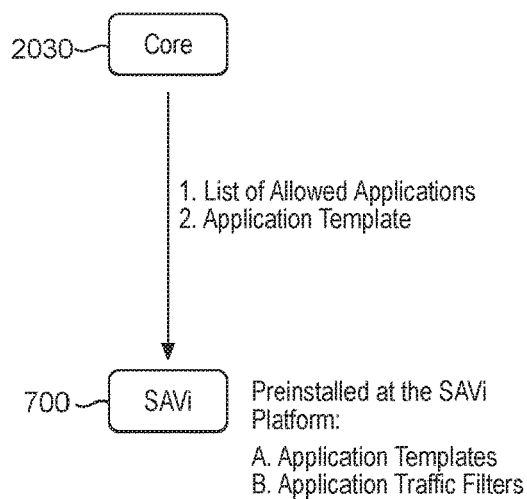
FIG. 14 shows the SAVi Platform configured with Application Templates.

As shown in FIG. 14, it is proposed that the SAVi Platform 700 is configured with Application Templates, defining the order in which applications should be transversed for a specific packet a. Application Template configured at SAVi Platform indicates the order which a packet would pass through the hosted Applications

|  | App 1 | App 2 | App 3 | App n |
| --- | --- | --- | --- | --- |
| Template 1 | 1 | 2 | 4 | 3 |
| Template 2 | 1 | 2 | 3 | 4 |
| Template 3 | 2 | 1 | 3 | 4 |
| Template n | 4 | 3 | 2 | 1 | b. The SAVi Platform may also configured with the Application Traffic Filters indicating which type of traffic are of interest to each application, for example:

|  | Web | Video | DNS |
| --- | --- | --- | --- |
| App 1 | Y | Y | Y |
| App 2 | N | N | Y |
| App 3 | N | Y | N |
| App n | Y | N | Y |

Where the packet type could be described on a port number, protocol, state, etc. basis—example shown above on a service basis for a simple example.

1. The List of Allowed Applications for a UE would be passed as part of the UE profile to the SAVi Platforms:

|  | Allowed |
| --- | --- |
| App 1 | Y |
| App 2 | Y |
| App 3 | N |
| App n | Y |

2. The SAVi UE profile will be updated to include a Template reference/pointer to identify to the SAVi Platform which of the installed Application Templates should be used for the UE.

The SAVi Platform 700 creates the specific routing rules for a UE10 between the hosted Applications from merging the referenced Application Template and the list of the SAVi Applications allowed for the UE as defined in the UE policy/profile; to create the subset of the Application Template for the UE.

For example, if the UE Profile indicates Application Template 3 should be used:

|  | App 1 | App 2 | App 3 | App n |
| --- | --- | --- | --- | --- |
| Template 3 | 2 | 1 | 3 | 4 |
| Apps Allowed | Y | Y | N | Y |
| UE App Order | 2 | 1 | — | 3 |

The SAVi Platform 700 could perform this on a service basis if Application Traffic Filters are present, for example:

|  |  | App 1 | App 2 | App 3 | App n |
|---|---|---|---|---|---|
|  | Template 3 | 2 | 1 | 3 | 4 |
|  | Apps Allowed | Y | Y | N | Y |
|  | Web | Y | N | N | Y |
|  | Video | Y | N | Y | N |
|  | DNS | Y | Y | N | Y |
| UE App | Web | 1 | — | — | 2 |
| Order per | Video | 1 | — | — | — |
| Service | DNS | 2 | 1 | — | 3 |

According to a particularly preferred aspect, there may be provided a method of application or service chaining within a platform providing applications or services in a radio access network. The method comprises receiving a data packet, identifying the type of packet from a predefined set of types, checking the type against a template defining the order in which the packet should pass through a plurality of applications (optionally the template being specific to the respective user equipment associated with the packet) and passing the packet through the applications in the order defined by the template.

(18.1.6) SAVi GW Environment—Structure of the SAVi GW

Section 14.4, SAVi Gateway

A means is required to provide the SAVi Platform with the Customer Identifier and APN information. A solution is for this information to be provided by the SAVi Enhanced MME.

Unique identifiers of Customer and Bearer are required to allow unambiguous communication about a customer or bearer between the SAVi Platform 700 and the SAVi Gateway 2020, e.g. to expose information gathered on the SAVi Platform or to retrieve Policy information for the customer and applications hosted the SAVi Platform.

The SAVi GW can be broken into a number of constituents: S1s-AP, User-plane Services & Application hosting environment, UE Register. An example model for the SAVi Gateway is shown in FIG. 15.

The hosted Apps could support the application-based charging functionality, information retrieval/analytics functionality, content positioning and content retrieval functionality that could be needed on the SAVi Gateway.

Figure 15:
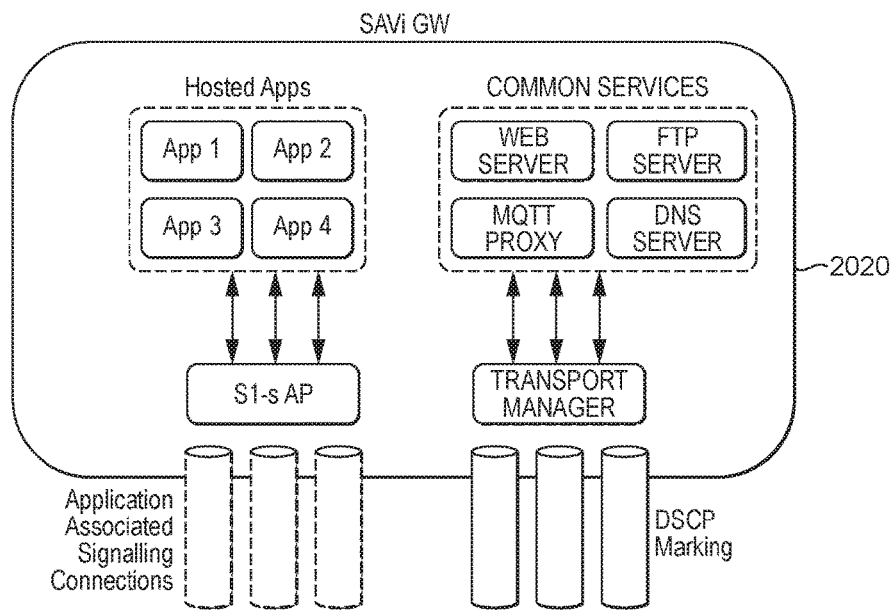
FIG. 15 shows an example model for the SAVi Gateway.

As shown in FIG. 15, the SAVi GW 2020 can be broken into a number of constituents: S1s-AP, Userplane Services & App hosting environment, UE Register.

(18.1.7) Content Pre-Positioning—Structure and Concept of Index Files with Content Restriction Indicators Section: 9.3.1.1, SAVi Gateway Overview The SAVi Gateway 2020 informs the SAVi Platform 700 that new content is available for download to the platform for a specific application by sending a URL of a description file to the SAVi Platform. The SAVi Platform 700 downloads the description file from a File Server 2050. The description file is structured as follows:

| Field | Description |
|---|---|
| Number of Objects | Number of Objectives included in the Description file |
| Object |  |
| URL | Location of the Object/File on the Fileserver |
| Application ID | (Optional) Indicates for which Application the Object is intended. |
| Customer ID | (Optional) Indicates if the content is for a specific User |
| Customer Group ID | (Optional-1 or more instances) Indicates if the content is for a specific User Group(s) |
| Adult Content Indicator | Indicates if Content is subject to Adult Content Restrictions or not |
| Scheduling Info | (Optional) Indicates if there is any specific scheduling information associated with the download |
| Periodicity Info | (Optional) Indicates if the SAVi Platform should re-request the object at any given period, and for how many periods. |
| Download Priority | Which order should the SAVi Platform should request Objects |
| Transport Priority | Informs the SAVi Platform of which DSCP should be set for this Object. |
| <LI Applicability> | Indicates if content is subject to LI or not |

Structure of Description File

The SAVi Platform 700 pulls objects from the File Server in accordance with the Download priority, and the DSCP of the IP packets associated with each HTTP GET requests for an object would be marked in accordance with the Transport Priority parameter included within the description file. The File Server marks downlink packets for delivery to the SAVi Platform 700 in accordance with the DSCP of the received HTTP GET message.

Figure 16:
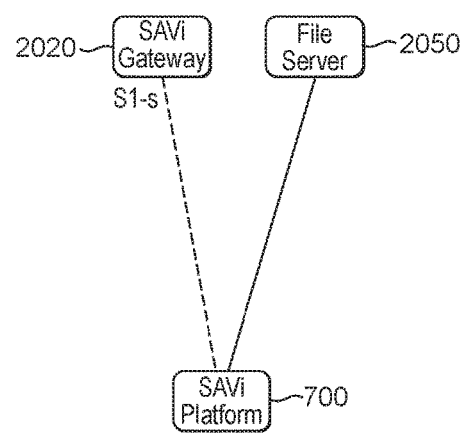
FIG. 16 shows Content Positioning via SAVi Gateway Architecture.

FIG. 16 shows Content Positioning via SAVi Gateway Architecture.

According to this aspect, the introduction of SAVi in the Access Network allows new use cases such as Content Caching. To maximise the user performance benefit the content will need to be available prior to it being requested by the customer.

A scheme is defined whereby a central content cache application, after retrieving information from a central analytics application, creates a content description file listing the content objects which are required to be obtained by the SAVi Platform 700, and against each (one or more of):
  a) the classification of content type
  b) the application for which the content is intended.
  c) the download priority order, and/or download schedule time
  d) a transport priority,
  e) Serving priority for transmission to an end user,
  f) Time to live for content
  g) An indication of whether the objects are for an individual, a customer group (e.g. adults), or all customers,
  h) The linkage between different objects,
  i) The location of each on the central cache.

The SAVi Platform 700 is notified that the Content Description file is ready at a specific location, and the Platform 700 downloads the file.

The SAVi Platform 700 analyses the file and downloads each of the objects according to their priority. The SAVi Platform 700 marks each request in accordance with the Transport priority. The File Server 2050 serves the objects to the SAVi Platform 700, setting the priority of the payload packets to the priority of the request from the SAVi Platform 700.

The SAVi Platform 700 loads these objects into the local cache along with information associated—e.g. the restrictions associated with its use—for instance adult content restrictions.

(18.1.8) Information Retrieval Mediation by SAVi GW—Flows and Logic for Mediation by SAVi GW Section 8, Information Retrieval An important category of applications above is the reporting via APIs, of network events from the SAVi Platform 700 to other systems and applications that may be located in recommendations network or externally. It is possible to define specific interfaces between SAVi Platform 700 and other core and external services but as the number of SAVi applications grows, this should be managed through a single mechanism for simplicity.

The solution proposed here is supported by a SAVi Gateway 2020.

Specific Requirements

The scope of this solution is the transfer of information that is not user traffic. It may be measurement reports, network events, radio KPIs or information calculated or derived based on information at the SAVi Platform 700. Consequently there is no requirement to apply LI to this information.

The solution fulfils the following requirements:

The SAVi Platform 700 shall not have a direct connection to a system hosted outside of the telecommunications network It shall be possible to anonymise any information specific to a customer It is possible for a central/external service to set and update rules about the information to be retrieved from the SAVi Platform 700.

Use Case(s)

1) Radio KPIs provided to central optimisation platform
2) Geo-location information provided for an external enterprise service
3) Per-subscriber KPIs provided to the telecommunication network analytics engine, where it is possible to update the set of rules associated with the KPIs Solution Description SAVi Gateway Overview The SAVi Gateway 2020 is responsible for interfacing with the SAVi Platforms 700 and selectively retrieving information which is being produced by the SAVi Platform 700 or an application hosted on the SAVi Platform 700, and delivering it to other centrally hosted services 2070. This information may be cell, user or application specific.

Figure 17:
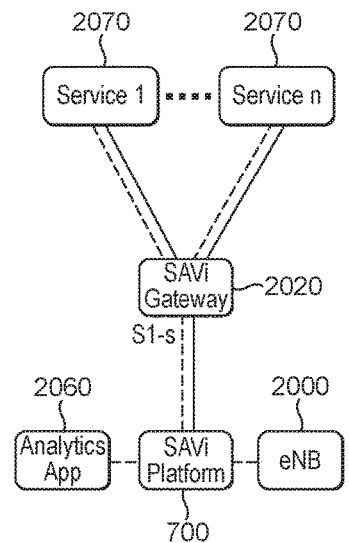
FIG. 17 shows Information Retrieval via SAVi Gateway Architecture.

FIG. 17 shows Information Retrieval via SAVi Gateway Architecture.

Functions of Each Involved Entity

When the Analytics functionality 2060 on the SAVi Platform 700 is initialised the SAVi Platform registers the functionality with the SAVi Gateway 2020 and an S1s Application associated connection is established between the SAVi Platform 700 and the SAVi Gateway 2020. The Platform 700 sends an Analytics Update message which provides a list of Information Topics to which the SAVi Gateway 2020 can later subscribe. The Topics may be about the Cells, about UEs which are connected to the Platform, and Applications which are hosted on the Platform.

When the Analytics functionality 2060 changes the list of Topics, or the list of Applications, the Analytics functionality 2060 sends the Analytics Update message including the new list of Topics that are available. The message is passed to the SAVi Platform 700, and the SAVi Platform 700 passes the message to the SAVi Gateway 2020 in the SAVi APP UL INFO message on the S1s Application Associated connection.

When a UE10 arrives on a cell hosted by an SAVi enhanced eNB 2000, the SAVi Platform 700 is informed over the API. The SAVi Platform 700 registers the existence of the UE10 on the Platform 700 with the SAVi Gateway 2020. The SAVi Gateway 2020 can then subscribe to receive information about the UE10, from the list of available topics that the Platform 700 has been advised of in the Analytics Update message.

The SAVi Gateway 2020 subscribes to topics hosted on the SAVi Platform 700 using the MQTT protocol. The topics would be defined in format "Category"/"Topic"/"Sub-Topic":

| Category | Topic | Sub-Topic |
|---|---|---|
| "C"-Cell | Cell ID | Load, User Population, . . . |
| "U"-User | User Reference | Radio Quality, Throughput, . . . |
| "G"-User Group | Group Type (e.g. Smartphones, iPhone5) | Average Radio Quality, Average Throughput, Average Dropped Call Rate, . . . |
| "A"-SAVi Apps | Application ID | Resource Usage, Application specific Topics |
| "S"-SAVi System | System Item | Memory Usage, Processing Load, . . |

Subscribe topics on the SAVi Platform for information retrieval

Any application on the SAVi Platform 700 which wishes to publish data outside of the SAVi Platform 700 would communicate with the analytics functionality 2060 hosted on each SAVi Platform 700 and request that its Topic is made available outside the SAVi Platform 700. If the SAVi Application is authorised to export information the analytics functionality would contact the SAVi Gateway 2020 to advertise the availability of the Topic on behalf of the SAVi Application. All subscriptions to the Topic and all information subsequently flowing on the Topic from the SAVi Application, is mediated through the analytics functionality on the SAVi Platform 700.

Application to Use Case(s)

Figure 18:
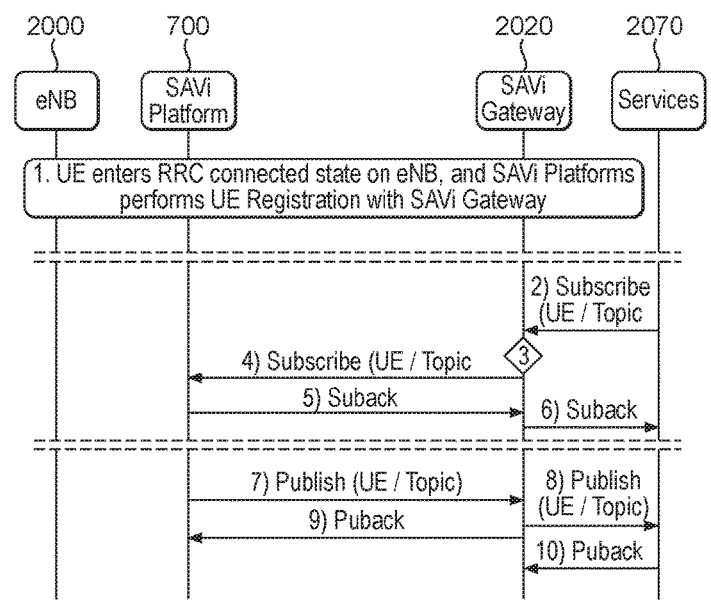
FIG. 18 shows Flow for information retrieval via SAVi Gateway.

FIG. 18 shows Flow for information retrieval via SAVi Gateway

5) The Analytics functionality on the SAVi Platform 700 accepts the Subscription with the Suback message.
6) The SAVi Gateway 2020 in turn accepts the Subscription of the Service with the Suback message.
7) When new information is available for the subscription, the Analytics functionality 2060 on the SAVi Platform 700 sends the Publish message.
8) The Analytics functionality in the SAVi Gateway 2020 distributes the Published data to each Service with an active subscription for this topic using the Publish message.
9) The Analytics functionality in the SAVi Gateway 2020 acknowledges the Publish message with the Puback message.
10) The Service in turn acknowledges the Publish message with the Puback message.

Requests to Suppliers

| ID | CORE-9-01 | Requirement Area | Information retrieval | |
|---|---|---|---|---|
| Requirement | Information retrieval solution shall be supported as specified in section 0 via SAVi Gateway using S1-s interface specified | | | |
| Impacted nodes | PDN-GW | N | S-GW | N |
| | SAVi-GW | Y | MME | N |
| | eNB | N | SAVi Platform | Y |
| Vendor Response | | | | |
| Compliance (FC/PC/NC) | | Availability Date | | Product Release |

When the Analytics functionality is initialised on the SAVi Platform 700, the SAVi Platform 700 registers the functionality with the SAVi Gateway 2020 and provides a list of services/topics to which the Analytics functionality can provide information—if this list changes the SAVi Platform 700 updates the SAVi Gateway 2020.

1) When a UE10 has an established RRC connection with the eNB 2000, the eNB 2000 provides the necessary information about the UE10 for the SAVi Platform 700 to initiate the UE Registration procedure with the SAVi Gateway 2020. The SAVi Gateway maintains a list of which UEs are registered through which SAVi Platforms 700.
2) When a Service requires 2070 information about a UE (or other topic), the Service sends 2070 a MQTT Subscribe message to the SAVi Gateway 2020 requesting specific information about a UE, it subscribes for an Information service from the Analytics functionality within the SAVi Gateway 2020.
3) The Analytics functionality within the SAVi Gateway 2020 interrogates a local database to determine which SAVi Platform 700 is current serving the UE10 and which Information is already being requested for this UE10. If suitable information is already available, the Analytics functionality in the SAVi Gateway 2020 fulfils the request with this information.
4) If the Analytics functionality in the SAVi Gateway 2020 does not have the necessary information, the SAVi Gateway 2020 Subscribes for a UE specific Topic available from the Analytics functionality 2060 hosted on the SAVi Platform 700 by sending the MQTT Subscribe message to the SAVi Platform 700.

According to this aspect, it is noted that the introduction of the SAVi Platform 700 at the eNB 2000 allows information to be gathered from Radio, network functions and hosted applications to improve customer experience or enable new services.

To avoid scalability issues on the SAVi Platform 700 and the system, it is proposed that a mediator function is included within the SAVi Gateway 2020 to manage the interactions with the SAVi Platform 700.

The role of the mediator function includes one or more of the following:
a) To sit in between remote services 2070 and SAVi Platforms 700, hiding the need for Remote services to discover the SAVi Platform 700 for a specific UE10.
b) Subscription management of Services for specific topics, avoiding SAVi Platform 700 having to manage.
c) Caching of uplink published data for specific topics—to data to be immediately served to a Service subscribing for a Topic—without requiring the SAVi Platform 700 to re-send or wait for the next change/period occurrence.
d) Aggregation of published data to create different average periods/trends etc
e) Selection of Reported Topics/Topic granularity to ensure SAVi Platform 700 processing is minimised—Mediator selects the lowest common denominator of Topic to be provided.
f) Anonymising data when required
(18.1.9) Charging Consolidation on the SAVi Platform
Section: 7.3.1.1 (See Above)
Section 7.3.1.2, Application to Use Case(s)

Figure 19:
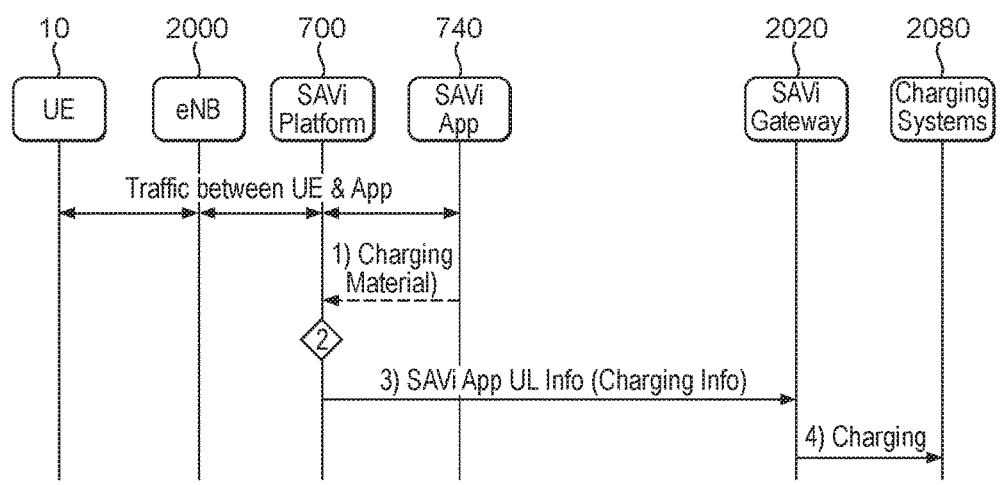
FIG. 19 shows Flow for SAVi application charging via SAVi Gateway.

FIG. 19 shows Flow for SAVi application charging via SAVi Gateway

If he UE10 is accessing content hosted by a 3$^{rd}$ Party Application 740 on the SAVi Platform 700:
1) (For other use cases) The SAVi App 700 provides Charging material to the SAVi Charging functionality of the SAVi Platform 700 over the defined SAVi Charging API.
2) (For this use case) The SAVi Charging functionality of the SAVi Platform 700 is responsible for generating CDRs associated with volume or events. The SAVi Charging functionality aggregates this material with the Charging material received from different applications.
3) The Charging material is placed into a Charging Info message which is carried in the SAVi App UL Info message on the signalling connection associated with the SAVi Charging function on the S1s interface.
4) The SAVi Gateway 2020 retrieves the message from the Application associated Signalling Connection and passes to the SAVi Charging functionality, which unpacks the Charging material from the Charging Info message and interfaces this information to the Charging systems 2080.

In this use case, the charging data is required to be zero rated by existing P-GW charging mechanisms, the Copy functionality of the SAVi Platform 700 includes additional information into the SAVi Copy Data packet, either an Application ID, an Event ID or an explicit indication that Zero-rate charging should be applied. The Application ID or Event ID would correspond to a specific Charging rule defined at the P-GW for this UE.

According to this aspect, it is envisaged there being multiple sources of charging records within the SAVi Platform 700, e.g. different application instances, and volume/event information generated by the Charging functionality of the SAVi Platform.

A Charging consolidation function is introduced which is responsible for aggregating information received from the hosted applications and the Charging functionality of the platform and delivering it to the Charging function 2080 in the SAVi Gateway 2070.

When an application is installed, the application is accompanied by a configuration file In the SAVi GW 2020 there is another Charging consolidation function—which is responsible for gathering the data from multiple SAVi Platforms—providing a consolidated view to the charging systems.

(18.1.10) Control of P-GW Charging by SAVi Platform

For SAVi it has been proposed that charging is maintained on the P-GW, by re-using the existing GTP-U tunnel of the UE between the eNB and P-GW via the S-GW.

It is proposed that additional/complementary charging schemes are added to the SAVi Platform 700, in which case there is the challenge how to synchronise the charging between the P-GW and the SAVi App 740.

The charging rules for a customer are based on detecting the destination address of the data stream, and zero rating (where required) instead charging on Event, It is proposed that the COPY data passed to the P-GW is marked with:
a) Application/Event IDs, to allow the P-GW to process the COPY data and link to specific charging rules for the customer or Application—i.e. if subscribed then an event would be charged rather than data volume.
b) Application/Event IDs, to allow the P-GW to process the COPY data and link to generate new Charging Records for Applications rather than UE. These Charging Records would be used by the Charging systems to create bills for the Application provider; and zero rate the customer traffic.
c) Specific indication that specific traffic/IP packets should be zero rated by the P-GW.

The Charging functionality on the SAVi Platform 700 is responsible for creating parallel charging records for either: events or volume and for either users or applications and the Charging systems would be responsible for aggregating.

18.1.11 Multiple S1-u Uplink/Downlink—and Associated Filtering Rules in S-GW

Within the 3GPP system the S-GW function sits on the User plane connection between the eNB 2000 and the P-GW and is responsible for hiding the mobility events of the UE from the P-GW.

The user plane connection between the S-GW and the eNB 2000 is made up of an uplink and a downlink GTP-U tunnel, where the Tunnel Endpoint ID of the S-GW acts as the pivot point at mobility events. Only 1 uplink and 1 downlink tunnel exists for the UE/Bearer at any one time.

When a UE moves between eNBs when in RRC connected state the new eNB is provided with the IP address of the S-GW as well as the TEID, and any uplink traffic received from the UE by the new eNB can be sent directly to the S-GW without any explicit signalling. In the downlink direction the tunnel is switched from old eNB to new eNB when the S-GW is informed by the MME to switch the end point of the tunnel. The S-GW marks the last downlink packet sent to the Old eNB with an end-point marker.

When SAVi is introduced, and an application hosted on the SAVi platform 700 gathers packets from the UE10 at a quicker rate than the packets being sent to the P-GW, some packets would still be stored on the SAVi Platform 700 if the UE is handed over to another cell.

A) Separation of RRc/S1c & S1-u Connections, Alternative Release Procedures Via MME, UL GTP-U End Marker It is therefore proposed to allow multiple connections for the UE/bearer with the S-GW, the connection from the new eNB; and as well maintaining the connection to the old eNB.

In the uplink, the S-GW is required to map multiple uplink GTP-U tunnels from multiple eNBs on to a single GTP-U tunnel to the P-GW.

B) In the downlink, it is proposed that a filtering function is included on the S-GW to select which downlink packets are sent on the GTP-U connection to the old eNB, and which are sent on the connection to the new eNB.

18.1.12 SAVi Network Mobility—Repository of Application Mobility Information in SAVi GW Section 11.2.3, Solution Description Overview When a UE moves between cells in the network (hosted by different RAN nodes), the 3GPP user and control paths may no longer pass through the previous SAVi Platform where content or services are hosted or optimised.

There are two main scenarios we need to consider for Mobility, between SAVi enabled eNBs, and between SAVi enabled and non-SAVi enabled RAN nodes and the architectures will be described separately for simplicity.

Figure 20:
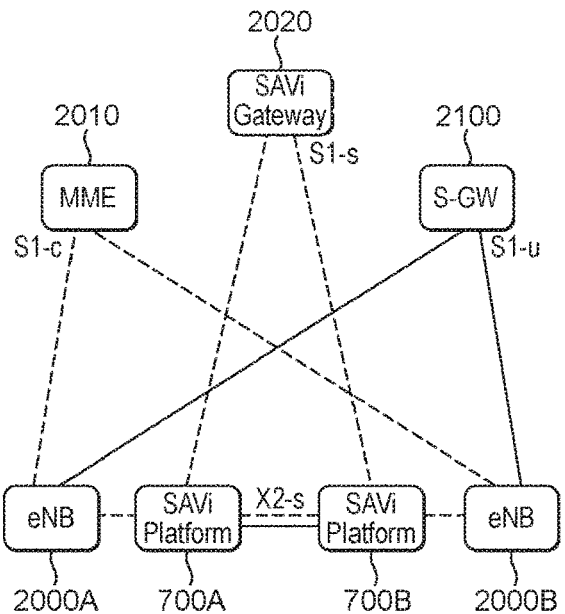
FIG. 20 shows Architecture Diagram for SAVi-to-SAVi Mobility.

FIG. 20 shows Architecture Diagram for SAVi-to-SAVi Mobility

Figure 21:
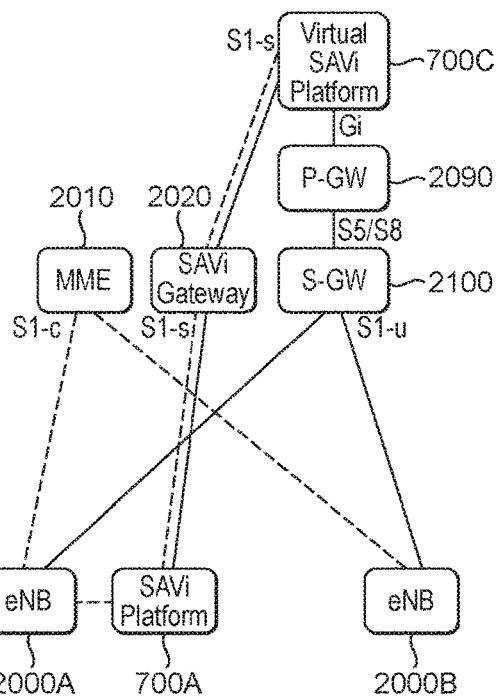
FIG. 21 shows Architecture Diagram for SAVi-to-non-SAVi Mobility.

FIG. 21 shows Architecture Diagram for SAVi-to-non-SAVi Mobility

Functions of Each Involved Entity

When a UE commences use of an Application hosted on the SAVi Platform, where the application requires service continuity following a mobility event to another radio site, the Source SAVi Platform 700A is responsible for registering the Application use with the SAVi Gateway 2020 and providing an associated traffic template. The Traffic template identifies the IP addresses, port numbers, protocols etc, which can be used to identify future traffic associated with an application; and the details of the Source SAVi Platform 700A which is hosting the Application.

For the SAVi to SAVi mobility, the Target SAVi Platform 700B is responsible for registering with the SAVi Gateway 2020 and retrieving the list of applications which currently registered for mobility support, and their associated traffic templates.

For the SAVi to non-SAVi mobility, a centrally hosted Virtual SAVi Platform 700C is responsible for replicating some of the services that the Source SAVi Platform 700A is delivering to the customer, ensuring service continuity when the UE leaves a SAVi area. As the Virtual SAVi Platform is also responsible for registering with the SAVi Gateway 2020 on behalf a UE, and retrieving the list of applications which currently registered for mobility support, and their associated traffic templates. The registration of the UE by the Virtual SAVi Platform 700C would be triggered by the first uplink packet sent by the UE by the P-GW 2090 for any service—requiring the Virtual SAVi Platform to determine the UE Customer Identifier from the IP address and the Gi LAN from which the UE packet was received.

Whilst an Application remains registered for mobility, any future Target SAVi Platform 700B is responsible for establishing a connection to the Source SAVi Platform 700A hosting the application, and bridging UE traffic matching the Traffic template. For the case where the UE moves to the Virtual SAVi Platform hosted centrally, the routing of packets on a transport level may be via the SAVi Gateway 2020.

When the Application no longer requires mobility, or the Traffic template changes, the hosting (Source) SAVi Platform 700A informs the SAVi Gateway, which informs other Registered (Target) SAVi Platforms 700B.

Application to Use Case(s)

Figure 22:
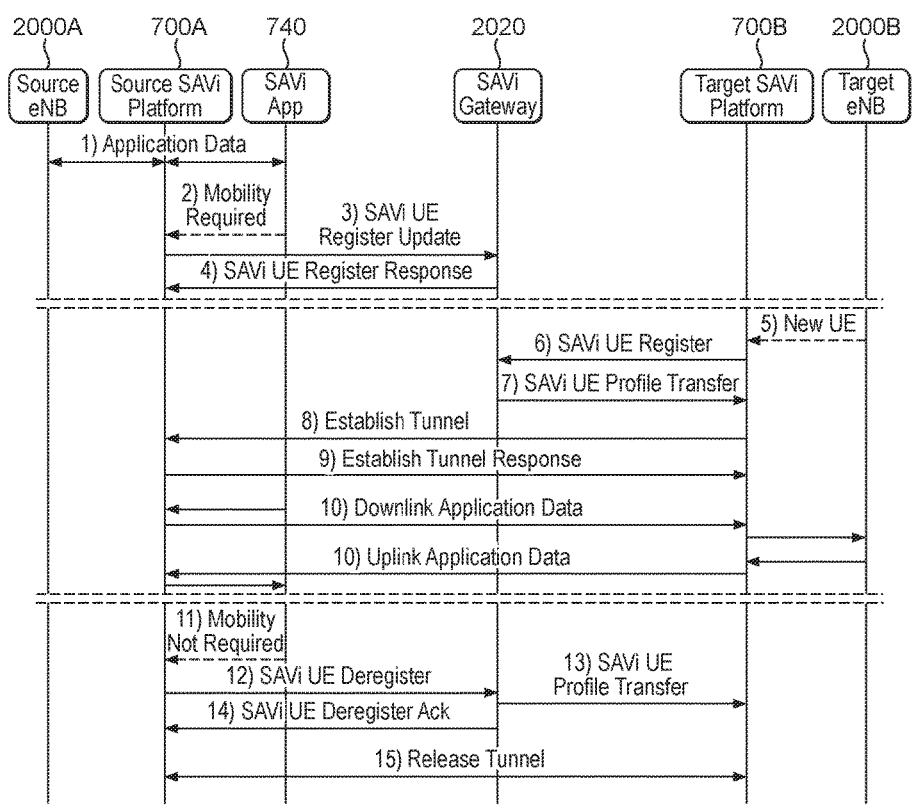
FIG. 22 shows flow for SAVi network layer mobility.

FIG. 22 shows flow for SAVi network layer mobility. The following flows occur:
1) A UE starts using an application hosted on the Source SAVi Platform 700A.
2) Either, the SAVi Application indicates to the Source SAVi Platform 700A that Mobility is required for the session underway between the App and the UE (i.e. based on knowledge of the content, the UE historic behaviour);

Or, the Source SAVi Platform 700A implicitly knows that the mobility is required for the UE session, e.g. the SAVi Platform is configured to provide mobility support for any session to a specific application.
3) The Source SAVi Platform 700A updates the Registration of the UE at the SAVi Gateway 2020 through the SAVI UE REGISTER UPDATE message, to indicate that the UE has an on-going session with a specific application which requires SAVi mobility support. This message provides the specifics of the application traffic template to allow a future (Target) SAVi Platform 700B to identify the traffic, as well as the details of the (Source) SAVi Platform 700A hosting the Application. The registering of the Application by the (Source) SAVi Platform 700A may be dependent on the mobility state of the UE and relative position of the UE to the cell boundary.
4) The SAVi Gateway 2020 acknowledges the Registration with the SAVi UE REGISTER UPDATE RESPONSE message.

At a later time, if the UE moves to a new cell not controlled by the Source SAVi Platform 700:
5) The Target SAVi Platform 700B is made aware that a new UE has arrived, and is provided the basic details of the UE. This may be from the UE (as depicted) or if this is the Virtual SAVi Platform 700C, it may be the flow of traffic from a UE to a specific IP address.
6) The Target SAVi Platform 700B registers the arrival of the UE with the SAVI UE REGISTER message.
7) The SAVi Gateway 2020 accepts the Registration with the SAVI UE PROFILE TRANSFER message which includes the SAVi UE Profile. This profile indicates that there is an Active Application Registration for the UE on another (Source) SAVi Platform 700A, and includes the Traffic Template and information about how to contact the (Source) SAVi Platform 700A hosting the application (from step 3).
8) The Target SAVi Platform 700B establishes a tunnel to the Source SAVi Platform 700B.
9) The Source SAVi Platform 700A responds to the establishment, and a bi-directional tunnel is established between the two SAVi Platforms.
10) Downlink or Uplink UE traffic associated with the Application can flow between the SAVi Platforms. The Target SAVi Platform 700B identifies Uplink traffic to be sent to the Source SAVi Platform 700A by use of the Traffic template.

At a Later time, when the Application no longer requires mobility for the session:
11) The SAVi App 740 indicates to the Source SAVi Platform 700B that Mobility is no longer required.
12) The Source SAVi Platform 700A de-registers the Application with the SAVi Gateway 2020 with the SAVI UE REGISTER UPDATE message. If this is the last Application which requires Mobility support, the SAVi Platform sends the SAVI UE DEREGISTER message.
13) The SAVi Gateway 2020 informs the current (Target) SAVi Platform 700B that Mobility is no longer required for this Application for the UE by Updating the SAVI UE profile of the UE through the SAVI UE PROFILE TRANSFER message.
14) The SAVi Gateway 2020 acknowledges the change in Registration to the Source SAVi Platform 700A.
15) The Tunnel between the SAVi Platforms is released. The Tunnel between the SAVi Platforms would also be released when the UE performs a subsequent handover to another eNB, or if the RRC connection for the UE released.

For the scenario where the UE releases the RRC connection during an Application session, and re-establishes the RRC connection on another eNB—the same mechanism would apply—the instance of the Application could remain on the SAVi Platform for a number of minutes before inactivity triggers the instance of the Application to be purged by the SAVi Platform. When the application instance is purged the SAVi Platform hosting the Application, the SAVi Platform would de-register the requirement for Application mobility support with the SAVi Gateway for this User.

In accordance with this aspect, it is noted that within the 3GPP system, radio information is passed between the Source eNB 2000A and the target eNB 2000B at handover via the MME 2010 or directly between eNBs.

With the inclusion of SAVi, Applications are added on the data path between the UE and the P-GW 2090. When the UE changes cell hosted by different eNBs, the user's data path no longer passes through the location where the application is hosted.

A means is required to allow the application to access the data path of the UE on a different site.

It is proposed that the SAVi Platform 700B on the Target eNB 2000B is responsible for tapping into the data path and extracting or injecting traffic related to the application.

The SAVi Platform 700B on the Target eNB 2000B requires information to allow it to:
  A. Create a tunnel to the SAVi Platform 700A hosting the Application 740.
  B. Identify which packets received from the UE should be sent on the tunnel to the Application 740.

Identification of packets may be completed by sending the Application ID associated with the application, which implicitly informs the target SAVi Platform 700B of the Application filtering rules.

To avoid the race condition at handover the proposal is that the rules are available prior to the first uplink packet is received on the new SAVi Platform 700B.

The Handover procedure between source and target eNB is used as a trigger for the SAVi Platform 700B on the new eNB 2000B to register the UE with the SAVi Gateway 2020 and retrieve the UE profile.

It is proposed that the UE profile stored at the SAVi Gateway 2020 is updated by the SAVi Platform 700A on the source eNB 2000A when the UE initiates an application which requires mobility support, and the application cannot be relocated to the new SAVi Platform 700B. The SAVi Gateway 2020 is provided with the filtering rules associated with the application such that traffic associated with the specific application can be identified by the new Enb 2000B.

When the application has finished the SAVi Platform 700A de-registers the UE from the SAVi Gateway 2020, which in turn informs the new SAVi Platform 700B, which disconnects the tunnel and discards the routing rules/filter. Any future packets are handled in the normal way on the SAVi platform 700.

18.1.13 SAVi Network Mobility—X2 Based Signalling

Within the 3GPP system, radio information is passed between the Source eNB 2000A and the target eNB 2000B at handover via the MME 2010 or directly between eNBs.

With the inclusion of SAVi, Applications are added on the data path between the UE and the P-GW 2090. When the UE changes cell hosted by different eNBs, the user's data path no longer passes through the location where the application is hosted.

A means is required to allow the application to access the data path of the UE on a different site.

It is proposed that the SAVi Platform 700B on the Target eNB 2000B is responsible for tapping into the data path and extracting or injecting traffic related to the application.

The SAVi Platform 700B on the Target eNB 2000B requires information to allow it to:
  A. Create a tunnel to the SAVi Platform 700A hosting the Application
  B. Identify which packets received from the UE should be sent on the tunnel to the Application Identification of packets may be completed by sending the Application ID associated with the application, which implicitly informs the target SAVi Platform 700B of the Application filtering rules.

It is proposed that this information is appended to the Handover signalling which is passed over the S1 or X2 interfaces. The Target SAVi Platform 700B as part of the handover preparation phase can establish the SAVi Platform to SAVi Platform tunnel to the Source Platform. Once the Handover is executed the Source eNB 2000A informs the Source SAVi Platform 700A that the handover has been triggered and future downlink packets are routed on the SAVi to SAVi tunnel.

The Target SAVi Platform 700B will invoke the uplink filtering rules as soon as the UE arrives on the target cell; routing the selected packets back to the Source SAVi Platform 700A.

a) X2 Based Alternative

An alternative is to handle the encapsulation of the Application specific packets over an extension to the X2 interface. In this case the Source SAVi Platform 700A informs the Source eNB 2000A of the SAVi Mobility information (Application IDs, and packet filtering rules associated with the Application).

The Source eNB 2000A includes the Application in the Handover messages to the Target eNB 2000B and the interface between the eNB platforms is used to route packets associated with the Application. This interface may be based on GTP-U. This requires the eNB platforms to perform the filtering and routing in the uplink and downlink.

When an Application no longer requires the support of Mobility between eNBs, the Source eNB 2000A marks a downlink packet which is passed to the Target Enb 2000B, where its significance is understood and the target eNB releases the connection for this application.

If the UE is handed over again from the target eNB 2000B to a new target eNB; the first target is responsible for forwarding the information received from the source eNB 2000A (about the Application) onto the new target eNB; and the procedure to establish a connection between the new target eNB and the source is initiated.

(18.1.14) Mobility—Passing App/TCP State Machine Context Between SAVi Platforms During Mobility, Including Application Negotiation Between Source & Target eNB
Section 11.3.4, Application Context Transfer
Overview When a UE10 transitions between two eNBs, the state machine (or instance) of the Applications on the source SAVi Platform 700A are packaged up and passed to the target SAVi Platform 700B, where a copy of the same Applications are initialised with the received state machines/information.

The delivery of the state machine/information as described below is performed through extensions to existing 3GPP signalling procedures over the X2 interface; however they could be provided through a new signalling scheme between the SAVi Platforms, or via the SAVi Gateway 2020.

The main challenge for this approach is that the design of the Application would need to incorporate the concept of Application Context Transfer, and may be only applicable to simpler applications.

Use Case(s)
  1) A basic web service hosted on the SAVi Platform is gathering information from a User about a new subscription, and the transactions are stateful. When the User moves to a new SAVi Platform during the session the session is required to continue seamlessly.

Figure 23:
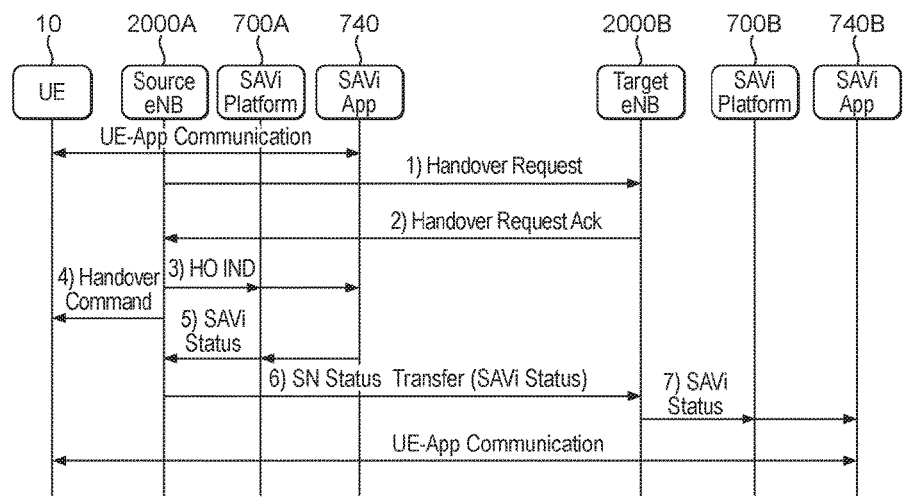
FIG. 23 shows application context transfer flow.

Application to Use Case(s)
FIG. 23 shows application context transfer flow:

When the UE10 is communicating with a service/Application 740 hosted on a SAVi Platform 700A at the Enb 2000A, and the UE moves to a location where the eNB needs to trigger a Handover procedure with a neighbour Enb 2000B:
  1) The Source eNB 2000A sends a Handover Request message to the Target eNB to request that resources are reserved on the Target Enb 2000B for the UE10. This message is updated to include the Basic SAVi policy including the customer identifier, the APN information, and an indication of whether SAVi is allowed for this customer. It could be further enhanced to include a container with the list of SAVi Applications or content which the customer is currently using—provided by the SAVi Platform.

2) The Target Enb 2000B accepts the handover request and send the Radio configuration information that the UE10 should use on the target Enb 2000B after performing handover together with an indication that the Application or Content being used by the customer are available on the SAVi Platform 700B of the Target Enb 2000b.
3) The Source eNB 2000A indicates to the SAVi Platform 700A that the Handover Command is about to be sent to a specific UE, allowing the SAVi Platform 700A to freeze the state of the Applications/Content for the UE which are available on the Target Enb 2000B, and package the state/context information. Applications not available at the Target eNB 2000B may be supported through SAVi Network Layer Mobility solution.
4) The Source eNB 2000A sends the Handover Command to the UE10 providing the Radio configuration to be used on the cell of the Target Enb 2000B.
5) The SAVi Platform 700A provides the Status/Context information of the specific applications which require mobility support to the Source Enb 2000b.
6) The Source eNB 2000A sends the SN Status Transfer message (this requires that the SN Status Transfer message is triggered for SAVi flow, rather than just for RLC Acknowledged flow) to the Target eNB 2000B including a container with the SAVi Status/Context information.
7) The Target eNB 2000B forwards this information to the SAVi Platform 700B, which initialises the Applications 740B for the UE10 with the SAVi Status/Context information.

If the Handover is completed successfully the Source eNB 2000A informs the associated SAVi Platform 700A which can remove any stored information about the UE10 which is no longer required. If the Handover fails, the Source eNB 2000A informs the SAVi Platform 700A and the Applications for the UE10 can be re-initialised.

For Applications which require the Application Instance/Context to be relocated as part of the handover procedure, in the scenario where the RRC connection of the UE is released temporarily during an Application session, the Source eNB 2000A transfers the Application Instance/Context to a central location. When the UE10 appears on a new eNB 2000B and re-establishes the RRC connection, the SAVi Platform 700B at the new Enb 2000B is triggered in the UE10 profile to download the centrally stored copy of the Application Instance/Context, for initialisation on the SAVi Platform 700B.

According to this aspect, it is noted that, within the 3GPP system, when a UE10 is using acknowledged mode or VoIP connection, there is a state machine in the eNB to manage the state of the RLC/PDCP protocol between the eNB & the UE; as the RoHC (IP Header compression).

When there is a mobility event, which causes the eNB of the UE to change, the state machine in the Source eNB 2000A is transferred to the Target Enb 2000B, and re-initialised.

For SAVi, a similar concept is required, but instead of being for the radio tunnel/protocols running between the UE and eNB; it is required for the Transport connection (e.g. TCP) and the Application itself (i.e. the higher layers of the protocol stack.)

This state machine of the Application Transport, and the Application itself would be frozen at the Source Enb 2000A, packaged up, and passed to the Target eNB 2000B as part of Handover signalling; where it is re-initialised. The freezing of the state machine may be implemented by packaging up the memory used by the instance of the application, and the memory of the target eNB 2000B could be initialised with this packaged information.

For complicated Applications/contexts, the Source eNB 2000A may package up the Information and store it on a local file server; and the Source eNB 2000B only includes the URL of this packaged state machine information in the Handover messages. When the Target eNB 2000B receives the Handover messaging with the URL, the Target opens a connection to the Source and retrieves the packaged information.

(18.1.15) "Dormant" Applications—Central or Local Storage of Application Information/Context; when the UE Releases RRC Connection When Applications are hosted centrally within a network, the connection state of the UE (e.g. RRC) and the mobility state of the UE are hidden from the Application. When the RRC connection is re-established following a mobility event, the UE can continue communications with application as though the Radio connection had not been released, nor had there been a change in the data path of the UE-APP communication channel.

Hosting an Application in the RAN through SAVi means that when the UE re-establishes the Radio connection on a new cell, the SAVi Platform is no longer on the data path of the UE and therefore communications between the UE and the Application cannot occur.

The new SAVi Platform on the customer's data path can support any new requests/interactions with the UE, but it will not have any information about the on-going communication which occurred recently (to the instance of the Application on the old data path).

It is therefore proposed that when a RRC connection of device is released when an Application hosted on the SAVi platform is active for the UE, the Application context information is stored locally in a Register, and a copy is also passed centrally to be stored in a central register.

When the Application context information is retrieved from the central store the Central store informs the old SAVi Platform and the context is purged from the local store. When the UE next has an RRC connection on this eNB the associated SAVi Platform downloads any centrally stored context information from the Central Register to all the applications on the platform.

Diagrams of the Steps

---

Figure 1:
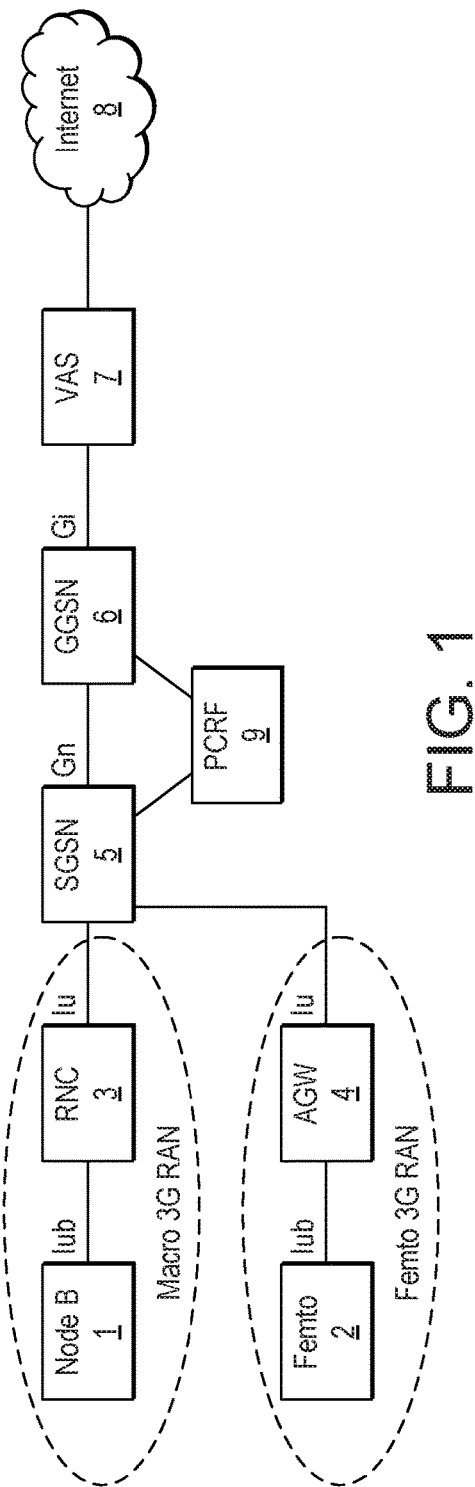
FIGS. 1 to 10 show known "platform" arrangements, as described above.
Figure 24A:
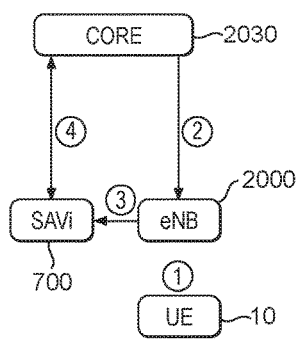
FIGS. 24A-C show central or local storage of application information/context, when the UE releases RRC connection.

FIG. 24A    1. UE10 enters a cell hosted by an eNB 2000 and establishes RRC connection; the UE10 uses a Temporary Mobile ID to identify itself to the core network 2030 (e.g. the GUTI).

Figure 2:
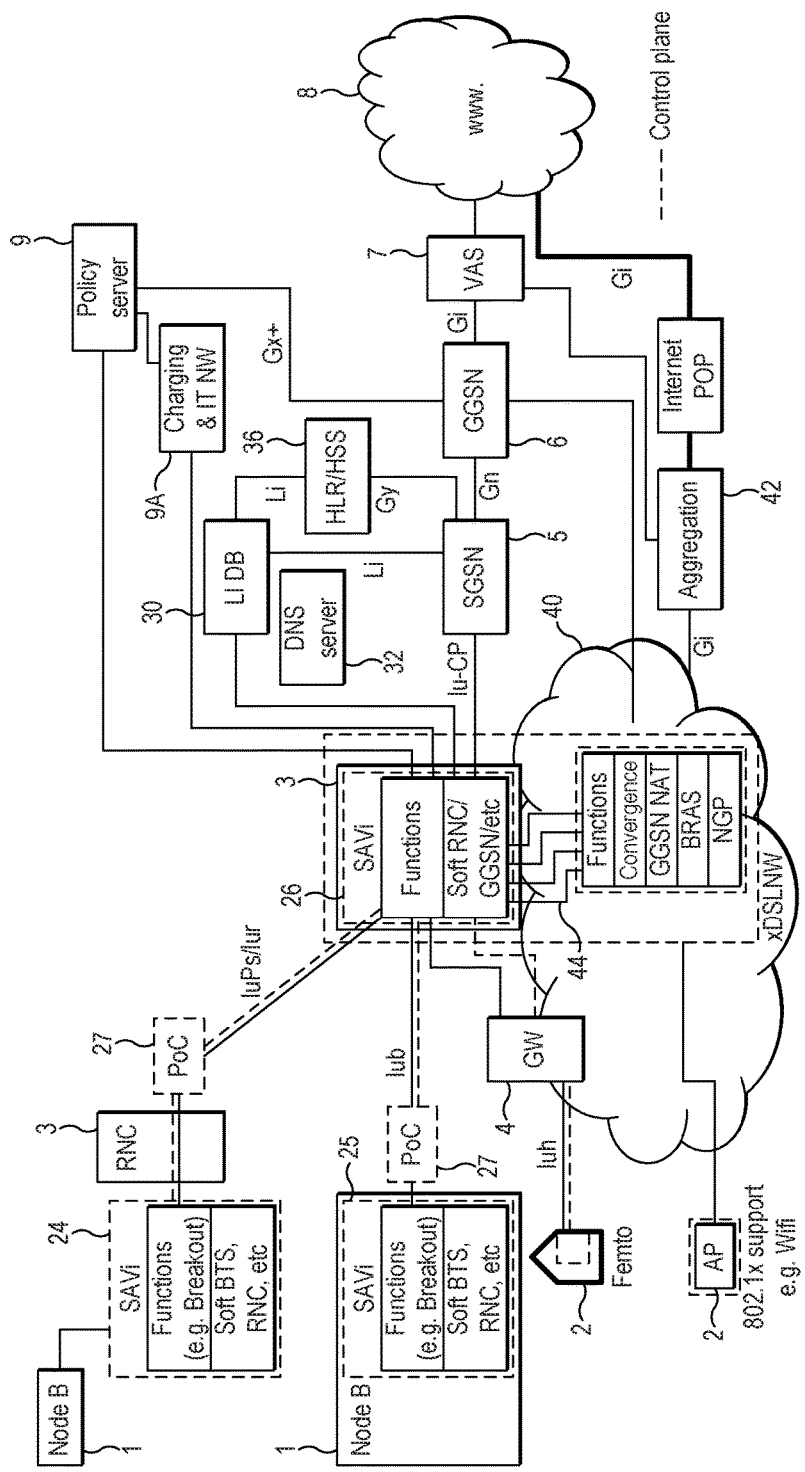
Figure 3:
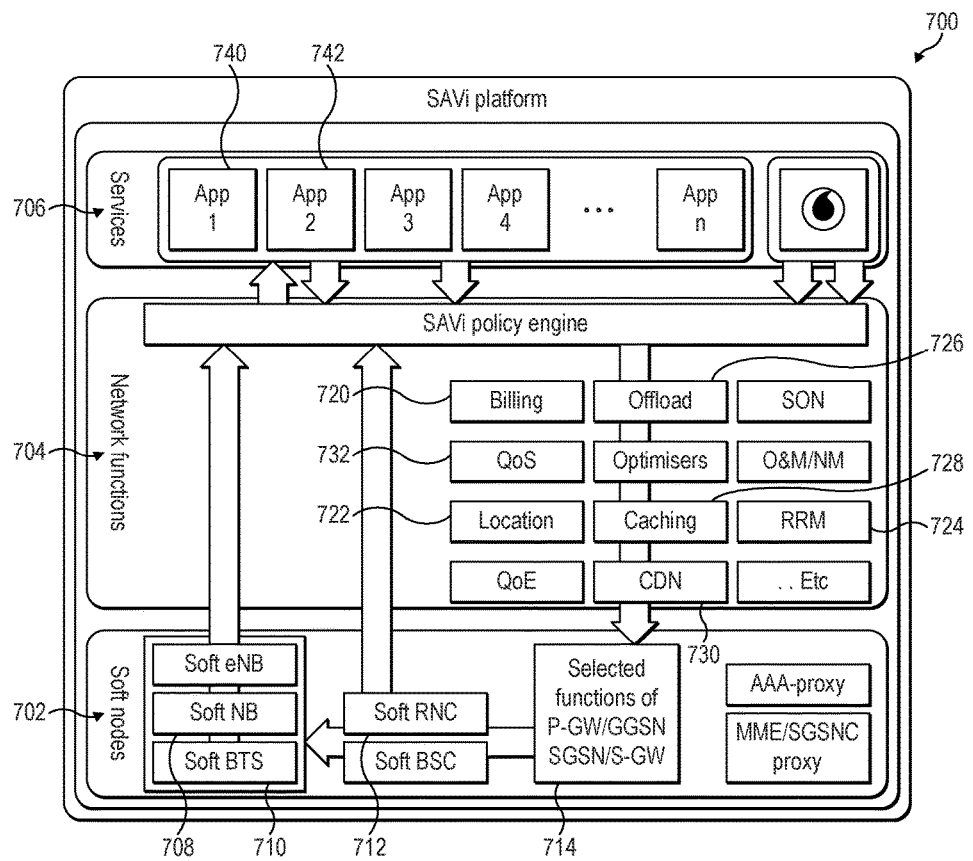
Figure 4:
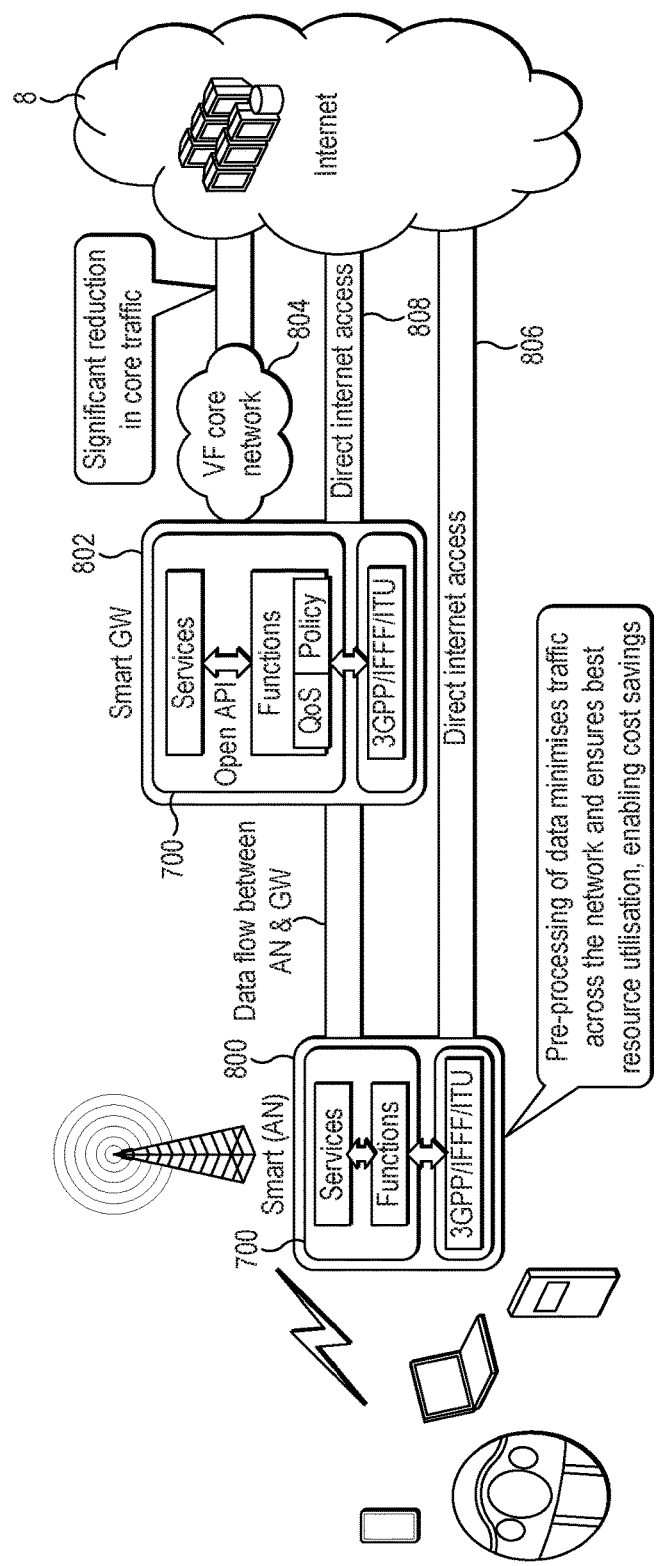
Figure 5:
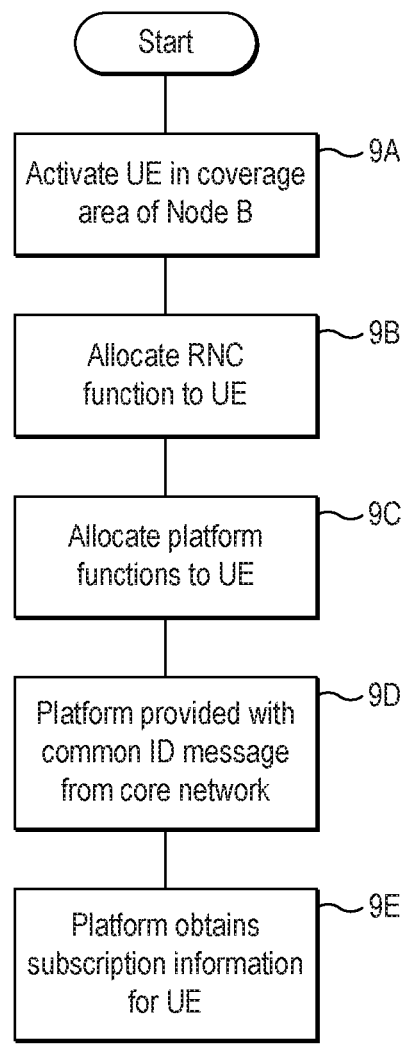
Figure 6:
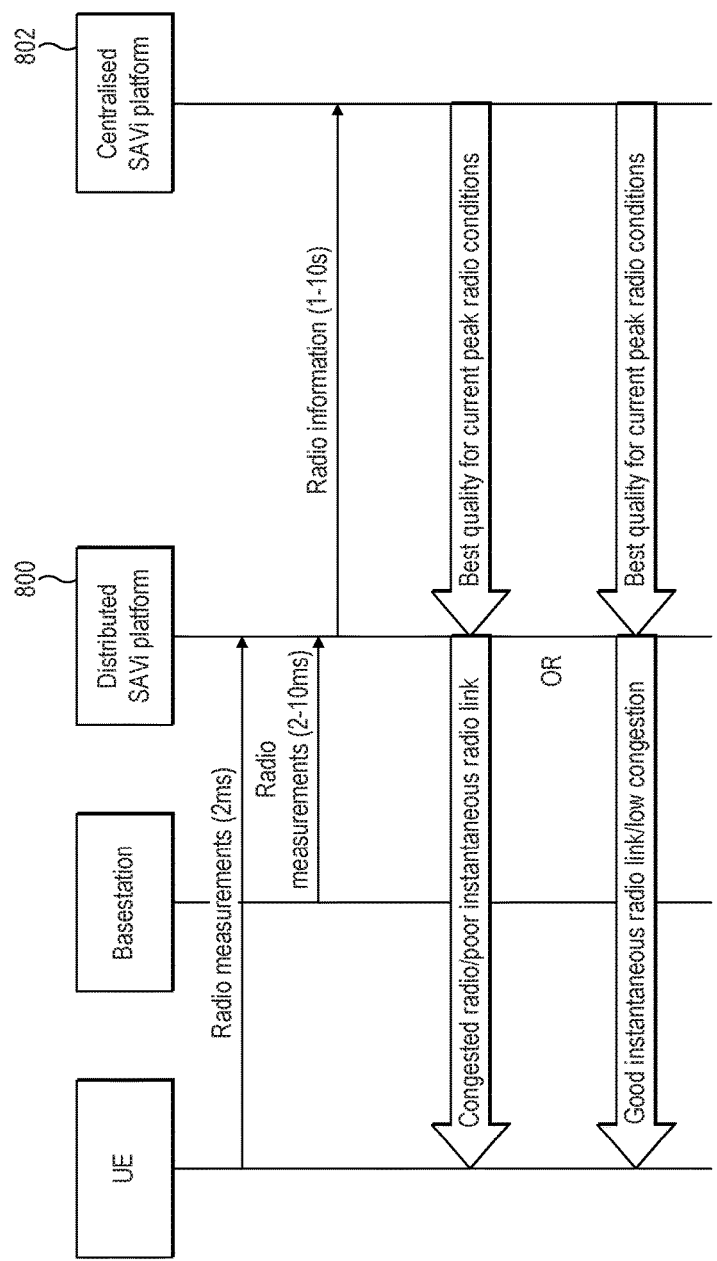
Figure 7:
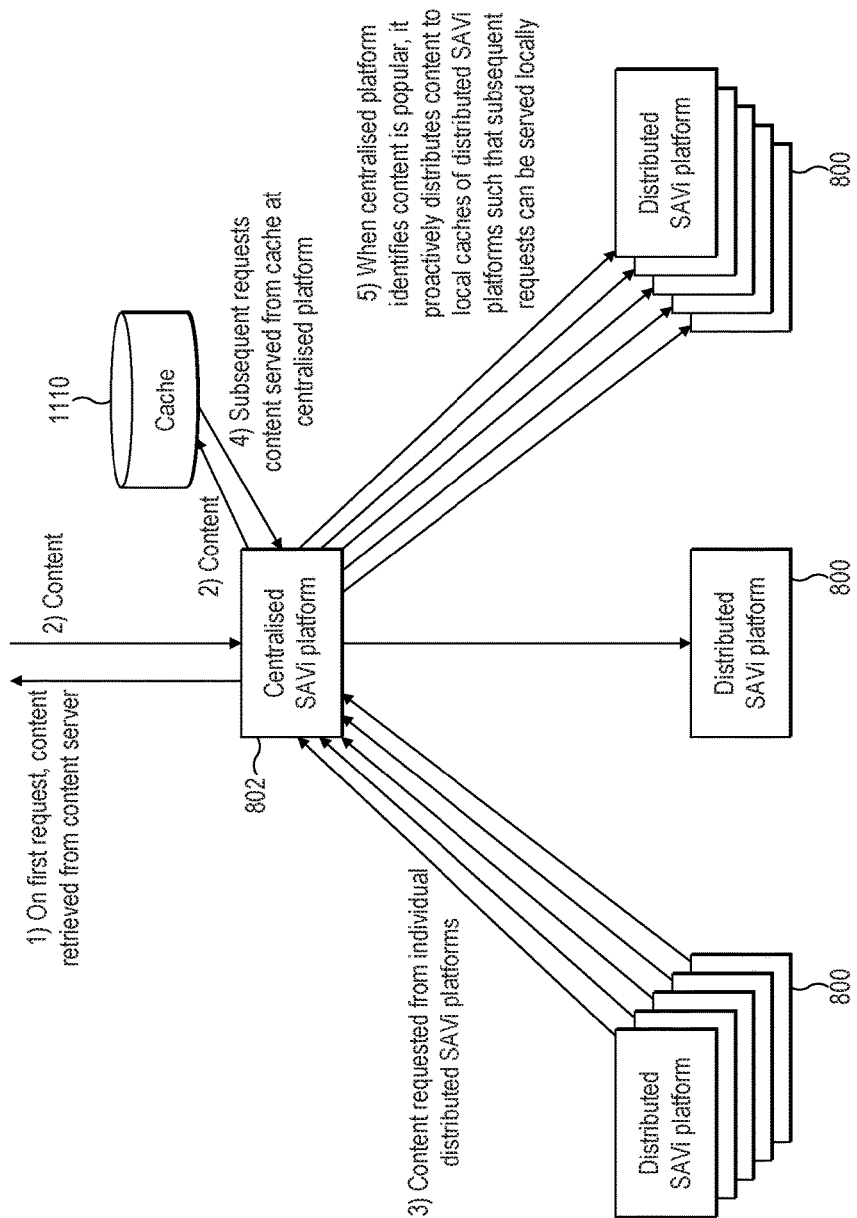
Figure 24B:
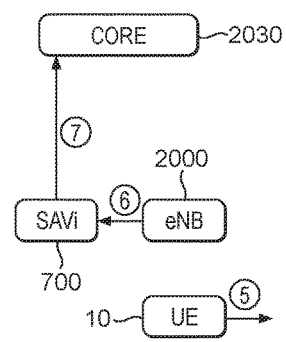
Figure 24C:
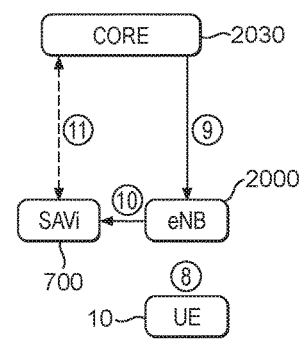

FIG. 24B
2. As part of the procedure to transition to Active State, the UE10 context is downloaded to the eNB 2000. The UE context has been enhanced to include the SAVi UE identity and APN information for the bearer.
3. The eNB 2000 informs the SAVi platform 700 that a UE10 has transitioned between Idle and Active State; and provides a copy of the UE context information.
4. The SAVi platform 700 contacts the core network 2030 and retrieves the SAVi profile for this user. The UE10 may then be offered services hosted by the SAVi Platform 700.
5. The UE10 moves to a new cell (or returns to Idle State-following inactivity on network resources).
6. The eNB 2000 informs the SAVi Platform 700 that the UE10 is no longer controlled by/connected to the eNB 2000.
7. The SAVi Platform 700 sends the latest SAVi Profile including the packaged contexts/state machines of specific applications which had been hosted for the UE10, to a Central Register in the Core 2030 where it is stored.

Figure 8:
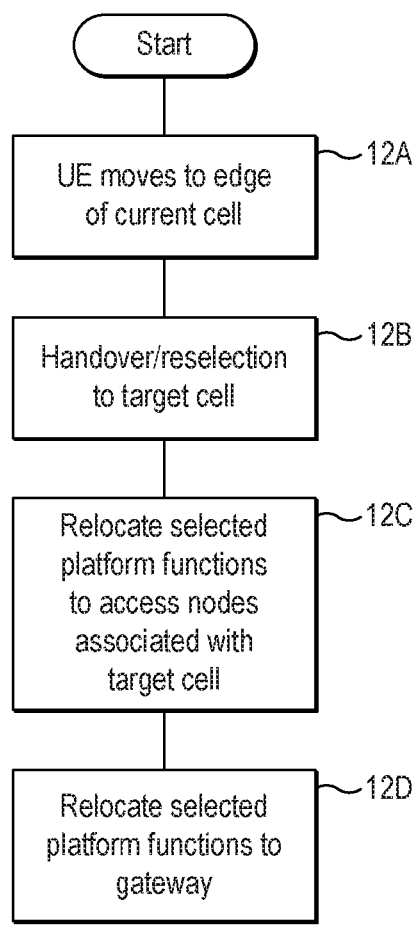
Figure 9:
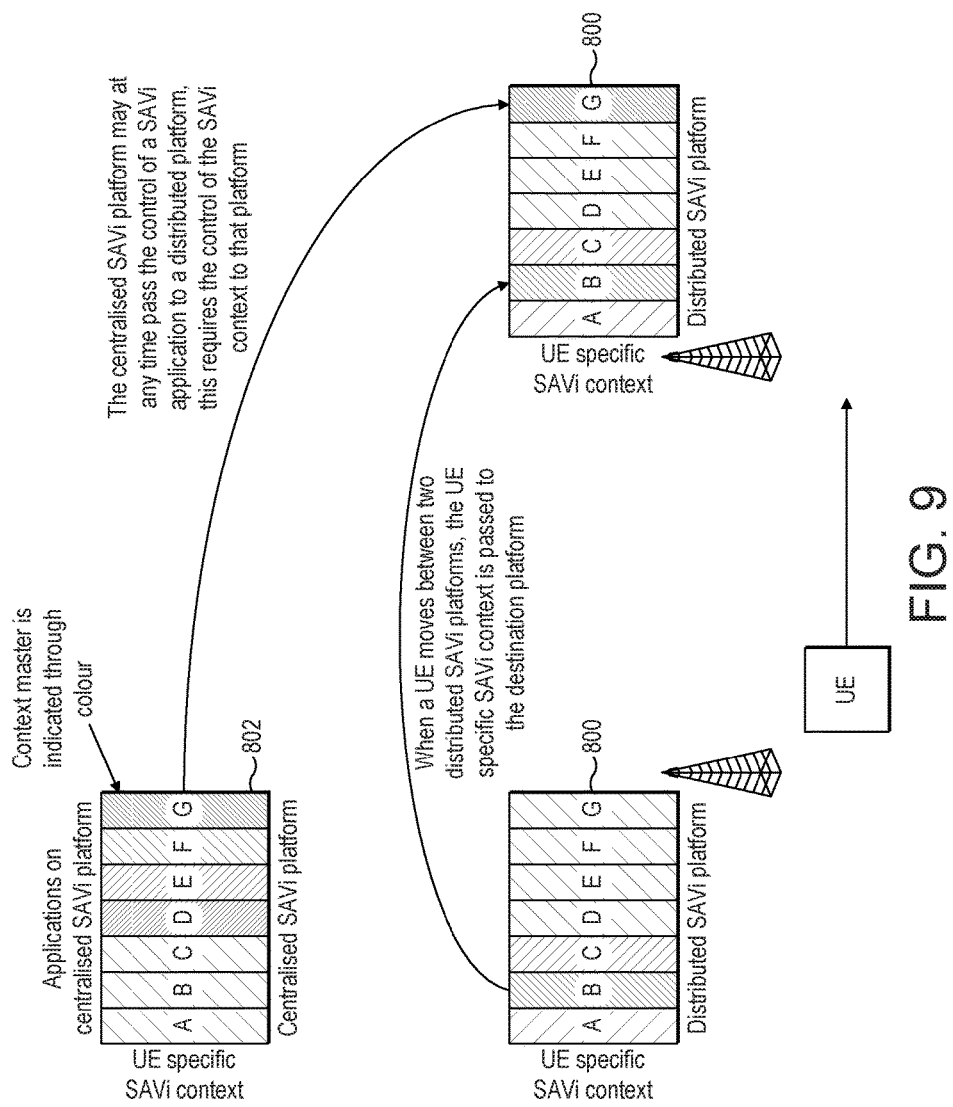
Figure 10:
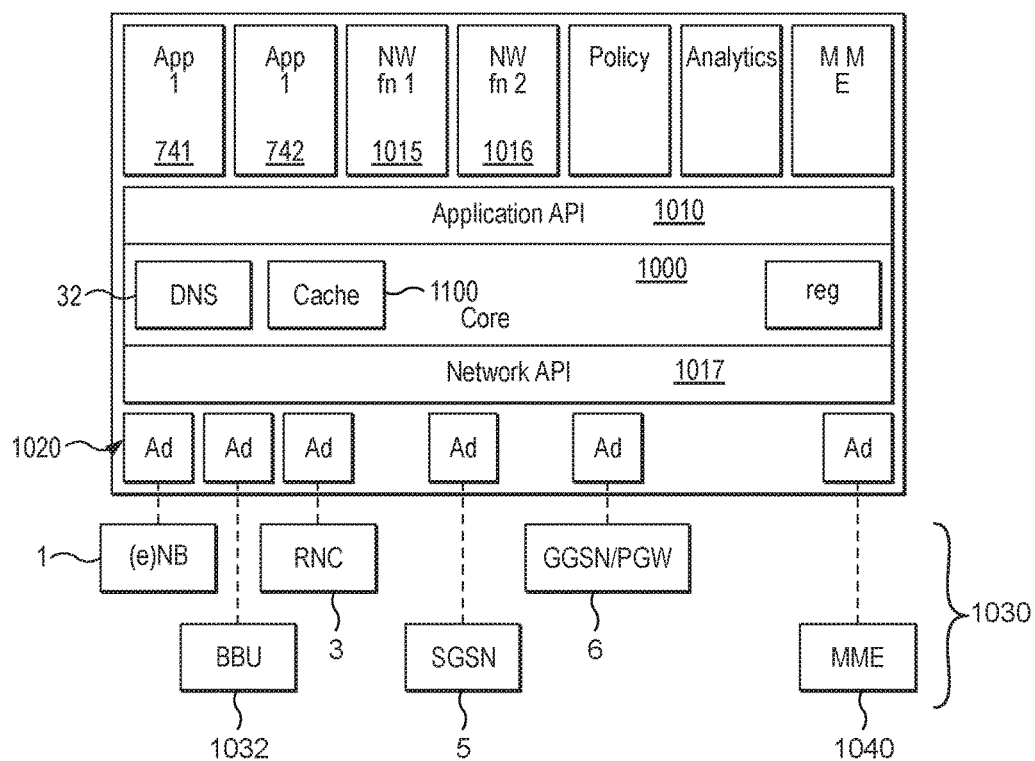

FIG. 14C
8. When the UE10 enters a new cell hosted by the eNB at a later time.
9. The eNB 2000 contacts the Core 2030 and downloads the UE context (as in step 2 above), including: SAVi UE identity and APN information for the bearer.
10. The eNB 2000 informs the SAVi Platform 700 that the UE10 has become active and passes the SAVi Platform 700 the UE context.
11. The SAVi Platform 700 contacts the Core 2030 network and retrieves the SAVi UE Profile stored in the Central Register, including the Application state information, and installs the information for the UE.

(18.1.16) UE Control of Uplink Spooling from SAVi Platform (Small Extension to Existing)

For the previous use case which defines the concept of UE content being cached on the SAVi platform 700 (after transmission from the UE10), before being sent up to the central cloud.

The content store in this example would be seen as an extension of the UE storage—and the UE10 is be responsible for triggering the upload of the content into the network. Subject to local approval, the content would only be subject to LI once the content is released from the storage. However, charging is be based on the transmission of the content but more importantly on the time the content is stored on the platform 700.

(18.1.8) Uplink Optimisation

In the scenario where a UE is uploading a file to cloud storage hosted on the internet, the round trip time between the UE and the storage server may be considerable. The large round trip time can cause the connection performance issues, particularly with respect to the slow connection start, and long recovery times following packet loss.

TCP proxy functions, where the end-to-end TCP connection is broken into two separate paths is the normal solution, and in this scenario, the TCP proxy is included in the SAVi Platform such that it can fully optimise the connection for varying radio condition/contention.

When the connection between the SAVi Platform and the Internet server is very poor (e.g. where the site backhaul connection is over a satellite link), some data may accumulate on the SAVi Platform whilst it waits to pass it to the Internet server.

Once the UE has finished transmitting the file to the TCP proxy and the UE has no further data to send, the eNB may decide to release the RRC connection of the UE. If there is data is still awaiting transmission to the network, the eNB may be configured to delay the release of the S1 connection user plane tunnel, whilst releasing the RRC connection on the radio.

The eNB may then later release the S1 connection when all the remaining data has been sent to the Internet server.

Basic Case:

If the UE10 changes eNB during a file upload, the TCP connection would fail on the new eNB 2000B, upon experiencing TCP connection failure the UE10 would need to trigger the fail transfer again on the new cell.

This functionality may be suitable for small file transfers and stationary devices where mobility between eNB is very unlikely.

Further Enhancement:

This solution could be further enhanced to maintain the S1 connection to the old eNB 2000A even after the UE10 changes cell.

a) When the UE10 is in a data session delivering data to an internet server which is optimised at the SAVi Platform 700A, and handover is triggered after data transmission has finished from the UE10, but uplink data between the SAVi Platform 700A and the Internet server has still to be delivered.

When the UE10 changes eNB, the 3GPP architecture as part of the handover procedures re-plumbs the S1 User and Control plane connections for the UE10 from between the original eNB 2000A and Core Network 2030 (MME2010/S-GW2100), to between the New eNB 2000B and the Core Network (MME/S-GW). All User packets for the UE10 after the handover are routed via the new S1 user plane connection.

The TCP proxy on the original eNB 2000A would no longer have connectivity to the Internet Server for the UE10—and therefore it is proposed that the network be enhanced to support multiple S1 connections for a UE (bearer).

For the uplink the S-GW 2100 would bridge the two S1 connections from the two eNBs to a single S5/8 connection to the P-GW20 2090, in which way the existence of multiple connections is hidden from the P-GW 2090.

For the downlink packets, the S-GW 2100 would need to know which S1 connection to route each downlink packet received on the S5/8 tunnel, it is proposed that the S-GW 2100 is be enhanced to include an IP routing function whereby the S-GW 2100 would interrogate the source IP address of the payload traffic and use this to determine the suitable S1 tunnel. It is proposed that the Original eNB 2000A at handover sends a new routing control message to the S-GW 2100 over the S1 interface providing the routing rules to the S-GW 2100.

When the S1 connection to the Original eNB 2000A is no longer required, i.e. all the data buffered at the TCP proxy has been sent, the SAVi Platform 700A at the Original eNB 2000A sends a specially marked packet in the uplink S1 connection to the S-GW 2100. This specially marked packet indicates to the S-GW 2100 that the associated S1 connection can be released.

b) In the case where the SAVi Platform 700A is informed by the Enb 2000A, through APIs, that a Handover is imminent, the TCP Proxy may modify the TCP connection to the UE10 and the TCP connection to the Internet server to bring them both back into a synchronised state prior to handover being initiated.

A Specific Implementation:

The M2M device (UE10) communicates with the local M2M Application where the Host M2M application pulls aggregated data from the Spool data storage via the SAVi platform 700A after the subscriber completes transmission where it may be in Idle mode. The following procedures (see FIG. 25) are defined as a possible solution:

1. UE10 sends uplink data directly to the M2M Edge Application 2120 hosted on the SAVi platform 700A by the M2M host application 2140.
2. A Client 2110 of the platform 700A allows the M2M Edge Application 2120 to stash this data along with subscriber identity, time of upload, optionally CDR's generated by the Client 2110 and other associated information into the Uplink Spool data storage 2130. At this point the S-P Gateway sees no traffic in the uplink or downlink associated with this flow of information.
3. During uplink transmission the M2M Edge Application 2120 checks the status of the single user's spooled data storage and combined with other defined criteria (e.g. load information) determines the Spool data storage 2130 is 'Full' for a specific user and ready to be exported to the Host application 2140. The Edge App 2120 messages to the eNode-B 2000A via the Client 2110 or NInfoS to export Uplink Spool data and is set on alert for RRC Connection Release by the UE10.
4. After UE10 completes data transmission eNode-B 2000A waits for user inactivity and completes RRC release connection with release cause "Uplink Spool". At this point the eNode-B 2000B enters a wait state, which will impact normal eNode-B software, and importantly does not release the S1 context towards the S-P GW (Uplink TEID only). It should be noted the UE10 can be in either idle or active mode. Next the M2M Edge App 2120 starts to exports the aggregation of all the Uplink Spool data back to the host associated with this subscriber via the Client and S-P Gateway within the uplink S1 GTP-u interface to perform Charging and LI functions. Two alternative procedures are described:
   a. The eNB 2000A should not release the connection unless signalled by the UE10. If the UE10 releases the connection it shall use the cause 'Uplink Spool' to indicate that the content is now stored on the SAVi Enb 2000A. If the UE10 releases the connection for any other reason, including handover, the spooling must be aborted to avoid any conflicts with a subsequent S1 contexts to the network. Under these other release causes, the UE10 must re-attempt to spool at another time.
   b. If the S-GW 2100 and P-GW 2090 can support multiple S1 connections then UE10 connection is released by the eNB 2000A with release cause 'Uplink Spool' but importantly the S1 UE Context Release is not sent to the S-GW 2100.
5. Once the uplink spool data completes export, the Edge M2M application 2120 then sends a message "Uplink Spool Complete" to the Client 2110. The Client 2110 commands the eNode-B 2000A to finally respond to the release of the access bearer".
6. The eNode-B 2000A then decides, with exception e.g. other active sessions and bearers, to send a Context Release Request to the MME 2010 and RRC Connection Release to the UE10, unless not already released, with cause 'Uplink Spool Complete'. This is important because it informs the UE10 that the spool is complete and further it can initiate another service request if multiple S1 connections are not supported by the S-P GW. If the RRC connection is not already released, the eNode-B 2000A sends another RRC Connection Release message to the UE10.

Figure 25:
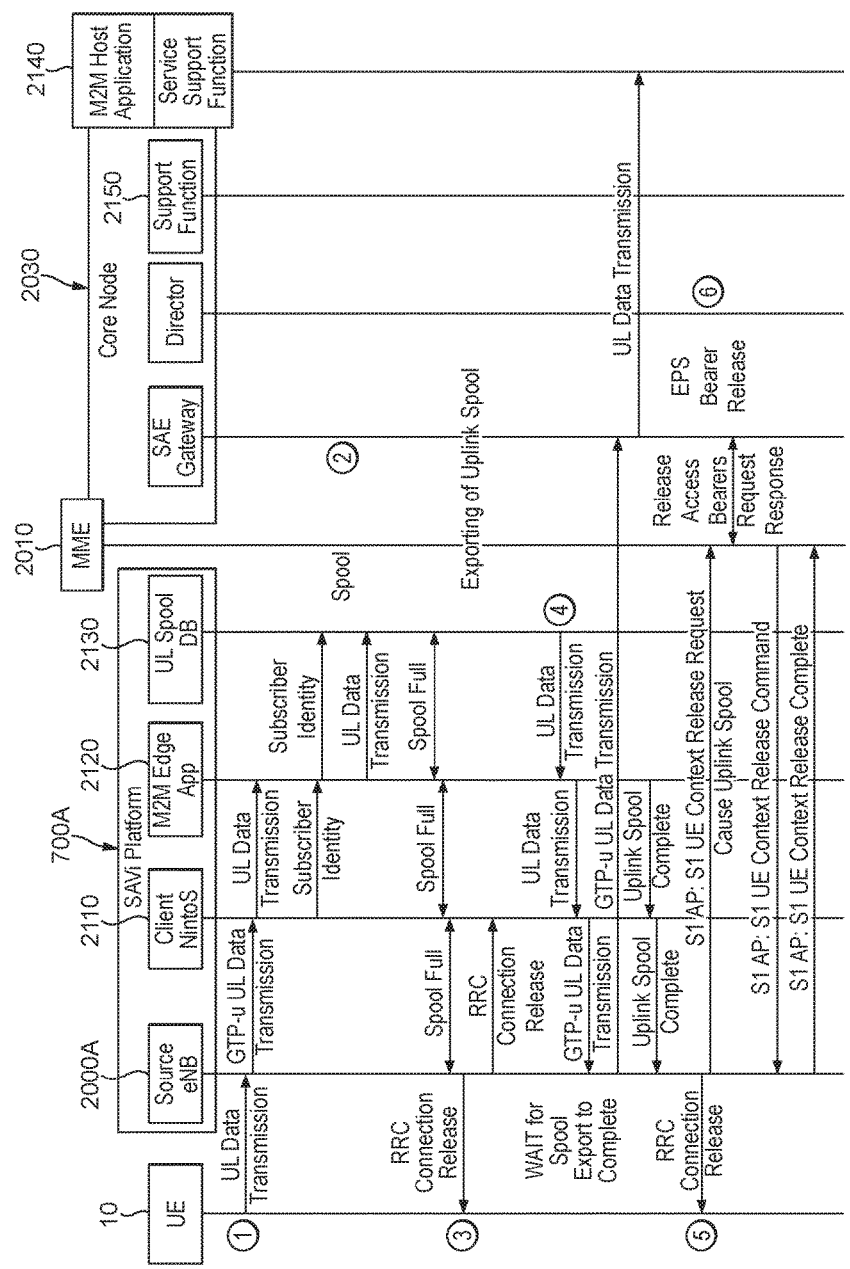
FIG. 25 shows a SAVi User plane uplink spooling via EPS Bearer flow diagram.

FIG. 25 shows a SAVi User plane uplink spooling via EPS Bearer flow diagram

The following features support this use case:

1. M2M Local Edge Application 2120 and Uplink Spool Data Storage 2130.
2. Service Platform Support Function (SPSF) 2150 is integrated to the M2M Host Application 2140.
3. eNode-B 2000A to expose RRC events and invoke S1-C (MME) procedures commanded by the Client or NInfoS 2110.
4. UE Spooling function must not trigger another service request to avoid conflicts in the network unless multiple S1 connectivity is supported by the S-GW 2100.
5. The eNB 2000A can only confirm a spool is successful (a) stashed (b) uploaded to host with receipt of the correct release causes: (a) Uplink Spool, (b) Uplink Spool Complete.

If the UE10 performs a handover from the source eNB 2000A during a file upload, the TCP connection would fail on the target Enb 2000b, upon experiencing TCP connection failure the UE10 would need to attempt to recover and trigger the file transfer again on the new cell.

This functionality may be suitable for small file transfers and stationary devices where mobility between eNB is very unlikely.

Further Alternative Uplink Optimisation Solutions:

Solution 1. Maintain E-RAB

E-RAB Modify Request (eNB→MME) with parameters E-RAB ID. E-RAB is kept alive between eNB 2000A and MME 2010, but release from the user. If user requests a new E-RAB it re-maps back to this original bearer. For any further communication for this user, in particular users SAVi application, Charging and LI is still maintained. For example, stored data is pulled from the network 12 hours later, E-RAB is still maintained although reliability and cost is a major drawback and not recommended.

Solution 2. Network Initiated E-RAB

E-RAB is requested by central host application where it communicates with M2M device but pulls data from SAVi platform. The following procedures are elaborated upon as part of this solution:

a) UE10 sends data to the SAVi platform 700A in the uplink, with some pre-signalling to enable UL spooling, where the Client 2110 intercepts this Uplink data, stores it on the SAVi platform 700A and removes all data in the uplink direction towards the Core 2 Network 2030. The eNode-B 2000A delays the release of bearer during uplink spooling.

b) Later the Host spooling application 2140 initiates a paging message via the MME 2010 to initiate creation of a new session. UE10 requests data to be spooled back to the network without any user plane data transmission from the subscriber. Client 2110 becomes aware of this request and starts uploading data to the host spooling application where data is forwarded via the SAE Gateway to perform LI and Charging correctly.

Note another enhancement is to export access API uplink load information to schedule network initiated E-RAB.

Solution 3. Enhance Location Update with E-RAB

At location Update, SAVi application wakes up and triggers communication to pull data from storage via Core network 2030. E-RAB is established to M2M device where data is pulled from SAVi Platform 700A where minimal communication is made between M2M Device, but where data is copied back to SAE Gateway for Charging and LI purposes. Less impact on signalling, reduces paging load, but may restrict SAVi application from co-ordinating when data is retrieved from storage from multiple M2M devices.

(18.2) Details of Maintenance of the SAVi Policy Register SAVi Enhanced P-GW

Policy Re-Association During Idle Mode Via Attach or TAU Update

Figure 26:
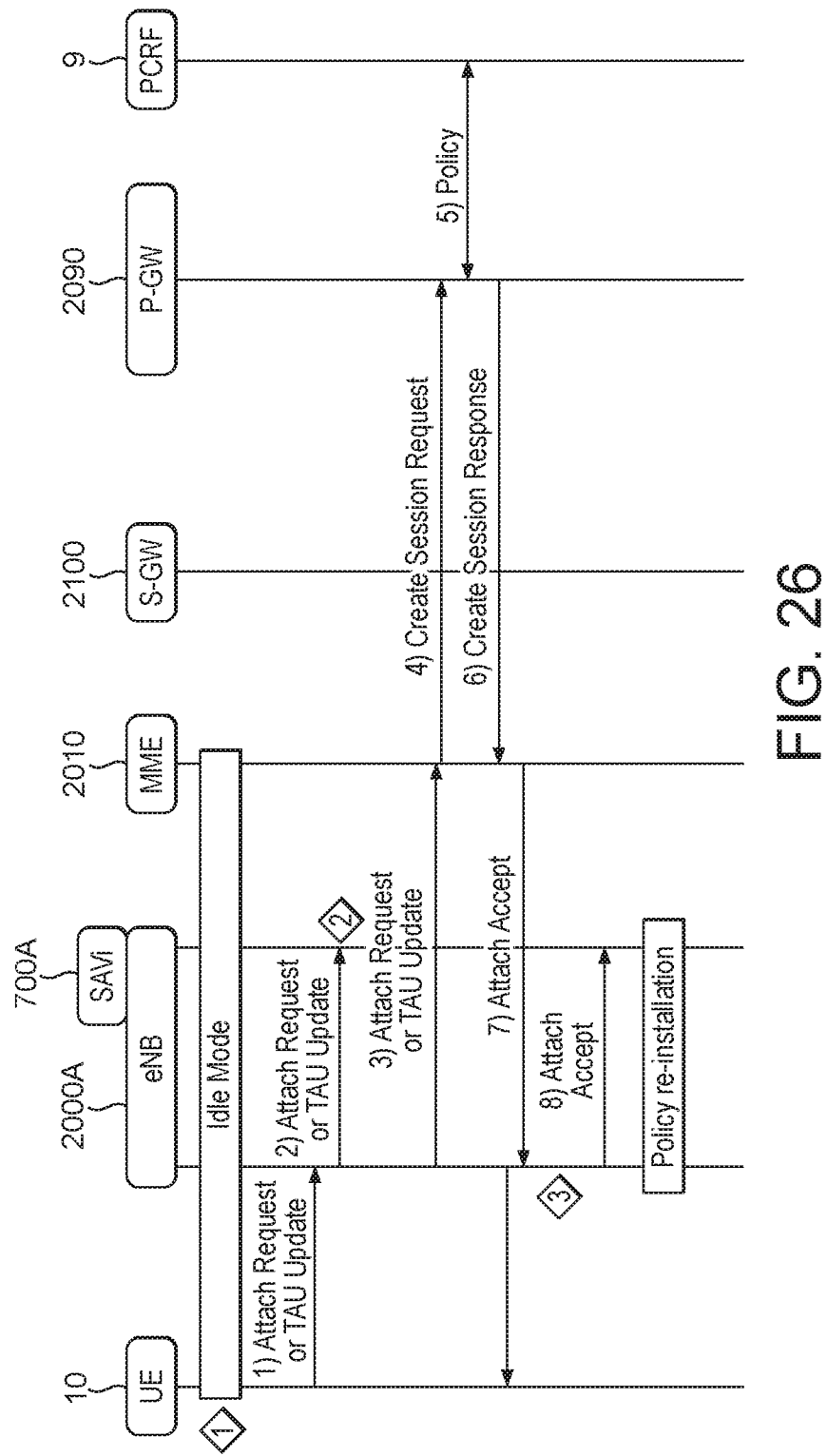
FIG. 26 is a Flow Diagram of an Attach or TAU on source eNB policy subscriber persists via P-GW.

The following flow of FIG. 26 describes NAS signalling between the UE10 and the Core Network 2030, which is used by the SAVi Platform 700 to extend the registering with the network to receive services that require that involve the SAVi enhanced P-GW 2100.

FIG. 26 is a Flow Diagram of an Attach or TAU on source eNB policy subscriber persists via P-GW 1. Policy installed at SAVi Source eNB 2000A from a previous transmission. UE10 enters ECM-Idle Mode due to inactivity. SAVi Platform 700A state set to ECM-Idle mode with Policy record Periodic Tracking Area Timer set to T3412 i.e. 60 minutes based on matching the LU update timer as a parameter defined by the MME 2010. It is required to align between the MME 2010 and SAVi Platform update timer parameters by configuration and implementation such that periodic TA Update timer is performed before a policy is purged.

2. The UE10 initiates the Attach or TA Update message to the eNB 2000A under a variety of conditions, for example timer expiry, new TAI identified. This message is forwarded to the SAVi Platform 700A without integrity protection to ensure security keys are maintained in the secure environment of the eNB 2000A. The client initially associates the UE10 with matching Old GUTI information element and the last visited registered TAI which is linked to a policy record. If a match on GUTI and TAI is made the policy is flagged but not fully re-installed as either the request could be forwarded to a new MME 2010 or have a re-allocated S-GW 2100 which could make the policy invalid. If the last TAI does not match the policy record information is updated.

Note that the GUTI may have been reallocated to another UE initiated by the MME (T3450). In this event the Policy cannot be re-installed or updated unless the UE10 is in connected mode where the policy can be refreshed. The mechanisms between the valid lifetime of a GUTI and TA update timers needs to be configured to match (T3450 and T3412) in order to avoid unnecessary purging of policy.

If P-TMSI is used in the Attach procedure a mapping is made with the RAI to the GUTI.

If UE10 uses an IMSI, in the case of an no valid GUTI or P-TMSI, then this is used to link to the persistent policy.

3. The MME 2010 receives from UE10 via eNB 2000A an Attach Request or Tracking Area Update message, under the condition the previous UE context is still valid, where an Attach Accept is returned after a successful Location Update at the HSS 36. The Attach Accept message may contain the GUTI and is extracted by the SAVi Platform 700A to finally confirm the persistent policy record if the old GUTI matches. If a new GUTI has been assigned by the MME 2010, then as long as the old GUTI can be referenced to the new GUTI, the policy can be re-installed.

Policy timer is reset to match the periodic TA update timer (T3412) extracted from the Attach Accept message.

If an Attach is not accepted, Attach Reject, by the network the policy is purged.

Policy Re-Association During Session Management Service Request

These use cases cover session management procedures that analyse how policy information is handled during transition between ECM-IDLE and ECM-CONNECTED mode procedures.

Figure 27:
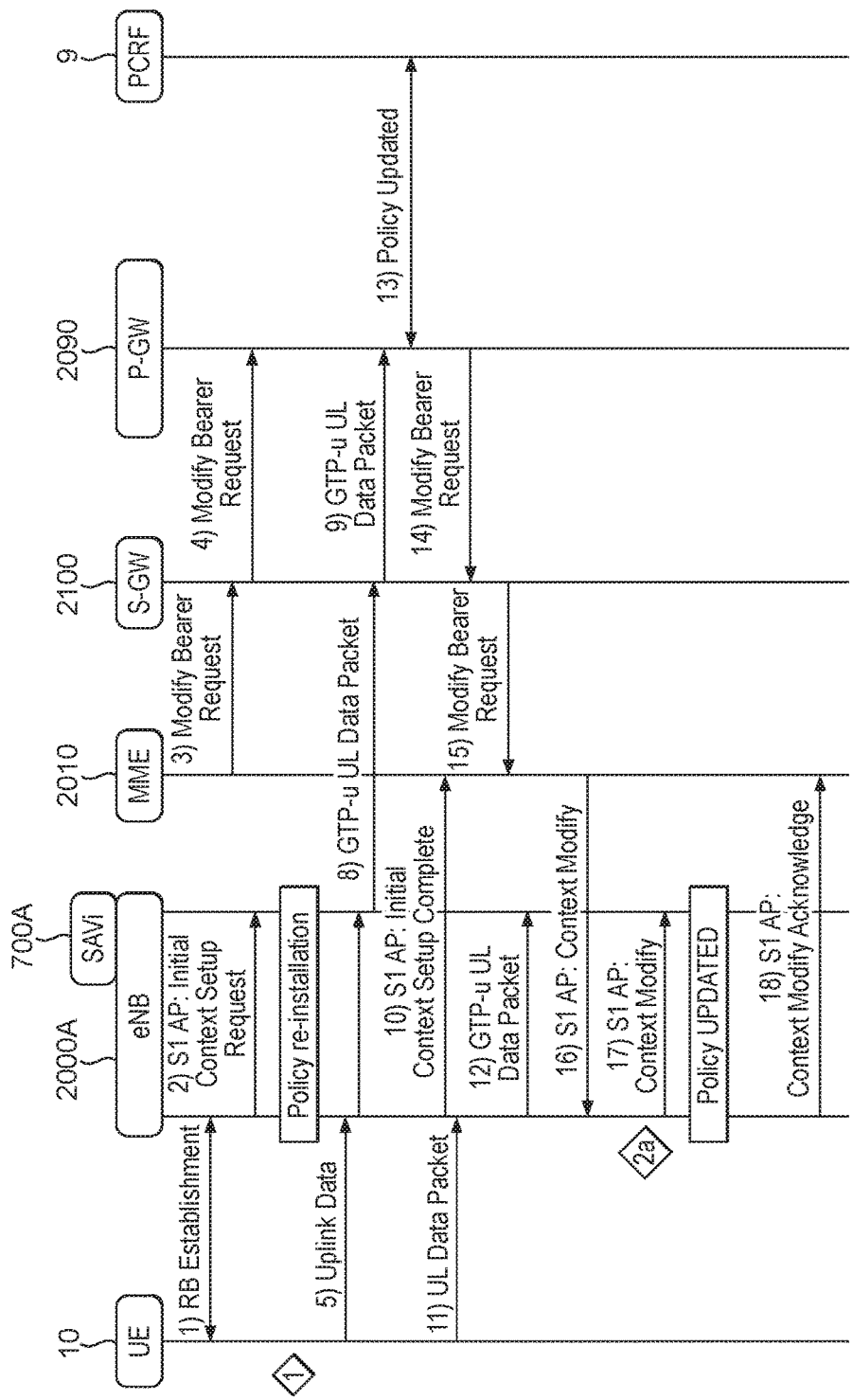
FIG. 27 is a Flow Diagram of re-installation of Policy after new service request via P-GW.

FIG. 27 is a Flow Diagram of re-installation of Policy after new service request via P-GW 2090:

1. Policy is installed and maintained at Source eNB 2000A from a previous session. RRC Release and UE transitions from ECM-CONNECTED to ECM-IDLE under initiation of eNB 2000A (i.e. user inactivity typically set to 10 seconds) or MME 2010, will action S-GW 2100 to release all eNB UE S1 AP (S1-C) related information to the MME 2010 (addresses and TEID's). The MME 2010 deletes all eNB related information from the UE's MME context, but shall retain, with the requirement of re-using, all S-GW S1-U uplink configuration information (addresses and TEIDs).

2. UE10 initiates new service request where user inactivity timer has not been reached by MME 2010. Initial Context Setup messages are sent between eNB 2000A & MME 2010. This message is forwarded to the Client without integrity protection to ensure security keys are maintained in the secure environment of the eNB 2000A. The client is aware of bearer ID and can initiate association with the old policy.

Policy Re-Association During Idle Mode Via Session Management Release Procedure

Figure 28:
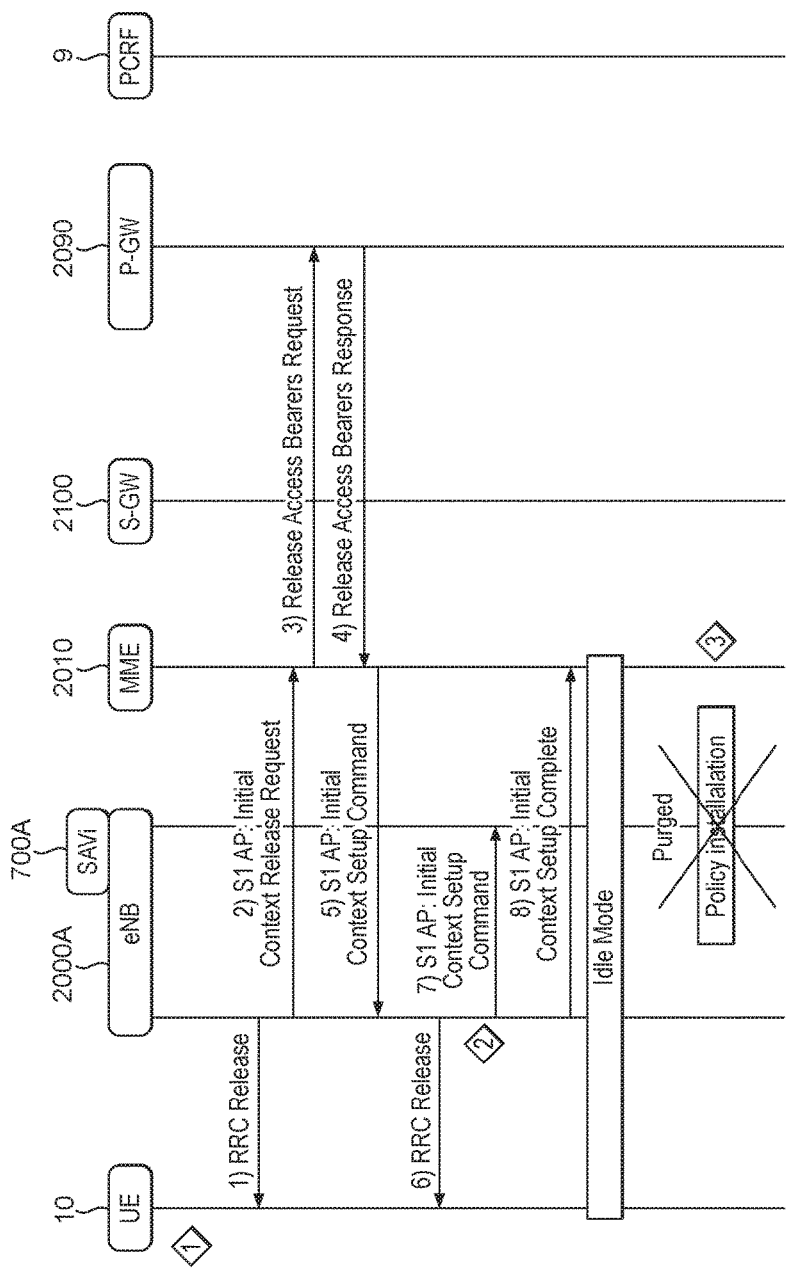
FIG. 28 is a Flow Diagram of re-installation of Policy after S1 Release procedure.

FIG. 28 is a Flow Diagram of re-installation of Policy after S1 Release procedure 1. Transition from ECM-CONNECTED to ECM-IDLE follows a S1 Release procedure under initiation of eNB 2000A (i.e. user inactivity typically set to 10 seconds) or MME 2010 (not illustrated) will action S-GW 2100 to release all eNB UE S1 AP (S1-C) related information to the MME 2010 (addresses and TEID's). The MME 2010 deletes all eNB related information from the UE's MME context, but retains, for the purpose of re-using, all S-GW S1-U uplink configuration information (addresses and TEIDs). All non-GBR EPS bearers established for the UE are preserved in the MME 2010 and in the S-GW 2100.
2. The S1 Initial Context Setup Complete event is sent by the eNB 2000A to the MME 2010 where the ECM-IDLE timer is started. This message is forwarded to the Client without integrity protection to ensure security keys are maintained in the secure environment of the eNB.
3. Eventually the ECM-Idle timer expires and the policy is purged.

Policy Re-Association During Handover Return

The purpose of this procedure is to define a method of maintaining and purging policy as a subscriber handovers between eNBs. This procedure minimises SAVi Platform P-GW 2090 signalling for ping pong handovers. Although connected mode is not in scope the focus is on how policies are managed after handover and when subscriber eventually falls back to ECM-IDLE mode.

Figure 29:
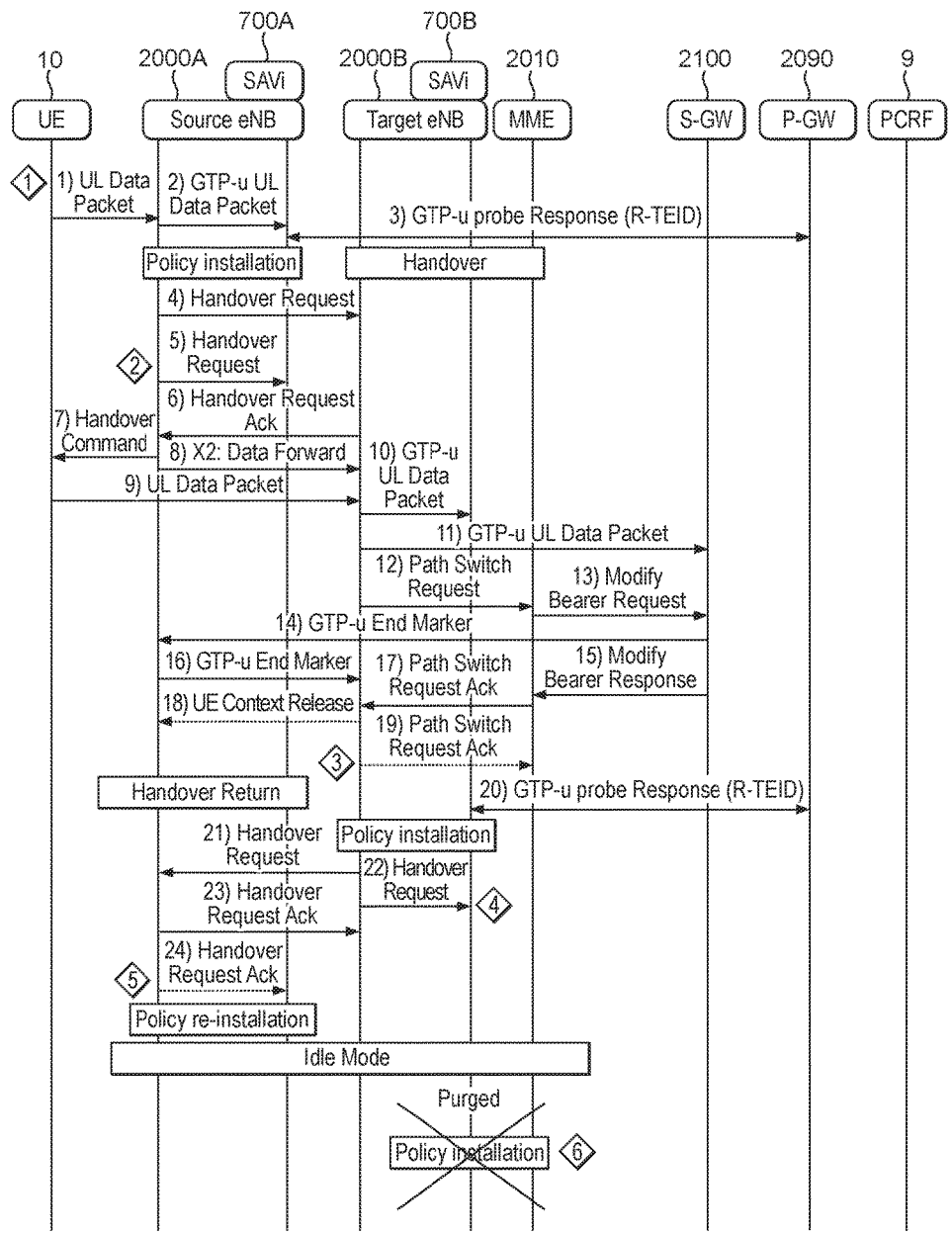
FIG. 29 is a Flow Diagram of re-installation of Policy at original Source eNB at Handover return from Target eNB.

FIG. 29 is a Flow Diagram of re-installation of Policy at original Source eNB at Handover return from Target eNB
1. Source eNB 2000A has subscriber policy installed.
2. Subscriber performs X2 Handover Request, Response to Target eNB 2000B. This message contains bearer information, IP addresses and TEID's allocated for forwarding packets to the Target Enb 2000B.
3. The S-GW 2100 at handover sends a GTP-u End Marker as indicated in the header message to the Source eNB 2000A to release resources. Policy UE status information is then modified at the Source eNB 2000A based on this packet where the policy UE state is set to "intra-RAT Handover", Timer is reset, Source eNB 2000A is set to its own TAI+ECGI (E-UTRAN Cell Global Identifier), Target eNB 2000B is set to extracted value from Handover Request target Cell-ID. X2 UE Context Release from the Target eNB 2000B to the Source eNB 2000A is released after MME 2010 modifies the bearer and the S-GW 2100 performs a path switch.

For the P-GW solution 2090 policy is downloaded to the target eNB 2000B via the P-GW 2090 but requires either the UL or DL packet to trigger this event. Alternatively if the Path Switch Request is aware of this message the P-GW 2090 could use this to trigger a policy download.

For the MME 2010 solution policy can be inserted in the Path Switch Request Acknowledge message towards the target Enb 2000B.

An alternative solution to this use case is to export the policy from the source eNB 2000A to the target eNB 2000B via the X2 interface at the point of Handover Request message.
4. Next the subscriber 10 performs a handover (return) to the original Source eNB 2000A, now Target eNB 2050B, with a X2 Handover Request message with Bearer information of IP addresses and TEID's allocation for forwarding from the Target eNB 2000B before timer expires. Client at Source eNB 2000A associates UE10 with matching E-RAB ID, S-GW UL & DL IP Addresses, UL & DL TEID's to re-install the old Policy record. Handover Timer on the original Source eNB 2000A (now the Target eNB) is set to null and counts up for mobility information purposes.
5. If Policy UE state information resumes back to ECM-Connected Mode at the original Source eNB 2000A, now Target eNB, the old policy information is now installed and valid. Note importantly that the SAVi Platform 700A then skips the GTP Probe/Response to P-GW 2090 to download policy for this subscriber.
6. The UE10 camped on the Source eNB 2000A goes to ECM-IDLE mode and eventually the Handover Timer expires on the last Source eNB, was the Target eNB 2000A, and the policy is purged.

SAVi Enhanced MME

Policy Re-Association During Idle Mode Via Attach or TAU Update

This section is similar to that of the P-GW solution description above with one exception. In this solution there is no need for the policy to exist from a previous transmission. Subscriber 10 performs an Attach or TAU procedure where the policy is placed in a container in the Attach Accept message from the MME 2010 based on the Create Session Response message from the P-GW 2090.

Policy Re-Association During New Service Request

Figure 30:
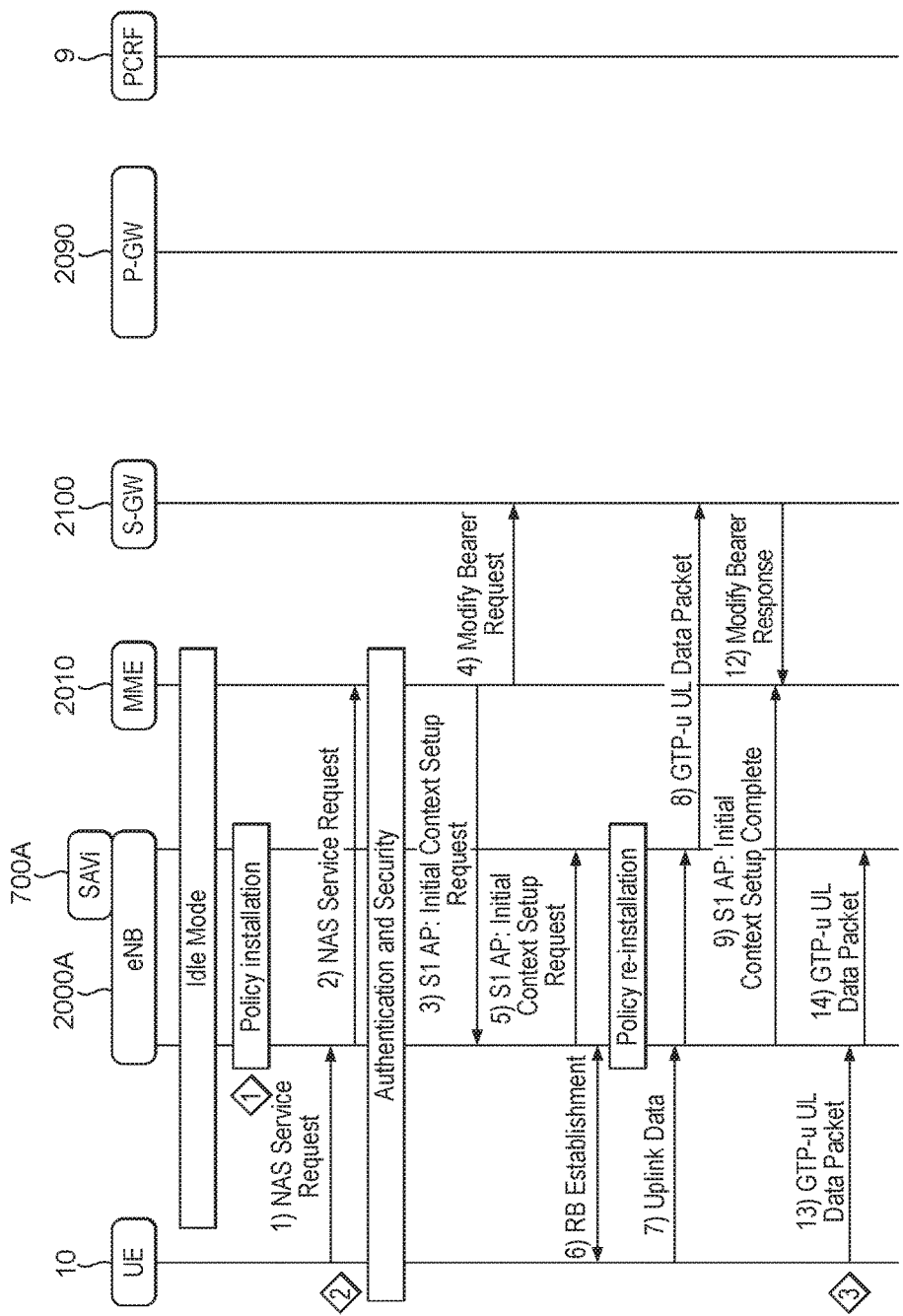
FIG. 30 is a Flow Diagram of Modify Policy after or during a new service request via MME.

FIG. 30 is a Flow Diagram of Modify Policy after or during a new service request via MME Refer to P-GW solution description above where the solution is similar. With the following exceptions:
In the case of MME solution in FIG. 30 above policy is placed in a container in the Initial Context Setup message from the MME 2010 in the case the policy has not changed within the PCRF.
In the case the policy has been updated during the modify bearer request, FIG. 30, new messages Context Modify and Acknowledge are required to be signalled between the MME 2010 and eNB 2000A and SAVi Platform 700A.

Policy Re-Association During Handover Return

This solution is similar to that of the P-GW solution description above with the following exceptions:
Step-3: for the MME solution policy can be inserted in the Path Switch Request Acknowledge message towards the target eNB 2000B.

Preferred Embodiment of the Invention—Policy Sequence Numbers

This embodiment may be combined with any one of any combination of the above-mentioned aspects.

13.1.4 SAVi Information in SAVi Platform

The SAVi Platform 700 may maintain some or all of the following information about the subscribers in their databases for each bearer. The actual information will depend on the application and privacy requirements. Further elements may be added in the future.

| | |
|---|---|
| IMSI | International Mobile Subscriber Identity-The unique subscriber identifier (use is not recommended for security reasons) |
| MSISDN | Mobile Subscriber ISDN number-This is the directory number for the subscriber (the use of an Anonymous Customer Reference (ACR) is preferred-see below) |
| IMEI(-SV) | International Mobile Equipment Identity-The unique identifier for the mobile phone 10 itself (a shortened form identifying only the device type and software version is preferred for security reasons) |

-continued

| | |
|---|---|
| UE IP Address | This is the IP address assigned by the P-GW 2090 to the UE10 when the bearer is created |
| APN | Access Point Name-This uniquely identifies the Access Point in the P-GW 2090 to the PDN for the bearer. If it is required to be globally unique it consists of both the APN Network ID and the APN Operator ID |
| ACR | Anonymous Customer Reference-an obscured form of the MS-ISDN or IMSI that a third party may use to uniquely identify a customer using an application but that can only be converted back to the clear form by the network operator. |
| Bearer ID | This is used to identify the bearer. In the SAVi Platform a bearer ID comprises: Uplink TEID + TLA; downlink TEID + TLA In the SAVi enhanced P-GW 2090 a local identifier related to the PDN Context may be used |
| SAVi Platform ID | Unique identifier of the SAVi Platform 700 |
| SAVi enhanced P-GW ID | Unique identifier of the SAVi enhanced P-GW 2090 |
| Policy Information | One or more 5-tuple rules to allow traffic steering into applications |

Within the 3GPP system, when Policy/profile for a UE is modified the PCRF 9 or HSS 36 is updated to modify the parameters within the profile/policy of the UE10. This information is then disseminated within the central nodes within the core network 2030.

When SAVi is introduced modifications to UE policy will require to be disseminated to a wider number of systems within the network.

The SAVi Platform 700 needs to be informed of per subscriber relevant policy information so that SAVi services can be authorised and delivered appropriately by the SAVi Platform 700 and to potentially apply actions that would otherwise be applied centrally (e.g. adult content restrictions).

In addition to applying per subscriber policy during connected mode, the SAVi Platform 700 may require the ability to inform applications of User associated events after the RRC connection for a UE10 has been released.

4.1.1. Subscriber Policy Information

The following table defines the policy information that needs to be provided to the SAVi Platform 700 for each subscriber (including on a per APN basis). The table identifies the elements that are static (i.e. will not change during the course of UE session), that need to be made available at the start of a SAVi sessions; and those that are dynamic, that may change during the course of a SAVi session.

| Generic elements | Per APN element | Static | Dynamic | Comments |
|---|---|---|---|---|
| Unique customer identifier | | Yes | | |
| Subscriber HPLMN ID | | Yes | | |
| MVNO & Roaming Indicator | | Yes | | An indication of whether this customer is an MVNO or Roaming |
| TAC & the SVN parts of the IMEISV | | Yes | | Unique description of device model, and in some case the OS version of the device. |
| Terminal category | | Yes | | A text string device name, and a device category (e.g. "Smartphone", "Basic Phone", "MBB Dongle", "Tablet") |
| APNs | | Yes | | Network ID + operator ID |
| List of Customer Groups | Yes | Yes | Yes | Policy may be common for large groups of customers (e.g. all devices belonging to the same corporate). The policy can be managed as a group of devices rather than individually. |
| AMBR (Maximum Bit Rate) | Yes | Yes | Yes | Per bearer |
| SAVi allowed on APN | Yes | Yes | Yes | |
| List of SAVi applications allowed/authorised | Yes | Yes | Yes | This should include per application flags to indicate if copy of data is required at all and if copy is required for flow-based charging (for some APNs and applications combinations it may be needed to apply LI and/or charging). |
| PDN-GW has SAVi support | Yes | Yes | | |
| Application service chain information | Yes | Yes | Yes | |

| Generic elements | Per APN element | Static | Dynamic | Comments |
|---|---|---|---|---|
| SAVi roaming allowed including local breakout | Yes | Yes | Yes | |
| Content Restriction Flags | Yes | Yes | Yes | This would include whether Adult Content is allowed, and whether specific content is allowed e.g. HD content. |
| Out-of-bundle status | Yes | | Yes | |

4.3.4.1 SAVi Gateway Overview

Figure 31:
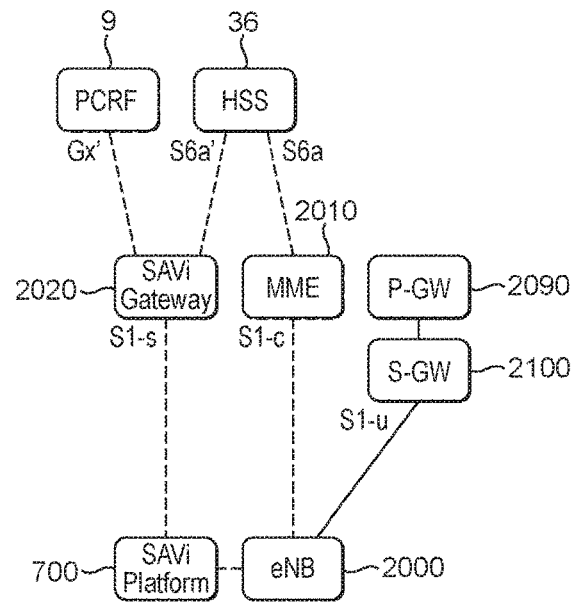
FIG. 31 shows SAVi Policy distribution via SAVi Gateway Architecture.

This section describes, with reference to FIG. 31, a SAVi Gateway functional entity 2020 providing Policy to SAVi enabled access network nodes when a UE10 arrives in a cell controlled by the node, and when there is a change of policy for the UE10.

The SAVi Gateway 2020 gathers the necessary subscription information from central systems 2030 and repositories (e.g. PCRF9 and HSS 36) using standard interfaces, and a copy of the policy is cached locally at the SAVi Gateway 2020 for timely delivery to the SAVi Platform 700.

The solution relies on the SAVi enabled eNB 2000 being informed of the Subscriber Identity and APN, such that the eNB 2000 can correctly identify the customer and bearer to the SAVi Gateway 2020. The subsequent description assumes this is provided to the SAVi Platform 700 by the MME over 2010 the S1-c interface.

4.3.4.2

The Subscriber records in the HSS 36 are updated to include a new UE identifier, which is passed to the MME 2010 with the existing Subscriber Information when the device attaches to the network.

The MME 2010 is enhanced to include the UE Identifier and APN information associated with the device and its established Radio bearers in existing signalling on the S1-c interface as part of Radio bearer establishment and S1 based handover signalling.

The eNB 2000 indicates to the SAVi Platform 700 that a new UE has arrived on a cell controlled by the eNB 2000, and provides the UE Identifier and the APN information for each activated bearer.

The SAVi Platform 700 registers the UE and APN information with the SAVi Gateway 2020 that the eNB 2000 is configured to communicate with.

If the SAVi Gateway 2020 does not have policy associated with registered UE10, the SAVi Gateway 2020 retrieves the necessary information from the HSS 36 (for static and dynamic SAVi policy elements) and potentially from the PCRF 9 (alternative path for dynamic policy elements), stores a binding between the UE10 and the SAVi Platform 700, and provides the policy information to the SAVi Platform 700 where it is stored.

The SAVi UE Policy information identifies the list of the Applications applicable to the UE10, and a template (application service chain) references pre-configured rules in the SAVi Platform 700 which allows the SAVi Platform 700 to build a routing table for packets from this UE between the hosted Applications.

When the UE policy related to SAVi changes in the Core Systems 2030, the SAVi Gateway 2020 is informed. The SAVi Gateway 2020 retrieves a list of which SAVi Platforms have an active registration for this UE10, and distributes the updated policy to them.

4.3.4.3 Policy Installation

In this example, the User Identity is provided to the SAVi Platform 700 by the MME 2010 over the S1-c interface. This is described above with reference to FIG. 11, and is performed as follows:

1) When the UE is in RRC Idle mode and has data to send, the UE sends a Service Request message to the MME 2010 requesting a data service.
2) In line with the normal LTE service activation procedure, the MME 2010 sends the Initial Context Setup Request message to the eNB 2000 including the service parameters for eNB 2000 to correctly handle the UE10. This message is enhanced to include SAVI SUB INFO IE carrying the UE Identifier and other SAVi parameters from the Subscriber Information received from the HSS 36, and the SAVI E-RAB INFO IE for each E-RAB with activate Radio Bearers carrying the APN information. The inclusion of the E-RAB INFO IE indicates to the SAVi Platform 700 that the P-GW 2090 associated to the E-RAB has been upgraded to support SAVi functionality. The MME 2010 determines the P-GW SAVi 2090 support through enhancing the existing capability signalling over S5/8 & S11, or by performing a DNS lookup of the P-GW node 2090, where the DNS response includes capability information.
3) The eNB 2000 informs the SAVi Platform 700 that a UE has been assigned radio resources on a cell controlled by the eNB 2000 and provides the UE Identifier and APN information.
4) The SAVi Platform 700 contacts the SAVi Gateway 2020 and registers interest in the UE10 with the SAVI UE REGISTER message. The SAVi Platform 700 uses the UE Identifier and APN information to reference the UE and Bearer.
5) If the SAVi Gateway 2020 does not already have Profile information for this UE, it contacts the Core Systems 2030—e.g. the PCRF 9 and HSS 36—and retrieves the necessary Customer/Bearer information.
6) The SAVi Gateway 2020 stores the UE Profile and a binding of the UE10 and SAVi Platform 700 in a local database.
7) The SAVi Gateway 2020 provides the Policy information for the UE10 to the SAVi Platform 700 in the SAVI UE PROFILE TRANSFER message, where it is stored. The Profile Information may trigger the SAVi Platform to request/pull any Application specific information for the UE stored centrally.

Policy Modification

Later, if the profile is changed within the network for a UE:

8) The Core Systems 2030 inform the SAVi Gateway 2020 of a change in Policy for a UE.

9) The SAVi Gateway 2020 stores the updated profile for the UE10, and looks up which SAVi Platforms 700 have active registrations for a UE10.

10) The SAVi Gateway 2020 sends a SAVI UE PROFILE TRANSFER message to each of the SAVi Platforms 700 including the latest Policy Information for the UE10.

If the policy is changed regularly or for significant numbers of users this will create significant signalling and processing load within the network.

In 3GPP systems the policy information for UE is passed to the eNB 2000 when an RRC connection for the UE is established or the UE is handed over into a cell controlled by the eNB.

The introduction of SAVi means that the Policy/Profile information needs to be provided to the relevant SAVi platform(s) 700, and the policy/profile information downloaded to the eNB/SAVi Platform for a UE (when RRC connection is established) may become significant.

It has been proposed that this Policy information is stored when the UE RRC connection is released, or the UE is handed over to a cell controlled by another eNB.

4.4 Maintenance of User Policy and Profile Through SAVi Local Register

To increase the duration that the SAVi Policy for a UE10 is available by the SAVi Platform 700, and to maintain state and policy and profile information for Applications hosted on the SAVi Platform 700, the SAVi Platform 700 stores the SAVi UE policy/profile in a local register, referred to as a SAVi Local Register (SLR), for the UE10 even when the RRC connection for the UE10 has been released.

For the SAVi Platform 700 to be able to store the SAVi policy, a UE identifier is required which is persistent between RRC connections and readily available within 3GPP NAS Signalling messages at bearer establishment and that uniquely identifies the User and bearer, for example the GUTI (Globally Unique Temporary Identifier).

An independent policy & profile persistence mechanism within the SAVi Platform 700 is defined for the SAVi Policy, and the UE profile information for specific SAVi Applications. For the SAVi Applications the SAVi Platform may use the Unique Customer Identifier for the identification of the UE.

To limit the excessive processing load (and signalling load in some scenarios), a sequence number is included within the SAVi UE Profile which is downloaded to the SAVi Platform 700. When the UE10 returns to an eNB after a mobility event or from Idle state, the UE Profile is passed to the SAVi Platform 700, and the SAVi Platform 700 only need refer to the Sequence number to determine whether this information can be ignored or requires further analysis. In the case where Profile information is passed in stages to the SAVi Platform, if the sequence number has not changed then the SAVi Platform can avoid downloading the remaining stages of the Profile.

The GUTI is only persistent for a UE10 for a duration defined either by network timers, or by mobility events of the UE10, and therefore if the UE10 is reassigned a new GUTI when on a eNB 2000 and a SAVi Profile for the UE10 is stored on the associated SAVi Platform 700, the SAVi profile is updated to include the new GUTI and the UE identifier. The SAVi Platform 700 is passed a copy of certain Control messages passed over the S1-c to allow the SAVi Platform 700 to determine a change in UE identifier, these messages include:

Attach Request, Attach Accept & Attach Reject
Tracking Area Update, Tracking Area Update Accept & Tracking Area Update Reject
S1 Initial Context Set-up Request, Command and Complete
Handover messages on the S1 and X2 interfaces As the UE10 may be re-assigned a new UE identifier when on another eNB:

The SAVi Platform purges the SAVi Policy for a customer after a given time (Timer X, e.g. 1 Hour), or when the UE10 reappears on the SAVi Platform 700 being identified by a new GUTI. The SAVi Platform 700 uses the Unique Customer Identifier within the SAVi Profile of the UE to identify that a duplicate profile has been stored, and SAVi Platform 700 removes the duplicate.

The MME 2010 is configured to ensure, that when a UE10 has been assigned a new GUTI, the old GUTI is not assigned to another UE before a given time (Timer X, e.g. 1 hour). This may be achieved in practice by assigning GUTIs in order and monitoring how frequently the MME 2010 cycles through the GUTI range—this in practice should be far in excess of Timer X and therefore not cause a problem.

(18.1.2) Sequence Numbering of UE Policy to Enable Policy Persistence

To recap, when the UE10 returns to a previously used eNB, a means is required to determine that the policy/profile information stored is still up to date, and has not been modified in the meantime.

It is therefore proposed to include a Policy Sequence number in the initial messaging to pass the policy, such that:

a) If the policy is downloaded in two or more phases, the first being a UE/customer reference—the policy sequence number would be added—such that, if the policy/profile information stored at the eNB/SAVi Platform has the same sequence number the $2^{nd}$ phase (and any subsequent phases) of the Policy, retrieval is not required.

b) Even in the case the whole policy is downloaded, the internal operation of the SAVi Platform 700 can be optimised in a manner that the latest Policy information signalled does not trigger additional procedures within the Platform—for instance, the information may not need to be propagated to all the applications on the platform (e.g., as the availability of a more up-to-date policy would have no significance to those applications).

Figure 32A:
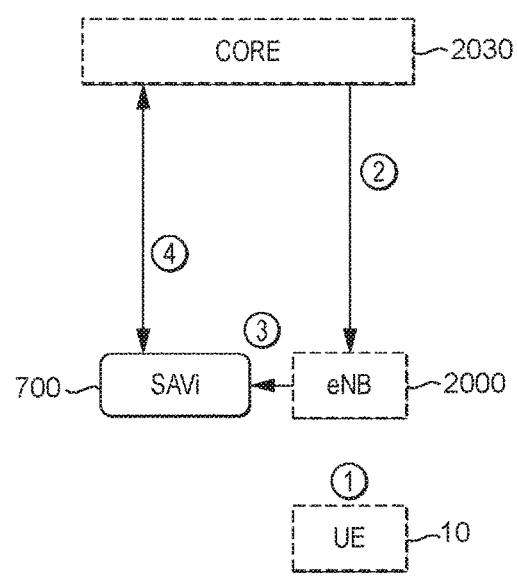
FIGS. 32A-C show the steps performed to update profiles in dependence upon sequence numbers in accordance with an embodiment of the invention.
Figure 32B:
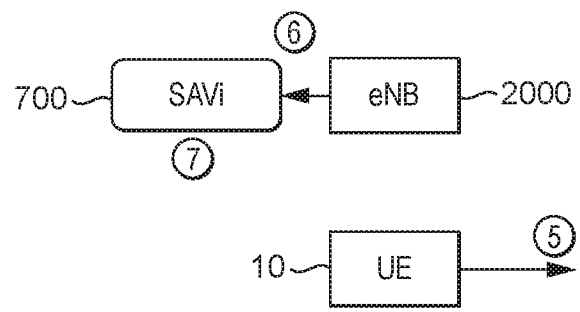
Figure 32C:
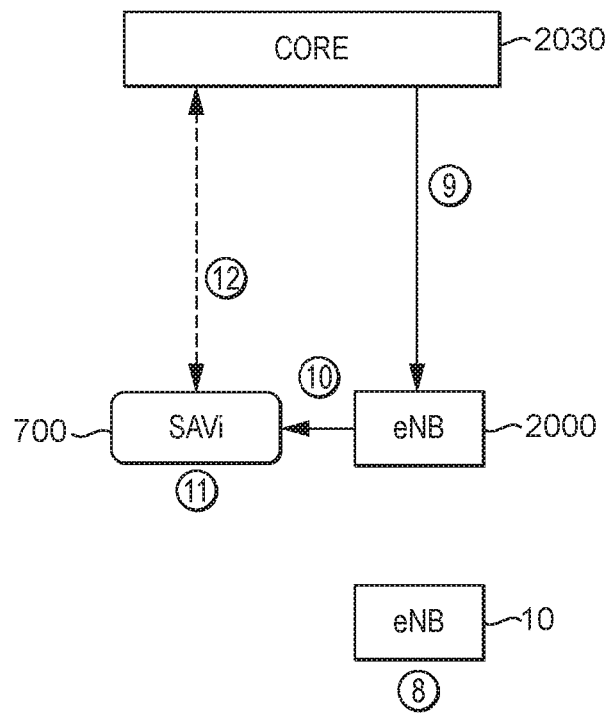

FIGS. 32A-C are diagrams of the steps performed.

FIG. 32A
1. UE10 enters a cell hosted by an eNB 2000 and establishes RRC connection; the UE10 uses a Temporary Mobile ID to identify itself to the core network 2030 (e.g. the GUTI).
2. As part of the procedure to transition to Active State, the UE context is downloaded to the eNB 2000. The UE context has been enhanced to include the SAVi UE identity and APN information for the bearer, and, in accordance with this embodiment, a sequence number associated with the Policy.

|          | |
|----------|---|
|          | 3. The eNB 2000 informs the SAVi platform 700 that a UE10 has transitioned between Idle and Active State; and provides a copy of the UE context information, specifically the SAVi UE identity, APN and the Policy Sequence Number, as well as the GUTI (the temporary mobile identifier sent by the UE10) |
|          | 4. The SAVi platform 700 contacts the core network 2030 and retrieves the SAVi profile for this (unknown) user. The UE10 may then be offered services hosted by the SAVi Platform 700 (based on the UE profile information). |
| FIG. 32B | 5. The UE10 moves to a new cell (or returns to Idle State- following inactivity on network resources). |
|          | 6. The eNB 2000 informs the SAVi Platform 700 that the UE10 is no longer controlled by/connected to the eNB 2000. |
|          | 7. The SAVi Platform 700 Stores the SAVi Profile of the UE10 in a Local Register, where it can be indexed by the SAVi UE Identifier or the Temporary Mobile Identity (GUTI). The SAVi Profile includes both policy information and Application state information for the UE10. |
| FIG. 32C | 8. When the UE10 enters the cell hosted by the eNB 2000 at a later time. The UE10 again identifies itself with the GUTI. |
|          | 9. If the UE has entered the cell for data transmission the eNB 2000 contacts the Core 2030 and downloads the UE context (as in step 2 above), and downloads the UE context including: SAVi UE identity and APN information for the bearer. Additionally, in accordance with this embodiment, the eNB 2000 downloads a sequence number associated with the Policy. |
|          | 10. The eNB 2000 informs the SAVi Platform 700 that the UE10 has become active and sends the UE context (for data activation) and the GUTI (for Signalling and data sessions) |
|          | 11. The SAVi Platform 700 interrogates the Local Register (with the GUTI or the SAVi UE Identify) to determine whether the UE is known, and retrieves the UE Policy (if available). If the UE policy information is retrieved, the SAVi platform 700 checks to see if the Policy Sequence Number matches that received in the UE Context-if it does the SAVi Platform 700 uses the policy/Application state machines |
|          | 12. If the Policy Sequence number in the register does not match that received in the UE context, the SAVi Platform 700 contacts the Core 2030 and retrieves the SAVi Profile for the UE including policy and application state information. |

The invention claimed is:

1. A mobile telecommunications network including:

a radio access network having a transceiver node for wireless communication with a plurality of terminals registered with the telecommunications network and a control platform operable to provide services to users of the plurality of terminals connected thereto, wherein the control platform is hosted in the radio access network, and a core including a store of policy information for respective ones of the plurality of terminals, and a distribution function operable to provide to the control platform particular policy information for a corresponding one terminal of the plurality of terminals;

wherein the control platform is operable to store the particular policy information together with an indicator of a version of the particular policy information during periods when the one terminal is disconnected from the control platform, the control platform including a checking function for checking a currency of the particular policy information using the indicator of the version of the particular policy information and an applying function for applying the particular policy information to the one terminal when the one terminal re-connects to the control platform if the checking function determines that the particular policy information is current, and wherein the particular policy information identifies:
a list of applications that provide selected services to the one terminal; and
an application service chain that references a set of rules, wherein the control platform uses the set of rules to build a routing table to control which route between the listed applications a data packet for the one terminal is required to take.

2. The telecommunications network of claim 1, wherein the control platform is operable to maintain a unique identifier for the one terminal while the one terminal is connected thereto, disconnected therefrom and re-connected thereto such that the particular policy information can be applied to the terminal.

3. The telecommunications network of claim 1, wherein, when the one terminal re-connects to the control platform, the core is operable to provide to the control platform a current indicator of the version of the particular policy information for the one terminal stored by the core, and
wherein the control platform is operable to compare the indicator of the version of stored policy information stored thereon with the current indicator of the version of the particular policy information from the core to determine if the stored policy information is current.

4. The telecommunications network of claim 3, wherein, if the stored policy information is not current, the control platform is operable to obtain a current version of the particular policy information from the core.

5. The telecommunications network of claim 3, wherein, if the stored policy information is current, the control platform is operable to apply the stored policy information to the terminal when the one terminal re-connects to the control platform.

6. The telecommunications network of claim 3, wherein the current indicator of the version of the particular policy information for the one terminal stored by the core is provided in a first stage of provision of the particular policy information to the control platform.

7. The telecommunications network of claim 1, wherein the particular policy information for the one terminal controls how the control platform provides services to a corresponding user of the one terminal.

8. A method of operating a mobile telecommunications network that includes a radio access network having a transceiver node for wireless communication with a plurality of terminals registered with the telecommunications network and a control platform operable to provide services to users of the plurality of terminals connected thereto, wherein the control platform is hosted in the radio access network, and a core including a store of policy information for respective ones of the plurality of terminals, and a distribution function operable to provide to the control platform particular policy information for a corresponding one terminal of the plurality of terminals, the method comprising:
    storing, by the control platform, the particular policy information together with an indicator of a version of the particular policy information during periods when the one terminal is disconnected from the control platform, and
    checking, by the control platform, a currency of the particular policy information using the indicator of the version of the particular policy information and applying the particular policy information to the one terminal when the one terminal re-connects to the control platform if the control platform determines that the particular policy information is current,
    wherein the particular policy information identifies:
        a list of applications that provide selected services to the one terminal; and
        an application service chain that references a set of rules, wherein the control platform uses the set of rules to build a routing table to control which route between the listed applications a data packet for the one terminal is required to take.

9. The method of claim 8, wherein the control platform maintains a unique identifier for the one terminal while the one terminal is connected thereto, disconnected therefrom and re-connected thereto such that the particular policy information can be applied to the one terminal.

10. The method of claim 8 wherein, when the one terminal re-connects to the control platform, the core provides to the control platform a current indicator of the version of the particular policy information for the one terminal stored by the core, and
    wherein the control platform compares the indicator of the version of stored policy information stored thereon with the current indicator of the version of the particular policy information from the core to determine if the stored policy information is current.

11. The method of claim 10, wherein, if the stored policy information is not current, the control platform obtains a current version of the particular policy information from the core.

12. The method of claim 10, wherein, if the stored policy information is current, the control platform applies the stored policy information to the one terminal when the one terminal re-connects to the control platform.

13. The method of claim 10, wherein the current indicator of the version of the particular policy information for the one terminal stored by the core is provided in a first stage of provision of the particular policy information to the control platform.

14. The method of claim 8, wherein the particular policy information for the one terminal controls how the control platform provides services to a corresponding user of one terminal.

* * * * *